(12) United States Patent
Hatta et al.

(10) Patent No.: US 10,079,379 B2
(45) Date of Patent: Sep. 18, 2018

(54) SEPARATOR, BATTERY, BATTERY PACK, ELECTRONIC APPARATUS, ELECTRIC VEHICLE, POWER STORAGE DEVICE, AND ELECTRIC POWER SYSTEM

(71) Applicant: Sony Corporation, Tokyo (JP)

(72) Inventors: Kazuhito Hatta, Fukushima (JP); Toshitsugu Ono, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 303 days.

(21) Appl. No.: 14/777,356

(22) PCT Filed: Mar. 18, 2014

(86) PCT No.: PCT/JP2014/001523
§ 371 (c)(1),
(2) Date: Sep. 15, 2015

(87) PCT Pub. No.: WO2014/148036
PCT Pub. Date: Sep. 25, 2014

(65) Prior Publication Data
US 2016/0043370 A1    Feb. 11, 2016

(30) Foreign Application Priority Data

Mar. 19, 2013 (JP) .................................. 2013-057329

(51) Int. Cl.
*H01M 2/16* (2006.01)
*H01M 2/14* (2006.01)
*B60L 11/18* (2006.01)

(52) U.S. Cl.
CPC ......... *H01M 2/166* (2013.01); *B60L 11/1851* (2013.01); *H01M 2/145* (2013.01);
(Continued)

(58) Field of Classification Search
CPC ...... H02M 2/16; H02M 2/166; H02M 2/1666; H02M 2/145
(Continued)

(56) References Cited

U.S. PATENT DOCUMENTS

2007/0178384 A1* 8/2007 Kajita ................. H01M 2/1653
429/251
2009/0181305 A1   7/2009 Nagayama et al.
(Continued)

FOREIGN PATENT DOCUMENTS

EP     2405510 A2    1/2012
JP     2000-030686   1/2000
(Continued)

OTHER PUBLICATIONS

Extended European Search Report dated Oct. 24, 2016 in corresponding European application No. 14770685.7 (7 pages).
(Continued)

*Primary Examiner* — John Poos
(74) *Attorney, Agent, or Firm* — K&L Gates LLP

(57) ABSTRACT

The present invention relates to a layer disposed between a positive electrode and a negative electrode, which is a layer containing particles and a resin material, and having a porous structure with a heat capacity per unit area of 0.0001 J/Kcm$^2$ or more and a heat capacity per unit volume of 3.0 J/Kcm$^3$ or less.

21 Claims, 13 Drawing Sheets

(52) U.S. Cl.
CPC ...... *H01M 2/1666* (2013.01); *H01M 2220/20* (2013.01); *Y10S 903/907* (2013.01)

(58) Field of Classification Search
USPC .......................................................... 429/129
See application file for complete search history.

(56) References Cited

U.S. PATENT DOCUMENTS

| 2010/0316903 | A1* | 12/2010 | Kim .................. | H01M 2/1653 |
| | | | | 429/145 |
| 2013/0059192 | A1* | 3/2013 | Kajita ................ | H01M 2/1653 |
| | | | | 429/143 |
| 2013/0224558 | A1 | 8/2013 | Kim et al. | |

FOREIGN PATENT DOCUMENTS

| JP | 2005-353582 | | 12/2005 |
| JP | 2007-027100 | | 2/2007 |
| JP | 2007-188777 | | 7/2007 |
| JP | 2010-092881 | A | 4/2010 |
| JP | 2011-023186 | A | 2/2011 |
| JP | 2011-159488 | | 8/2011 |
| JP | 2011-193397 | A | 9/2011 |
| JP | 2013-054972 | | 3/2013 |
| JP | 2013-054973 | | 3/2013 |
| WO | 2012/169681 | | 12/2012 |

OTHER PUBLICATIONS

International Search Report issued in connection with International Patent Application No. PCT/JP2014/001523, dated Jun. 24, 2014. (2 pages).

Extended European Search Report issued in connection with European Application No. 17202599.1, dated Mar. 8, 2018.(5 pages).

Japan Patent Office, Office Action issued in Japanese Patent Appln. No. 2015-506606, dated Jan. 22, 2018.

* cited by examiner

A

B

C

D

SEPARATOR, BATTERY, BATTERY PACK, ELECTRONIC APPARATUS, ELECTRIC VEHICLE, POWER STORAGE DEVICE, AND ELECTRIC POWER SYSTEM

CROSS REFERENCES TO RELATED APPLICATIONS

The present application is a national stage of International Application No. PCT/JP2014/001523 filed on Mar. 18, 2014 and claims priority to Japanese Patent Application No. 2013-057329 filed on Mar. 19, 2013, the disclosure of which is incorporated herein by reference.

BACKGROUND

The present invention relates to a separator. The invention also relates to a battery having a separator between electrodes, a battery pack using this battery, an electronic apparatus, an electric vehicle, a power storage device, and an electric power system.

In recent years, along with the distribution of portable information-related electronic apparatuses such as mobile telephones, video cameras, and laptop computers, improvement of performance, size reduction, and weight reduction of these apparatuses have been promoted. For the power supplies of these apparatuses, disposable primary batteries or secondary batteries that can be repeatedly used are used; however, from the viewpoint of being capable of effectively achieving a comprehensive balance between enhancement of performance, size reduction, weight reduction, economic efficiency and the like, the demand for non-aqueous electrolyte batteries, particularly the demand for lithium ion secondary batteries, is increasing. Furthermore, further enhancement of performance, size reduction, and the like are underway in connection with these apparatuses, and there is also a new demand for increasing the energy density for non-aqueous electrolyte batteries such as lithium ion secondary batteries.

Thus, for the purpose of an extensive increase in the capacity of lithium ion secondary batteries, it has been suggested to use, for example, a metallic material that is alloyed with lithium at the time of charging as a negative electrode active material as described in Patent Document 1 given below, instead of the carbon-based negative electrode active materials that have been traditionally used. Specifically, silicon, tin, and compounds thereof have been suggested to be used as the metal-based negative electrode active material. For example, it is known that tin (Sn) has a high theoretical capacity (about 994 mAh/g) that highly surpasses the theoretical capacity of graphite (about 372 mAh/g) as a negative electrode active material for lithium ion secondary batteries.

On the other hand, when silicon, tin, or a compound thereof is used as a negative electrode active material, the current density per unit area is increased, and at the same time, the amount of heat generation associated with discharge tends to increase. Furthermore, in regard to the applications in electric tools, electric cars and the like, there are many occasions in which even though for a short time, heat dissipation cannot keep up with the heat generation caused by large current discharge, and there are occasions in which a temperature increase in the battery cannot be avoided. Particularly, at the time of an external short circuit or an internal short circuit of a battery, there is a risk that the amount of heat emitted from the negative electrode side is large, and the separator film is broken by this heat, so that the short circuit may be further extended, or the positive electrode is heated to reach a thermal decomposition temperature, and vigorous emission of heat or gas from the battery may occur. For this reason, the request for enhancement of reliability in a case in which large energy is emitted is also rapidly increasing, and there is a strong demand for a lithium ion secondary battery that achieves a good balance between high reliability against such a test and capacity improvement.

In this regard, it has been suggested to suppress a discharge reaction by a shutdown of the separator, or as in the case of Patent Document 2, it has been suggested to apply inorganic particles of alumina or the like on the surface of the separator. It has also been suggested to apply inorganic particles of alumina or the like on the surface of the negative electrode. Thus, there has been suggested a method of maintaining insulation between the positive electrode and the negative electrode and thereby preventing the extension of a short circuit, even in the case of abnormal heat generation that exceeds the meltdown temperature of the separator, that is, the melting point or glass transition point of the resin material that constitutes the separator.

CITATION LIST

Patent Document

Patent Document 1: Japanese Patent Application Laid-Open No. 2005-353582
Patent Document 2: Japanese Patent Application Laid-Open No. 2000-030686
Patent Document 3: Japanese Patent Application Laid-Open No. 2011-159488

SUMMARY

Problems to be Solved by the Invention

The separator disclosed in Patent Document 2 can be suitably used when a conventional carbon-based negative electrode active material is used. However, in lithium ion secondary batteries for electric cars or the like, in which large current discharge may possibly occur, the amount of heat generation at the time of short circuit is markedly large, and since the electrodes and the separator are in direct contact, the heat generation leads to melting of the resin material that constitutes the separator immediately after the manifestation of the shutdown function of the separator. Thereby, a new short circuit may occur, or large heat may be transferred to the positive electrode even before the shutdown becomes effective, causing a thermal decomposition reaction in the positive electrode.

Furthermore, in order to increase heat resistance of the separator, it may be considered to provide a layer containing a large amount of inorganic particles of alumina or the like between an electrode and the separator. However, from the viewpoint that inorganic particles of alumina or the like have high thermal conductivity and do not transfer the heat generated in the negative electrode to the positive electrode side, interposition of a high density inorganic particle layer may bring an adverse effect.

Patent Document 3 discloses that a thermal decomposition reaction of the positive electrode is avoided by adding inorganic particles having a high thermal conductivity to the electrolyte, and accelerating heat dissipation. However, in regard to the heat generation caused by the negative electrode, similarly an adverse effect is obtained as the concentration of the inorganic particles increases.

The technology of the present invention was made in view of such problems of the related art, and an object of the present technology is to provide a separator having a layer which absorbs the heat generated in an electrode and does not transfer the heat to the other electrode. Another object of the present technology is to provide a battery having a layer which absorbs heat generated in an electrode and does not transfer the heat to the other electrode, between a positive electrode and a negative electrode. Furthermore, another object of the present technology is to provide a battery pack, an electronic apparatus, an electric vehicle, a power storage device, and an electric power system, all of which use the battery.

Solutions to Problems

To achieve the above-described object, a separator of the present technology includes: a substrate; and a layer formed on at least one surface of the substrate and having a heat capacity per unit area of 0.0001 J/Kcm$^2$ or more and a heat capacity per unit volume of 3.0 J/Kcm$^3$ or less, and the layer contains particles and a resin material, and the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond.

A separator of the present technology includes: a substrate; and a layer formed on at least one surface side of the substrate, with at least a portion thereof being included in the pores inside the substrate, the layer having a heat capacity per unit area of 0.0001 J/Kcm$^2$ or more and a heat capacity per unit volume of 3.0 J/Kcm$^3$ or less, and the layer contains particles and a resin material, and the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond.

A battery of the present technology includes: an electrode assembly having a positive electrode and a negative electrode facing each other, with a separator being interposed therebetween; and an electrolyte, and the separator includes: a substrate formed from a porous film; and a layer formed on at least one surface of the substrate and having a heat capacity per unit area of 0.0001 J/Kcm$^2$ or more and a heat capacity per unit volume of 3.0 J/Kcm$^3$ or less, the layer contains particles and a resin material, and the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond.

A battery of the present technology includes: an electrode assembly having a positive electrode and a negative electrode facing each other, with a separator being interposed therebetween; and an electrolyte, and the separator includes: a substrate; and a layer formed on at least one surface side of the substrate, with at least a portion thereof being included in the pores inside the substrate, the layer having a heat capacity per unit area of 0.0001 J/Kcm$^2$ or more and a heat capacity per unit volume of 3.0 J/Kcm$^3$ or less, the layer contains particles and a resin material, and the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond.

A battery of the present technology includes: an electrode assembly having a positive electrode and a negative electrode facing each other, with a separator being interposed therebetween; an electrolyte; and a layer disposed between the separator and at least one of the positive electrode and the negative electrode facing each other across the separator, and having a heat capacity per unit area of 0.0001 J/Kcm$^2$ or more and a heat capacity per unit volume of 3.0 J/Kcm$^3$ or less, and the layer contains particles and a resin material, and the particles contain at least one selected from boehmite, yttrium oxide, titanium oxide, magnesium oxide, zirconium oxide, silicon oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond.

Furthermore, the battery pack, electronic apparatus, electric vehicle, power storage device, and electric power system of the present technology include the battery described above.

In the present technology, the layer described above (a layer having a heat capacity per unit area of 0.0001 J/Kcm$^2$ or more and having a heat capacity per unit volume of 3.0 J/Kcm$^3$ or less) is provided between at least one of the positive electrode and the negative electrode and a separator or a substrate, or within a substrate. Therefore, for example, at the time of discharge caused by a short circuit, large heat generated in the negative electrode can be absorbed by the aforementioned layer, and also, the heat can be prevented from being transferred to the positive electrode. In addition to the case of providing the layer as a part of the separator, when the layer is provided at least either between the separator and the positive electrode, or between the separator and the negative electrode, or is provided within the substrate, similar effects are obtained.

Effects of the Invention

According to the present technology, large heat generated in the negative electrode being transferred to the positive electrode and causing a thermal decomposition reaction of the positive electrode, can be suppressed.

Additional features and advantages are described herein, and will be apparent from the following Detailed Description and the figures.

DETAILED DESCRIPTION

Hereinafter, the best modes for carrying out the present technology (hereinafter, referred to as embodiments) will be explained. Meanwhile, the explanation will be given as follows.

1. First embodiment (example of the separator of the present technology)
2. Second embodiment (example of a cylindrical battery employing the separator of the present technology)
3. Third embodiment (example of a square battery employing the separator of the present technology)
4. Fourth embodiment (example of a laminate film type battery employing the separator of the present technology)
5. Fifth embodiment (example of a battery pack of laminate film type batteries employing the separator of the present technology)
6. Sixth embodiment (example of a battery pack using batteries)
7. Seventh embodiment (example of a power storage system using a battery)

1. First Embodiment

The separator related to the first embodiment has a heat absorbing layer on at least one surface of a substrate. The separator of the present technology will be explained in detail below.

(1-1) Structure of Separator

Figure 1:
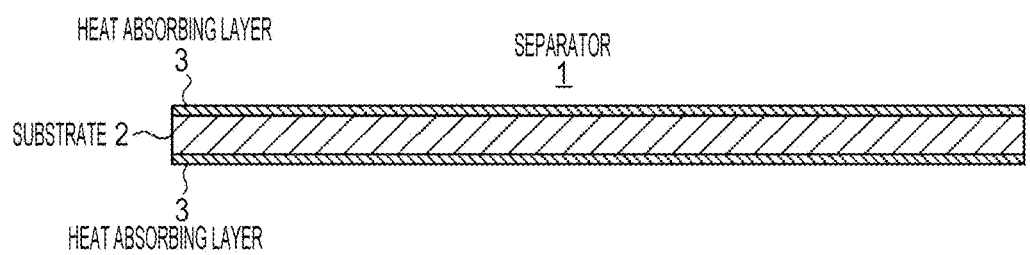
FIG. 1 is a cross-sectional diagram illustrating the configuration of a separator related to a first embodiment of the present technology.

The separator 1 related to the first embodiment includes, as illustrated in FIG. 1, a substrate 2 formed from a porous film; and a heat absorbing layer 3 formed on at least one surface of the substrate 2. The separator 1 separates a positive electrode and a negative electrode in the battery, prevents a short circuit of electric current caused by the contact between the two electrodes, and is impregnated with a non-aqueous electrolyte. The heat absorbing layer 3 of the separator 1 has a heat absorption effect of absorbing the heat generated in one electrode, and has an insulating effect of preventing this heat from being transferred to the other electrode.

The separator 1 of the present technology exhibits a particularly remarkable effect when the separator is applied to a battery in which a metal-based material or a metal alloy-based material is used as the negative electrode active material. In a negative electrode in which a metal-based material or a metal alloy-based material is used as the negative electrode active material, vigorous heat generation may easily occur at the time of short circuit discharge. Therefore, the separator 1 of the present technology exhibits a remarkable effect of preventing the positive electrode from undergoing a thermal decomposition reaction, in a battery in which a metal-based material or metal alloy-based material that is likely to cause vigorous heat generation is used as the negative electrode active material. Meanwhile, FIG. 1 shows an example of the separator 1 in which a heat absorbing layer 3 is formed on both surfaces of a substrate 2. The separator 1 may also have a heat absorbing layer 3 formed on any of the positive electrode-facing side or the negative electrode-facing side within the substrate 2.

[Substrate]

The substrate 2 is a porous film constructed from an insulating film having a high ion permeability and having predetermined mechanical strength. When the separator 1 is applied to a non-aqueous electrolyte battery, the non-aqueous liquid electrolyte is retained in the pores of the substrate 2. The substrate 2, as a principal part of the separator 1, has predetermined mechanical strength, and is required to have characteristics such as high resistance to non-aqueous liquid electrolytes, low reactivity, and the property of not easily expandable. Furthermore, in a case in which the substrate 2 is used in an electrode assembly having a wound structure, the substrate is also required to have flexibility.

Regarding the resin material that constitutes such a substrate 2, it is preferable to use, for example, a polyolefin resin such as polypropylene or polyethylene, an acrylic resin, a styrene resin, a polyester resin, or a nylon resin. Particularly, polyethylene such as low density polyethylene, high density polyethylene, or linear polyethylene; or low molecular weight waxes thereof, or polyolefin resins such as polypropylene are suitably used because these resins have appropriate melting temperatures and are easily available. Furthermore, it is also acceptable to use a structure obtained by laminating porous films of two or more kinds of these resins, or a porous film formed by melt kneading two or more kinds of the resin material. When a porous film formed from a polyolefin resin is included, excellent separability between the positive electrode and the negative electrode is obtained, and the decrease in internal short circuits can be further reduced.

The thickness of the substrate 2 can be arbitrarily set as long as the thickness is a thickness at which the substrate can maintain required strength, or larger. It is preferable that the substrate 2 is set to have a thickness which promotes insulation between the positive electrode and the negative electrode and prevents a short circuit or the like, has ion permeability for suitably carrying out a battery reaction involving the separator 1, and can increase as far as possible the volumetric efficiency of the active material layer that contributes to the battery reaction in the battery. Specifically, the thickness of the substrate 2 is preferably from 7 μm to 20 μm.

The porosity of the substrate 2 is preferably from 25% to 80%, and more preferably from 25% to 40%, in order to obtain the ion permeability described above. The porosity may vary depending on the current value at the time of actual use of the battery and on the characteristics and thickness of the porous structure of the substrate 2; however, if the porosity is smaller than the range described above, the movement of ions in the non-aqueous liquid electrolyte in relation to charge and discharge is interrupted. For this reason, the load characteristics are deteriorated, and also, it becomes difficult to extract a sufficient capacity at the time of large current discharge. Furthermore, if the porosity increases to a value outside the range described above, the strength of the separator is decreased. Particularly, in a separator 1 provided with a heat absorbing layer 3 on the surface as in the case of the present technology, it is common to design the thickness of the substrate 2 to be as thin as the thickness of the heat absorbing layer 3, and make the thickness of the separator 1 as a whole to be equal to that of a single layer separator. For this reason, the strength of the separator 1 is highly dependent on the strength of the substrate 2, and the substrate 2 is required to have strength of a certain level or higher.

The substrate 2 that can be used in the present technology can be roughly classified into, for example, a microporous film, a nonwoven fabric, and paper, as described below.

[Microporous Film]

A microporous film is a film which is obtained by thinly stretching a material such as a resin, and has a porous structure. For example, a microporous film is obtained by molding a material such as a resin by a stretching pore-opening method, a phase separation method or the like. For example, in the stretching pore-opening method, first, a molten polymer is extruded through a T-die or a circular die and is subjected to a heat treatment, and thus a crystal structure having high regularity is formed. Thereafter, the extruded polymer is subjected to low temperature stretching and then to high temperature stretching to thereby delaminate the crystal interface, interstitial parts are generated thereby between lamellas, and thus a porous structure is formed. In the phase separation method, a uniform solution prepared by mixing a polymer and a solvent at a high temperature is produced into a film by a T-die method, an inflation method or the like, subsequently the solvent is extracted with another volatile solvent, and thus a microporous film can be obtained. Meanwhile, the method for producing a microporous film is not intended to be limited to these, and any conventionally suggested methods can be widely used.

[Nonwoven Fabric]

A nonwoven fabric is a structure produced not by weaving or knitting fibers, but by tying, entangling, or tying and entangling fibers mechanically or chemically or using a solvent, or by means of a combination thereof, excluding paper that will be described below. For the raw material of the nonwoven fabric, almost all materials that can be processed into fibers can be used, and functions can be imparted to the nonwoven fabric in accordance with the purpose and use by adjusting the shape such as fiber length or fiber thickness. The method for producing a nonwoven fabric includes two stages such as a step of forming an integrated layer of fibers called fleece, and a bonding step of bonding the fibers of the fleece. For the respective steps, various production methods are applicable, and the methods are selected in accordance with the raw material, purpose, and use of the nonwoven fabric. For example, regarding the step of forming a fleece, a dry method, a wet method, a spun-bonding method, a melt-blow method and the like can be used. Regarding the bonding step of bonding the fibers of the fleece, a thermal bonding method, a chemical bonding method, a needle punching method, a spun-lacing method (hydroentanglement), a stitch bonding method, a steam jet method, and the like can be used.

An example of the nonwoven fabric is a gas-permeable polyethylene terephthalate membrane (polyethylene terephthalate nonwoven fabric) produced using polyethylene terephthalate (PET) fibers. Meanwhile, a gas-permeable membrane refers to a membrane having gas permeability. Other examples of the nonwoven fabric include nonwoven fabrics produced using aramid fibers, glass fibers, cellulose fibers, polyolefin fibers, and nylon fibers. The nonwoven fabric may be a nonwoven fabric produced using two or more kinds of fibers.

[Paper]

Paper refers to paper in a narrow sense, and for example, a product produced by papermaking using pulp. Pulp means an aggregate of plant fibers extracted from wood and other plants by a mechanical or chemical treatment. Mixed paper produced by incorporating materials other than pulp (for example, minerals such as talc) and papermaking, is also included in the paper. Regarding the paper, a gas-permeable cellulose membrane produced by papermaking using cellulose pulp, or the like can be used. Meanwhile, in a case in which wet type nonwoven fabric produced using a wet method should be distinguished from paper, the two are distinguished according to the definition of ISO 9092. That is, a product in which the content of a fiber having a ratio of length to diameter (aspect ratio) of 300 or more is 50% or more as a mass ratio, or in the case of a product having a density of 0.4 g/cc or less, a product in which the content of a fiber having a ratio of length to diameter of 300 or more is 30% or more as a mass ratio, is defined as a wet type nonwoven fabric, and anything else is identified as paper.

In the case of using a nonwoven fabric or paper as the substrate 2, typically, the porosity of the substrate 2 may be higher than 40%. In this case, it is preferable because the effects of the heat absorbing layer 3 can be exhibited more effectively by forming at least a portion of the heat absorbing layer 3 in the pores inside the substrate 2, compared with the case of forming the heat absorbing layer 3 only on the surface of the substrate 2.

[Heat Absorbing Layer]

The heat absorbing layer 3 is a layer formed on at least one surface of the substrate 2, and is a porous layer having a function of absorbing heat that has been generated mainly in the negative electrode, and preventing the heat generated in the negative electrode from being transferred to the positive electrode. When the separator 1 is applied to a non-aqueous electrolyte battery, the non-aqueous liquid electrolyte is retained in the pores of the heat absorbing layer 3. The heat absorbing layer 3 contains a heat-resistant resin material, and particles such as solid particles, such as at least any one of inorganic particles and organic particles that function as heat absorbent particles having excellent heat resistance and oxidation resistance. It is preferable for the heat absorbing layer 3 that particles exist in a dispersed state therein, for the purpose of making the transfer of heat more difficult. According to the present technology, dispersion denotes a state in which particles, or groups of particles that have formed secondary particles, are present in a scattered manner without being connected; however, some of the particles or the groups of particles that have formed secondary particles may be in a connected state. That is, a state in which particles are dispersed over the whole heat absorbing layer 3 is preferred.

The heat absorbing layer 3 may be formed not only on at least one surface of the substrate 2, but also in the pores inside the substrate 2 in addition to the at least one surface of the substrate 2. Furthermore, the heat absorbing layer 3 may also be formed in the pores inside the substrate 2 only. That is, the heat absorbing layer 3, at least a portion of which is included in the pores inside the substrate 2, may be formed on one surface side or the other surface side of the substrate 2, or may be formed on one surface side and the other surface side of the substrate 2.

Examples of the case in which the heat absorbing layer 3, at least a portion of which is included in the pores inside the substrate 2, is formed on one surface side of the substrate 2, include a case in which the heat absorbing layer 3 is formed to extend from a region on the inner side of one surface of the substrate 2 to a region on the outer side of the same surface of the substrate 2; and a case in which the heat absorbing layer 3 is formed to extend from one surface of the substrate 2 to a region on the inner side of the same surface of the substrate. Meanwhile, in a region on the inner side of one surface of the substrate 2, the heat absorbing layer 3 is formed in the pores inside the substrate 2.

Furthermore, examples of the case in which the heat absorbing layer 3 is formed to extend from a region on the inner side of one surface of the substrate 2 to a region on the outer side of the same surface of the substrate 2, include a case in which the heat absorbing layer 3 formed in a region on the inner side of one surface of the substrate 2 and the heat absorbing layer 3 formed on the outer side of the same surface of the substrate 2 are formed in a continuously connected manner; and a case in which the heat absorbing layer 3 formed in a region on the inner side of one surface of the substrate 2 and the heat absorbing layer 3 formed on the outer side of the same surface of the substrate 2 are formed in a disconnected manner.

Examples of the case in which the heat absorbing layer 3, at least a portion of which is included in the pores inside the substrate 2, is formed on the other surface side of the substrate 2, include a case in which the heat absorbing layer 3 is formed to extend from a region on the inner side of the other surface of the substrate 2 to a region on the outer side of the same other surface of the substrate 2; and a case in which the heat absorbing layer 3 is formed to extend from the other surface of the substrate 2 to a region on the inner side of the same other surface of the substrate. Meanwhile, in a region on the inner side of the other surface of the substrate 2, the heat absorbing layer 3 is formed in the pores inside the substrate 2.

Furthermore, examples of the case in which the heat absorbing layer 3 is formed to extend from a region on the inner side of the other surface of the substrate 2 to a region on the outer side of the same other surface of the substrate 2, include a case in which the heat absorbing layer 3 formed in a region on the inner side of the other surface of the substrate 2 and the heat absorbing layer 3 formed on the outer side of the same other surface of the substrate 2 are formed in a continuously connected state; and a case in which the heat absorbing layer 3 formed in a region on the inner side of the other surface of the substrate 2 and the heat absorbing layer 3 formed on the outer side of the same other surface of the substrate 2 are formed in a disconnected manner.

Figure 2:
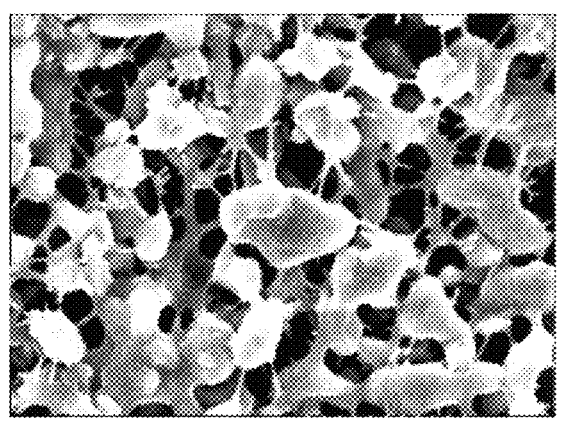
FIG. 2 is a secondary electronic image obtained by scanning electronic microscope (SEM), which shows the configuration of the surface layer of the separator related to the first embodiment of the present technology.

The heat absorbing layer 3 has a large number of micropores formed in the whole layer in order to have an ion permeation function, a non-aqueous liquid electrolyte retention function and the like as the separator 1, and may have the three-dimensional network structure illustrated in FIG. 2. Meanwhile, FIG. 2 is a secondary electron image obtained by scanning electron microscope (SEM), which shows the structure of the heat absorbing layer 3. The heat absorbing layer 3 preferably has a three-dimensional network structure in which the resin material that constitutes the heat absorbing layer 3 is fibrillated, and the fibrils are mutually continuously linked. The particles can maintain a dispersed state without being connected with each other, by being supported on this resin material having a three-dimensional network structure.

Specifically, it is preferable for the heat absorbing layer 3 that the heat capacity per area is adjusted to 0.0001 J/Kcm$^2$ or more, and more preferably to 0.0003 J/Kcm$^2$ or more, in order to sufficiently absorb the heat generated in the negative electrode. Meanwhile, the heat capacity per area is represented by a product of the mass of the particles in a unit area and the specific heat capacity of the particles. Furthermore, in a case in which the heat absorbing layer 3 is provided on both surfaces of the substrate 2, the heat capacity per area is calculated on the basis of the mass and specific heat capacity of the particles present on both surfaces of the substrate 2 in a unit area.

The non-aqueous liquid electrolyte retained in the heat absorbing layer 3 also has heat capacity; however, there is a possibility that heat may be dissipated from the heat absorbing layer 3 due to gas generation caused by abnormal heat generation. Therefore, according to the present technology, the heat capacity of simple heat absorbent particles is designated as the heat capacity of per area of the heat absorbing layer 3.

Furthermore, it is preferable for the heat absorbing layer 3 that the heat capacity per volume is adjusted to 3.0 J/Kcm$^3$ or less, and more preferably to 2.5 J/Kcm$^3$ or less, in order to make the transfer of the heat generated in the negative electrode to the positive electrode more difficult. Meanwhile, the heat capacity per volume is represented by the product of the packing ratio, the true density, and the specific heat capacity of particles in a unit volume, and is directly proportional to the packing density of the particles on the substrate 2. When both the heat capacity per area and the heat capacity per volume are adjusted to the ranges described above, the heat generated in the negative electrode can be absorbed in the heat absorbing layer 3, and the heat absorbed by the heat absorbing layer 3 can be prevented from being transferred to the positive electrode.

Here, the heat capacity per volume of 3.0 J/Kcm$^3$ or less of the heat absorbing layer 3 is a physical property needed at the time of forming the separator 1. That is, when the separator 1 is applied to a non-aqueous electrolyte batter and then charging and discharging are performed, the heat absorbing layer 3 is collapsed as a result of expansion of the electrodes or the like, and the heat capacity per volume is increased. As a reference, when a separator 1 which has a heat absorbing layer 3 having a heat capacity per volume of 3.0 J/Kcm$^3$ and a thickness of 15 μm is used, although the heat capacity per volume may vary depending on the configuration of the heat absorbing layer 3, generally, the heat capacity per volume of the heat absorbing layer 3 after first charging of the non-aqueous electrolyte battery is about 3.2 J/Kcm$^3$. Also, as charging and discharging of the non-aqueous electrolyte battery progress, the collapse of the heat absorbing layer 3 is extended, and after 500 cycles of charging-discharging, the heat capacity per volume of the heat absorbing layer 3 is about 3.8 J/Kcm$^3$. In general, non-aqueous electrolyte batteries are shipped after first charging is performed. By adjusting the heat capacity per volume of the heat absorbing layer 3 of the separator 1 is adjusted to 3.2 J/Kcm$^3$ or less at the time of shipping, propagation of heat between the electrodes can be suppressed.

According to the present technology, a heat absorbing layer 3 having a heat capacity per volume of 3.0 J/Kcm$^3$ or less is formed at the time of forming the separator 1, in order to obtain the effects of the separator of the present technology during the service period of the non-aqueous electrolyte battery. By adjusting the heat capacity per volume to 3.0 J/Kcm$^3$ or less in a state before first charging, the heat capacity per volume at the time of first charging (at the time of shipping) can be adjusted to 3.2 J/Kcm$^3$ or less. Furthermore, even if the separator 1 is compressed along with the progress of cycles, when the heat capacity per volume of the heat absorbing layer 3 is in the range of 3.8 J/Kcm$^3$ or less, the "increase in the amount of heat conduction per area" and the "decrease in the amount of heat generation per area at the time of a short circuit", which occur with the progress of cycles, cancel each other. This is because, as the heat absorbing layer is compressed and the heat capacity per volume is increased along with the progress of cycles, the amount of heat conduction per area is also increased; however, the output power (current) is decreased as a result of the increase in the internal resistance caused by the progress of cycles, so as to cancel the increase in the amount of heat conduction per area, and thus the amount of heat generation per area is decreased. For this reason, safety is maintained for the battery as a whole.

In regard to the heat absorbent particles, a higher heat absorption effect can be obtained as the amount of the heat absorbent particles is larger. However, in many cases, a substance having a large heat capacity also has a high thermal conductivity, and if the heat absorbent particles are compactly packed, there is a risk that the particles may transfer heat from the negative electrode efficiently to the positive electrode. Therefore, it is needed to disperse the heat absorbent particles sparsely in the heat absorbing layer 3 to make the heat capacity per volume smaller, and to disperse the various heat absorbent particles without being connected to one another.

Incidentally, it was suggested in the past to form an inorganic particle-containing layer similar to that of the present technology on the surface of the separator for the purpose of enhancing heat resistance and oxidation resistance. However, in a conventional method for forming an inorganic particle-containing layer for the separator, it has been difficult to realize an inorganic particle-containing layer having a low heat capacity per volume (3.0 J/Kcm$^3$ or less), as in the case of the present technology. According to the present technology, a heat absorbing layer 3 which has a low heat capacity per volume and does not easily transfer heat is obtained by investigating the method for forming the heat absorbing layer 3. The method for forming the heat absorbing layer 3 will be explained below.

In a case in which the heat absorbing layer 3 is provided on the negative electrode-facing side of the substrate 2, the temperature increase in the vicinity of the separator 1 becomes mild, and the time taken by the substrate 2 to reach a molten state after shutdown can be lengthened. For this reason, a discharge reaction can be suppressed, and heat generation can be suppressed. Meanwhile, in a case in which the heat absorbing layer 3 is provided only on the negative electrode-facing side, a layer having a shape with a flat surface and having excellent heat resistance and oxidation resistance may be provided on the positive electrode-facing side. When the full charge voltage of the battery is set to a value such as 4.25 V or higher, which is higher than the conventional value, the vicinity of the positive electrode may turn to an oxidizing atmosphere at the time of full charge. Therefore, there is a risk that the positive electrode-facing side may be oxidized and deteriorated. In order to suppress this, a layer containing a resin material having especially excellent properties in connection with heat resistance and oxidation resistance may be formed.

On the other hand, in a case in which the heat absorbing layer 3 is provided on the positive electrode-facing side of the substrate 2, even if the substrate 2 has melted down, the particles can maintain insulation between the positive electrode and the negative electrode, and can continuously suppress heat transfer to the positive electrode by absorbing the heat generated in the negative electrode. Therefore, some time can be gained until the non-aqueous liquid electrolyte at the interface between the negative electrode and the separator 1 is evaporated and thereby the discharge reaction is terminated.

Then, a separator 1 having the heat absorbing layer 3 provided on both surfaces of the substrate 2 is particularly preferred because the functional effects of both the case of providing the heat absorbing layer 3 on the negative electrode-facing surface of the substrate 2 and the case of providing the heat absorbing layer 3 on the positive electrode-facing surface of the substrate 2 can be obtained.

The heat absorbing layer 3 may have a flat and smooth surface, or may have concavo-convex shapes on the surface. As discussed above, the heat absorbing layer 3 can be produced to have a configuration in which particles are sparsely dispersed over the whole heat absorbing layer 3 by adjusting the thickness. On the other hand, the heat absorbing layer 3 can be produced to have a sparse configuration by providing concavo-convex shapes to the surface of the heat absorbing layer 3. When the surface of the heat absorbing layer 3 has concavo-convex shapes, the convexities of the heat absorbing layer 3 are respectively brought into contact with the positive electrode and the negative electrode, and the distance between the positive electrode and the negative electrode can be maintained. The sections of the convexities in the heat absorbing layer 3 have a heat absorption function or a function of thermal insulation between the positive electrode and the negative electrode, without being connected with one another. Examples of the concavo-convex shapes on the surface of the heat absorbing layer 3 include a mottled form as illustrated in FIG. 3A, a lattice form as illustrated in FIG. 3B, a dotted form as illustrated in FIG. 3C, and a pinhole shape as illustrated in FIG. 3D.

Examples of the resin material that constitutes the heat absorbing layer 3 include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, an ethylene-propylene rubber, polyvinyl alcohol, and polyvinyl acetate; cellulose derivatives such as ethyl cellulose, methyl cellulose, hydroxyethyl cellulose, and carboxymethyl cellulose; and resins with at least one of the melting point and the glass transition temperature being 180° C. or higher, such as polyphenylene ether, polysulfone, polyether sulfone, polyphenylene sulfide, polyetherimide, polyimide, polyamide (particularly, aramid), polyamideimide, polyacrylonitrile, polyvinyl alcohol, polyether, an acrylic acid resin, and polyester.

For the particles such as solid particles, such as at least any one of inorganic particles and organic particles, that constitute the heat absorbing layer 3, it is preferable to use a material having a specific heat capacity of 0.5 J/gK or higher. It is because the heat absorption effect is increased. Furthermore, since the amount of particles (mass) required to obtain a predetermined heat capacity per area can be reduced, the amount of the resin material (mass) that supports the particles can also be reduced. Furthermore, it is preferable to use a material having a low thermal conductivity. It is because the effect of making the transfer of heat from the negative electrode to the positive electrode difficult is increased. Furthermore, it is preferable to use a material having a melting point of 1000° C. or higher. It is because heat resistance can be enhanced.

Specific examples thereof include metal oxides, metal oxide hydrides, metal hydroxides, metal nitrides, metal carbides, and metal sulfides, which are electrically insulating inorganic particles. Regarding the metal oxides or metal oxide hydrides, aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), zinc oxide (ZnO), and the like can be suitably used. Regarding the metal nitrides, silicon nitride ($Si_3N_4$), aluminum nitride (AlN), boron nitride (BN), titanium nitride (TiN), and the like can be suitably used. Regarding the metal carbides, silicon carbide (SiC), boron carbide ($B_4C$), and the like can be suitably used. Regarding the metal sulfides, barium sulfate ($BaSO_4$) and the like can be suitably used. Regarding the metal hydroxides, aluminum hydroxide (Al$(OH)_3$) and the like can be used. Furthermore, minerals including porous aluminosilicates such as zeolites ($M_{2/n}O \cdot Al_2O_3 \cdot xSiO_2 \cdot yH_2O$, wherein M represents a metal element; $x \geq 2$; and $y \geq 0$); lamellar silicates such as talc ($Mg_3Si_4O_{10}(OH)_2$); barium titanate ($BaTiO_3$), and strontium titanate ($SrTiO_3$) may also be used. Furthermore, lithium compounds such as $Li_2O_4$, $Li_3PO_4$, and LiF may also be used. Carbon materials such as graphite, carbon nanotubes, and diamond may also be used. Among them, it is preferable to use alumina, boehmite, talc, titania (particularly, one having a rutile structure), silica, or magnesia; and it is more preferable to use alumina or boehmite.

These inorganic particles may be used singly, or two or more kinds thereof may be used in mixture. The inorganic particles also have oxidation resistance, and in a case in which the heat absorbing layer 3 is provided on the positive electrode side, the heat absorbing layer has strong resistance to an oxidative environment in the vicinity of the positive electrode at the time of charging. The shape of the inorganic particles is not particularly limited, and a spherical shape, a fibrous shape, a needle shape, a scale shape, a sheet shape, a random shape, and the like can all be used.

Examples of the material that constitutes organic particles include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene-propylene rubber, polyvinyl alcohol, and polyvinyl acetate; cellulose derivatives such as ethyl cellulose, methyl cellulose, hydroxyethyl cellulose, and carboxymethyl cellulose; and resins having high heat resistance with at least one of the melting point and the glass transition temperature being 180° C. or higher, such as polyphenylene ether, polysulfone, polyether sulfone, polyphenylene sulfide, polyetherimide, polyimide, polyamide such as all-aromatic polyamide (aramid), polyamideimide, polyacrylonitrileo, polyvinyl alcohol, polyether, an acrylic acid resin, and polyester. These materials may be used singly, or may be used as mixtures of two or more kinds thereof. The shape of the organic particles is not particularly limited, and a spherical shape, a fibrous shape, a needle shape, a scale shape, a sheet shape, a random shape, and the like can all be used.

Among these, it is more preferable to use particles having an anisotropic shape such as a needle shape, a sheet shape or a scale shape. Since the heat absorbing layer 3 is formed by being applied on the surface of the separator or an electrode, particles having an anisotropic shape are such that the longest part of a particle (referred to as major axis) tends to be oriented in a direction parallel to the surface of the separator or the surface of the electrode (referred to as plane direction), which is the direction of application. For example, the major axis of a needle shape or the plane of a sheet shape is oriented in a plane direction. Therefore, the particles are easily connected in the plane direction, but particles are not easily connected in a perpendicular direction (direction perpendicular to the plane direction). Therefore, when particles having an anisotropic shape are used, the heat generated in the negative electrode can be easily dispersed uniformly in-plane in the plane direction; however, the heat is not easily dispersed in a direction perpendicular to the plane direction, so that insulation of the heat transferred to the positive electrode can be further enhanced.

Regarding the particles having an anisotropic shape, from the viewpoint that thermal insulation can be enhanced, for example, particles having a shape in which the ratio of the length of the longest part of a particle (referred to as major axis) and the length of the shortest part of the particle in a direction perpendicular to the major axis (referred to as minor axis) ("length of major axis (length of the longest part of the particle)"/"length of minor axis (length of the shortest part of the particle)") is 3 times or larger, are preferred.

In regard to the particles, it is preferable to adjust the average particle size of the primary particles to several micrometers (μm) or less, from the viewpoints of the influence on the strength of the separator and smoothness of the coated surface. Specifically, the average particle size of the primary particles is preferably 1.0 μm or less, and more preferably from 0.3 μm to 0.8 μm. Furthermore, with regard to primary particles having an average particle size of from 0.3 μm to 0.8 μm, primary particles having an average particle size of from 1.0 μm to 10 μm or a group of particles with no primary particles dispersed therein, or primary particles having an average particle size of from 0.01 μm to 0.10 μm may also be used in combination. When particles having a significantly different average particle size are incorporated, the difference in elevation of the concavo-convex shape of the surface of the heat absorbing layer 3 can be easily made large. Such average particle size of primary particles can be measured by a method of analyzing photographs obtained by electron microscope using a particle size analyzer.

When the average particle size of primary particles of the particles is more than 1.0 μm, the separator may become brittle, and the coated surface may also become rough. Furthermore, in the case of forming a heat absorbing layer 3 containing particles on a substrate 2 by coating, if the primary particles of the particles are too large, there may be areas where a coating liquid containing the particles is not coated, and there is a risk that the coated surface may become rough. On the contrary, in a case in which primary particles having an average particle size of from 0.3 μm to 0.8 μm are used as a mixture with particles having a large average particle size, the difference in elevation of the concavo-convex shape can be made large, and the problem that the coated surface becomes rough can be used rather advantageously.

Regarding the particles, it is preferable that the mixing ratio with the resin material as a mass ratio is in the range of particles:resin material=70:30 to 98:2. That is, it is preferable that the content of the particles in the heat absorbing layer 3 is from 70% by mass to 98% by mass relative to the total mass of the particles and the resin material in the heat absorbing layer 3. If the content of the particles is smaller than the range described above, the thickness of the heat absorbing layer 3 required to obtain a predetermined heat capacity becomes larger, and it is not preferable from the viewpoint of the volumetric efficiency. Furthermore, if the content of the particles is larger than the range described above, the amount of the resin material supporting the particles becomes small, and formation of the heat absorbing layer 3 is made difficult.

Furthermore, in a case in which a gel-like electrolyte (gel electrolyte) is used as the non-aqueous electrolyte, since the gel electrolyte has strength to a certain extent, the gel electrolyte accomplishes the role of reinforcing the heat absorbing layer 3. Therefore, in the case of having a gel electrolyte, the content of the particles is not limited to the range described above, and when the resin material of the heat absorbing layer 3 and the resin material of the gel electrolyte are of the same kind, the content of the particles including the resin material of the gel electrolyte may be 50% by mass or more, and is preferably 60% by mass or less and 95% by mass or less.

It is preferable that the heat absorbing layer 3 has a thickness of 1.0 μm or more. If the thickness is less than 1.0 μm, sufficient tear strength cannot be obtained, and the effect of forming the heat absorbing layer 3 is diminished. Also, the heat absorbing layer 3 has higher tear strength as the thickness is larger; however, the volumetric efficiency of the battery is decreased. Therefore, it is preferable to appropriately select the thickness as needed.

Furthermore, the heat absorbing layer 3 is preferably such that the porosity of the layer is higher than or equal to the porosity of the substrate 2, in order not to inhibit the ion permeation function, the non-aqueous electrolyte retention function and the like of the substrate 2. Furthermore, for the heat absorbing layer 3 of the present technology, the porosity thereof is preferably 95% or less. Specifically, the porosity of the heat absorbing layer 3 is preferably from 45% to 95%, more preferably from 59% to 93%, and even more preferably from 65% to 90%. If the porosity of the heat absorbing layer 3 is smaller than the range described above, ion permeability of the heat absorbing layer 3 is decreased, and also, the thermal insulation effect between the electrodes of the present technology is diminished. Furthermore, if the porosity of the heat absorbing layer 3 is larger than the range described above, the strength of the heat absorbing layer 3 is decreased.

(1-2) Method for Producing Separator

The method for producing a separator 1 provided with a heat absorbing layer 3 will be explained below.

(1-2-1) First Method for Producing Separator (Production Method Based on Phase Separation)

Figure 3:
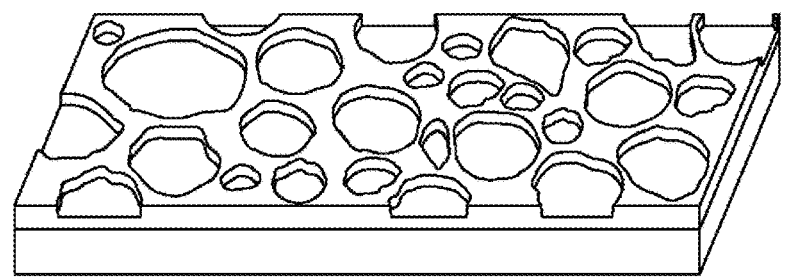
FIG. 3 is a perspective view diagram illustrating an example of the surface shape of the separator related to the first embodiment of the present technology.
Figure 3:
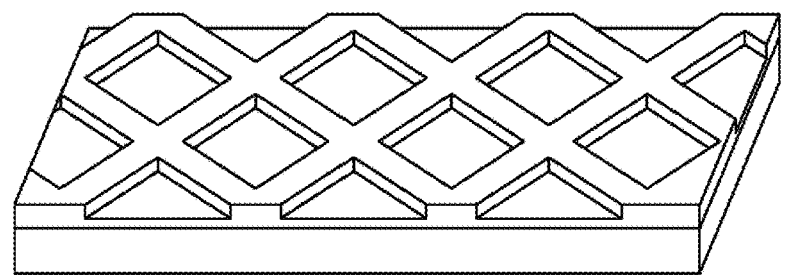
Figure 3:
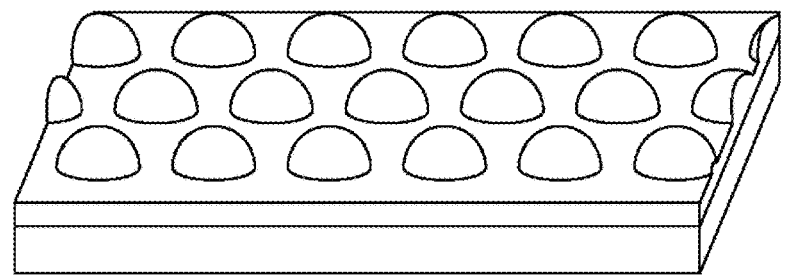
Figure 3:
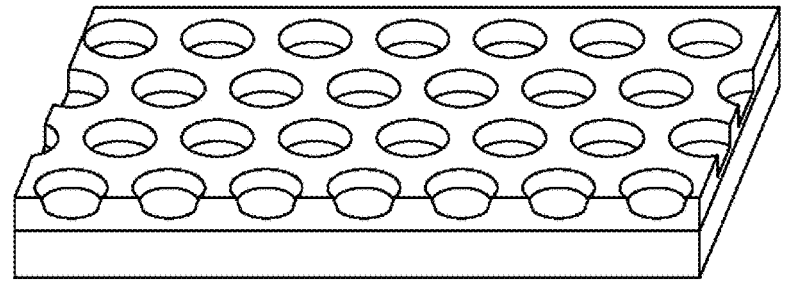

A resin solution is obtained by mixing a resin material and particles that constitute the heat absorbing layer 3 at a predetermined mass ratio, adding the mixture to a dispersing solvent such as N-methyl-2-pyrrolidone, and dissolving the resin material in the dispersing solvent. Subsequently, this resin solution is applied or transferred onto at least one surface of the substrate 2. Meanwhile, the resin solution is applied or transferred while the amount of particles per unit area is adjusted so as to satisfy the condition of the present technology that the total heat capacity per unit area should be 0.0001 J/Kcm$^2$ or more. An example of the method for applying the resin solution is a method of applying the solution using a bar coater or the like. Also, an example of the method for transferring the resin solution is a method of applying the resin solution on the surface of a roller having a concavo-convex shape on the surface or the like, and transferring the resin solution onto the surface of the substrate 2. Here, the surface shape of the roller for resin solution transfer having a concavo-convex shape on the surface or the like can be made into various shapes, for which examples are illustrated in FIG. 3.

Subsequently, the substrate 2 having the resin solution applied thereon is immersed in a water bath so as to cause phase separation of the resin solution, and a heat absorbing layer 3 is formed. The resin solution applied on the surface of the substrate 2 is brought into contact with water or the like, which is a poor solvent for the resin material dissolved in the resin solution and is a good solvent for the dispersing solvent that dissolves the resin material, and the resin solution is finally dried by blowing hot air. Thereby, a separator 1 in which a heat absorbing layer 3 formed from a resin material having a three-dimensional network structure supporting particles is formed on the surface of a substrate 2, can be obtained.

When such a method is used, the heat absorbing layer 3 is formed by a rapid poor solvent-induced phase separation phenomenon, and the heat absorbing layer 3 has a structure in which the skeleton formed by the resin material is connected in a fine three-dimensional network form. That is, when a resin solution containing a dissolved resin material and also containing particles is brought into contact with a solvent such as water, which is a poor solvent for the resin material and is a good solvent for the dispersing solvent that dissolves the resin material, solvent exchange occurs. Thereby, rapid (with a high speed) phase separation accompanied by spinodal decomposition occurs, and the resin material acquires a unique three-dimensional network structure.

The heat absorbing layer 3 produced as such forms a unique porous structure as a result of utilization of a rapid poor solvent-induced phase separation phenomenon accompanied by spinodal decomposition, which is caused by a poor solvent. Furthermore, the heat absorbing layer 3 enables excellent non-aqueous liquid electrolyte impregnability and ion conductivity to be realized, due to this structure.

Meanwhile, on the occasion of forming the heat absorbing layer 3 of the present technology, various modifications as described below can be made for the first production method, in order to produce the heat absorbing layer 3 in a sparse state, and to adjust the heat capacity per volume to 3.0 J/Kcm$^3$ or less.

(i) Regulation of Solids Content Concentration in Resin Solution

Regarding the resin solution, the concentration of the solids content (total amount of the particles and the resin material) in the resin solution is adjusted to a desired concentration. As the ratio of the solids content in the resin solution is smaller, the heat absorbing layer 3 that has been completed can be brought into a more sparse state.

(ii) Regulation of Surface Shape of Heat Absorbing Layer (in Case of Coating)

In a case in which a method of coating using a bar coater or the like is used as the method for applying the resin solution, an approximately uniform layer of the resin solution is formed on the substrate 2. Here, if necessary, a concavo-convex shape may be provided on the surface of the layer of the resin solution. In a case in which a concavo-convex shape is provided on the surface of the layer of the resin solution, for example, water in a mist form (poor solvent) is brought into contact with the surface of the applied resin solution. Thereby, on the applied resin solution, the area brought into contact with water in a mist form has a concave shape, while the periphery of the area has a convex shape, and the resin solution surface is deformed into a mottled form. Also, in some parts that have been brought into contact with water, replacement of the dispersing solvent with water occurs, and the mottled surface shape is fixed. Thereafter, the substrate 2 with the resin solution applied thereon is immersed in a water bath, and thereby the entirety of the applied resin solution is subjected to phase separation. Thus, a heat absorbing layer 3 having a concavo-convex shape on the surface can be formed.

(iii) Regulation of Surface Shape of Heat Absorbing Layer (in Case of Transfer)

In a case in which a method of applying the resin solution on the surface of a roller having a concavo-convex shape on the surface or the like, and transferring the resin solution onto the surface of the substrate 2 is used, as the area proportion of convexities is smaller, a more sparse state can be obtained. The area proportion of convexities can be regulated by changing the concavo-convex shape of the surface of the roller or the like. Furthermore, as the height of convexities (difference of elevation between convexities and concavities) is larger, a more sparse state can be obtained. The height of the convexities can be regulated by the concavo-convex shape of the surface of the roller or the like and the viscosity of the resin solution. The viscosity of the resin solution can be adjusted by the solids content ratio in the resin solution.

(iv) Regulation of Conditions Upon Phase Separation of Resin Solution

When the resin solution is subjected to phase separation by immersing the substrate 2 having the resin solution applied thereof in a water bath, it is preferable to apply ultrasonic waves to the bath. As the energy of the ultrasonic waves at this time is larger, the heat absorbing layer 3 that has been completed can be brought into a more sparse state. Meanwhile, when the resin solution is subjected to phase separation, application of ultrasonic waves to the bath allows the particles or groups of particles that have formed secondary particles to be brought into a mutually independently dispersed state, which is more preferable. Furthermore, the state of the heat absorbing layer 3 can be controlled by regulating the speed of the phase separation. The speed of the phase separation can be regulated by, for example, adding a small amount of a dispersing solvent such as N-methyl-2-pyrrolidone to the solvent used at the time of the phase separation, such as water that is a good solvent for the dispersing solvent. For example, as the amount of incorporation of N-methyl-2-pyrrolidone mixed with water is larger, the speed of the phase separation is slowed, and when the phase separation is carried out using water only, the phase separation occurs most rapidly. As the speed of the phase separation is lower, the heat absorbing layer 3 that has been completed can be brought into a more sparse state.

Regarding the dispersing solvent used in the resin solution, any solvent capable of dissolving the resin material of the present technology can all be used. Examples of the dispersing solvent that can be used include, in addition to N-methyl-2-pyrrolidone, dimethylacetamide, dimethylformamide, dimethyl sulfoxide, toluene, and acetonitrile. However, from the viewpoints of dissolvability and high dispersibility, it is preferable to use N-methyl-2-pyrrolidone.

(1-2-2) Second Method for Producing Separator (Production Method Based on Drying at High Temperature)

A resin solution is obtained by mixing a resin material and particles that constitute the heat absorbing layer 3 at a predetermined mass ratio, adding the mixture to a dispersing solvent such as 2-butanone(methyl ethyl ketone; MEK) or N-methyl-2-pyrrolidone (NMP), and dissolving the mixture. Subsequently, this resin solution is applied on at least one surface of a substrate 2. Meanwhile, the resin solution is applied while the amount of particles per unit area is adjusted so as to satisfy the condition of the present technology that the total heat capacity per unit area should be 0.0001 J/Kcm$^2$ or more.

Subsequently, the substrate 2 having the resin solution applied thereon is dried by, for example, a method such as passing the substrate through a drying furnace so as to volatilize the dispersing solvent, and thus a heat absorbing layer 3 is formed. At this time, it is preferable to set the temperature at the time of drying to be sufficiently high for the dispersing solvent, so that the dispersing solvent is volatilized and gas bubbles are generated in the resin solution. In a third production method, when gas bubbles are generated in the resin solution during the drying step, gas bubbles are generated rapidly in the resin solution, and the heat absorbing layer 3 thus formed has a porous structure and has a configuration in which particles are supported and dispersed in a resin material. Furthermore, the surface of the heat absorbing layer 3 can be made to have a configuration having a concavo-convex shape in a mottled pattern by means of the generated gas bubbles.

In a case in which the heat absorbing layer 3 is formed using such a method, it is preferable to use a porous aluminosilicate such as zeolite as the particles. It is because gas is generated from the pores of the particles during the drying step, and a porous structure can be formed more effectively.

The boiling point of 2-butanone, which is an example of the dispersing solvent, is 80° C. Therefore, in the case of using 2-butanone as the dispersing solvent, when the drying temperature is set to about 100° C., 2-butanone is volatilized, and gas bubbles are generated in the resin solution. If the drying temperature is about 100° C., the substrate 2 is not damaged when the heat absorbing layer 3 is formed on the surface of the substrate 2, and therefore, it is preferable. When a resin solution which uses 2-butanone as the dispersing solvent is dried, generated gas bubbles gather and form larger bubbles, and concavities and convexities are generated. Then, the resin solution thinly covers the surface of the substrate 2 again, and thereby, the heat absorbing layer 3 is formed. Furthermore, the small gas bubbles generated in the resin solution realize the three-dimensional network structure of the resin material.

On the occasion of forming the heat absorbing layer 3 of the present technology, various modifications as described below can be made for the second production method, in order to produce the heat absorbing layer 3 in a sparse state, and to adjust the heat capacity per volume to 3.0 $J/Kcm^3$ or less. The heat capacity per unit volume of the heat absorbing layer 3 can be regulated by changing the drying conditions such as the drying temperature and the drying time for the drying process. That is, when a high drying temperature is employed in the drying process, a larger amount of gas bubbles can be generated, and the heat absorbing layer 3 that has been completed can be brought into a more sparse state. Also, similarly, when a longer drying time is employed in the drying process, a larger amount of gas bubbles can be generated, and the heat absorbing layer 3 that has been completed can be brought into a more sparse state. However, if the drying temperature is too high, or if the drying time is too long, there is a risk that the porosity of a low-porosity layer 3a may become too high, and the strength of the heat absorbing layer 3 may be insufficient. Furthermore, if the drying temperature is too low, or the drying time is too short, the extent of generation of gas bubbles is decreased, and the porosity of the heat absorbing layer 3 cannot be made higher than or equal to the porosity of the substrate 2.

The boiling point of N-methyl-2-pyrrolidone, which is an example of the dispersing solvent, is about 200° C. Therefore, in the case of using N-methyl-2-pyrrolidone as the dispersing solvent, it is necessary to adjust the drying temperature to a high temperature exceeding 200° C. Therefore, in a case in which the heat absorbing layer 3 is formed using N-methyl-2-pyrrolidone as the dispersing solvent, it is essential that the substrate 2 is constructed from a resin material having a higher melting point or thermal decomposition temperature than the boiling point of the dispersing solvent. Furthermore, as will be described below, in a case in which the heat absorbing layer 3 of the present technology is formed on the surface of at least one of the positive electrode and the negative electrode, since the positive electrode and the negative electrode have high heat resistance, N-methyl-2-pyrrolidone may be used as the dispersing solvent.

(1-2-3) Modification Examples

The heat absorbing layer 3 of the present technology may be a layer which exists at the boundary of the substrate 2 and at least one of the positive electrode and the negative electrode, and it is not necessarily required that the heat absorbing layer 3 be a partial layer (surface layer) of the separator 1. That is, as another example of the present technology, it may be considered to employ a separator having a conventional configuration (configuration including the substrate 2 only) and form the heat absorbing layer on at least one of the positive electrode surface and the negative electrode surface. In a case in which the heat absorbing layer is formed on at least one of the positive electrode surface and the negative electrode surface, it is essential that the heat absorbing layer 3 is formed on at least one of a positive electrode and a negative electrode that face each other with one sheet of separator interposed therebetween. In the case of such a configuration, the second production method can be applied as the method for forming a heat absorbing layer on an electrode surface.

Since the various materials that constitute the positive electrode current collector, the positive electrode active material layer, the negative electrode current collector, and the negative electrode current collector are materials having heat resistance for a temperature close to the boiling point of the dispersing solvent described above, the second production method is suitable.

Furthermore, for a battery which uses a gel electrolyte layer, which is a gel-like non-aqueous electrolyte, a predetermined amount of particles may be incorporated into the gel electrolyte layer so that the gel electrolyte layer also functions as a heat absorbing layer. The gel electrolyte layer contains a non-aqueous liquid electrolyte and a polymer compound for retaining the non-aqueous electrolyte. Therefore, when a gel electrolyte layer is formed by applying a precursor solution containing particles together with a non-aqueous liquid electrolyte and a polymer compound on the surfaces of the positive electrode and the negative electrode, or on the surface of the separator, a heat absorbing layer can be formed between the positive electrode and the negative electrode.

2. Second Embodiment

In the second embodiment, a cylindrical non-aqueous electrolyte battery which employs the separator according to the first embodiment is explained.

(2-1) Configuration of Non-Aqueous Electrolyte Battery

[Structure of Non-Aqueous Electrolyte Battery]

Figure 4:
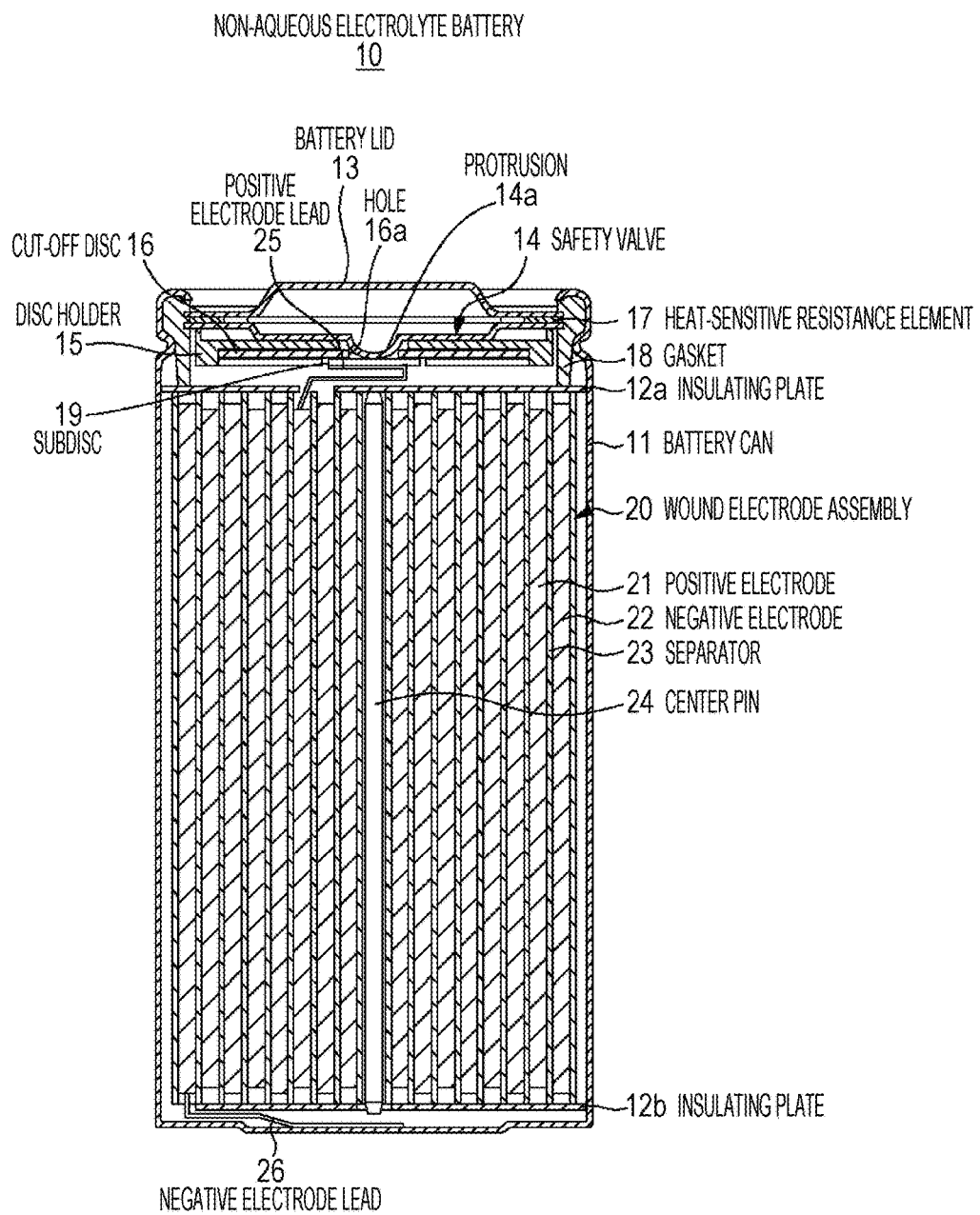
FIG. 4 is a cross-sectional diagram illustrating the configuration of a cylindrical non-aqueous electrolyte battery related to a second embodiment of the present technology.

FIG. 4 is a cross-sectional diagram illustrating an example of a non-aqueous electrolyte battery 10 according to the second embodiment. The non-aqueous electrolyte battery 10 is, for example, a non-aqueous electrolyte secondary battery capable of charging and discharging. This non-aqueous electrolyte battery 10 is a so-called cylindrical type battery, and has a wound electrode assembly 20 in which a band-shaped positive electrode 21 and a band-shaped negative electrode 22, with a separator 23 being interposed therebetween, are wound together with a liquid non-aqueous electrolyte (hereinafter, appropriately referred to as a non-aqueous liquid electrolyte) that is not shown in the diagram, inside an almost hollow cylinder-shaped battery can 11. The wound electrode assembly 20 is prone to be affected by tensile stress in the winding direction of the separator due to expansion and contraction of the active material layers. Therefore, it is preferable to apply the separator of the present technology to a non-aqueous electrolyte battery 10 having a wound electrode assembly 20.

The battery can 11 is formed from, for example, nickel-plated iron, and has one end closed while having the other end opened. Inside the battery can 11, a pair of insulating plates 12a and 12b is respectively disposed perpendicularly to the winding circumferential surface, with the wound electrode assembly 20 interposed between the insulating plates.

Examples of the material for the battery can 11 include iron (Fe), nickel (Ni), stainless steel (SUS), aluminum (Al), and titanium (Ti). This battery can 11 may have been subjected to, for example, plating of nickel or the like, in order to prevent electrochemical corrosion caused by a non-aqueous liquid electrolyte during charging and discharging of the non-aqueous electrolyte battery 10. At the open end of the battery can 11, a battery lid 13 serving as a positive electrode lead plate, and a safety valve mechanism and a heat-sensitive resistance element (PTC element: Positive Temperature Coefficient element) 17 provided on the inner side of the battery lid 13, are mounted by caulking through a gasket 18 for insulation sealing.

The battery lid 13 is formed of, for example, the same material as that of the battery can 11, and is provided with an opening for releasing the gas generated inside the battery. The safety valve mechanism has a safety valve 14, a disc holder 15, and a cut-off disc 16 superimposed in this order. A protrusion 14a of the safety valve 14 is connected to a positive electrode lead 25 led out from the wound electrode assembly 20 through a subdisc 19 that is disposed so as to cover a hole 16a provided at the center of the cut-off disc 16. As the safety valve 14 and the positive electrode lead 25 are connected through the subdisc 19, the positive electrode lead 25 is prevented from being drawn into the hole 16a at the time of reversal of the safety valve 14. Also, the safety valve mechanism is electrically connected to the battery lid 13 through a heat-sensitive resistance element 17.

The safety valve mechanism is such that when the internal pressure of the non-aqueous electrolyte battery 10 rises to a certain value or higher due to an internal short circuit in the battery or heating from the outside of the battery, the safety valve 14 is reversed, and the electrical connection between the protrusion 14a, the battery lid 13, and the wound electrode assembly 20 is cut off. That is, when the safety valve 14 is reversed, the positive electrode lead 25 is pressed by the cut-off disc 16, and the connection between the safety valve 14 and the positive electrode lead 25 is released. The disc holder 15 is formed of an insulating material, and when the safety valve 14 is reversed, the safety valve 14 and the cut-off disc 16 are insulated.

Furthermore, when more gas is generated inside the battery, and the internal pressure of the battery is further increased, a portion of the safety valve 14 is broken up, and thereby gas can be emitted to the side of the battery lid 13.

Furthermore, around the hole 16a of the cut-off disc 16, for example, plural gas venting holes (not shown in the diagram) are provided, and when gas is generated from the wound electrode assembly 20, it is configured such that gas can be effectively emitted to the side of the battery lid 13.

In regard to the heat-sensitive resistance element 17, when temperature rises, the resistance value is increased, the electric current is cut off by cutting the electrical connection between the battery lid 13 and the wound electrode assembly 20, and thus abnormal heat generation caused by an excessive current is prevented. A gasket 18 is formed of, for example, an insulating material and is coated with asphalt on the surface.

The wound electrode assembly 20 accommodated in the non-aqueous electrolyte battery 10 is wound around a center pin 24. The wound electrode assembly 20 is configured such that the positive electrode 21 and the negative electrode 22 are laminated in order, with the separator 23 being interposed therebetween, and are wound in the longitudinal direction. The positive electrode 21 is connected with a positive electrode lead 25, and the negative electrode 22 is connected with a negative electrode lead 26. The positive electrode lead 25 is electrically connected to the battery lid 13 by being welded to the safety valve 14, as described above, and the negative electrode lead 26 is electrically connected by being welded to the battery can 11.

Figure 5:
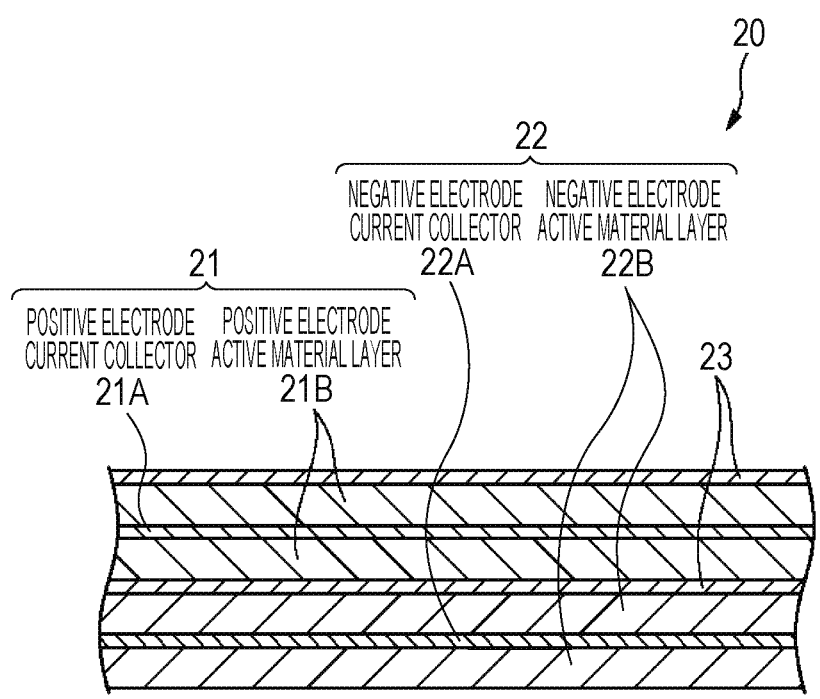
FIG. 5 is a cross-sectional diagram magnifying a portion of a wound electrode assembly that is accommodated in the cylindrical non-aqueous electrolyte battery illustrated in FIG. 4.

FIG. 5 is a magnified illustration of a portion of the wound electrode assembly 20 illustrated in FIG. 4. In the following, the positive electrode 21, the negative electrode 22, and the separator 23 will be explained in detail.

[Positive Electrode]

The positive electrode 21 is a product in which a positive electrode active material layer 21B containing a positive electrode active material is formed on both surfaces of a positive electrode current collector 21A. Regarding the positive electrode current collector 21A, for example, a metal foil such as an aluminum (Al) foil, a nickel (Ni) foil, or a stainless steel (SUS) foil can be used.

The positive electrode active material layer 21B is configured to include, for example, a positive electrode active material, a conductive agent, and a binder. Regarding the positive electrode active material, any one kind or two or more kinds of positive electrode materials capable of lithium intercalation and deintercalation can be used, and the positive electrode active material may include other materials such as a binder and a conductive agent.

The positive electrode material capable of lithium intercalation and deintercalation is preferably, for example, a lithium-containing compound. It is because a high energy density is obtained. Examples of this lithium-containing compound include composite oxides containing lithium and transition metal elements, and phosphoric acid compounds containing lithium and transition metal elements. Among them, it is preferable that the lithium-containing compound contains at least one selected from the group consisting of cobalt (Co), nickel (Ni), manganese (Mn) and iron (Fe), as the transition metal element. It is because a higher voltage is obtained.

For the positive electrode material, for example, a lithium-containing compound represented by $Li_xM1O_2$ or $Li_yM2PO_4$ can be used. In the formulas, M1 and M2 represent one or more kinds of transition metal elements. The values of x and y may vary depending on the charge-discharge state of the battery, and the values are usually such that $0.05 \leq x \leq 1.10$ and $0.05 \leq y \leq 1.10$. Examples of the composite oxides containing lithium and transition metal elements include lithium-cobalt composite oxide ($Li_xCoO_2$), lithium-nickel composite oxide ($Li_xNiO_2$), lithium-nickel-cobalt composite oxide ($Li_xNi_{1-z}Co_zO_2$ ($0<z<1$), lithium-nickel-cobalt-manganese composite oxide ($Li_xNi_{(1-v-w)}Co_vMn_wO_2$ ($0<v+w<1$, $v>0$, $w>0$)), and lithium manganese composite oxide ($LiMn_2O_4$) or a lithium-manganese-nickel composite oxide ($LiMn_{2-t}Ni_tO_4$ ($0<t<2$)), both having a spinel type structure. Among them, composite oxides containing cobalt are preferred. It is because a high capacity is obtained, and also excellent cycle characteristics are obtained. Furthermore, examples of the phosphoric acid compounds containing lithium and transition metal elements include lithium-iron phosphate compound ($LiFePO_4$) and lithium-iron-manganese phosphate compound ($LiFe_{1-u}Mn_uPO_4$ ($0<u<1$)).

Specific examples of such a lithium composite oxide include lithium cobaltate ($LiCoO_2$), lithium nickelate ($LiNiO_2$), and lithium manganate ($LiMn_2O_4$). Furthermore, a solid solution in which a portion of a transition metal element is substituted with another element can also be used. For example, nickel-cobalt composite lithium oxide ($LiNi_{0.5}Co_{0.5}O_2$, $LiNi_{0.8}Co_{0.2}O_2$, or the like) is an example thereof. These lithium composite oxides are materials which can generate high voltages and have excellent energy densities.

Moreover, from the viewpoint that superior electrode chargeability and cycle characteristics are obtained, composite particles in which the surface of particles formed from any one of the lithium-containing compounds described above is coated with fine particles formed from any one of other lithium-containing compounds, may also be used.

In addition to this, examples of the positive electrode material capable of lithium intercalation and deintercalation include oxides such as vanadium oxide ($V_2O_5$), titanium dioxide ($TiO_2$), and manganese dioxide ($MnO_2$); disulfides such as iron disulfide ($FeS_2$), titanium disulfide ($TiS_2$), and molybdenum disulfide ($MoS_2$); chalcogenides (particularly, lamellar compounds and spinel type compounds) that do not contain lithium, such as niobium diselenide ($NbSe_2$); lithium-containing compounds containing lithium; sulfur; and conductive polymers such as polyaniline, polythiophene, polyacetylene, and polypyrrole. As a matter of fact, the positive electrode material capable of lithium intercalation and deintercalation may be any material other than those described above. Furthermore, the series of positive electrode materials described above may be used as mixtures of two or more kinds in arbitrary combinations.

Regarding the conductive agent, for example, a carbon material such as carbon black or graphite is used. Regarding the binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC); and copolymers including these resin materials as main components, is used.

The positive electrode 21 has a positive electrode lead 25 that is connected to one end of the positive electrode current collector 21A by spot welding or ultrasonic welding. It is desirable that this positive electrode lead 25 is in the form of a metal foil or a mesh-shaped material; however, any material that is electrochemically and chemically stable and is capable of conduction may be used without any problem, even if the material is not a metal. Examples of the material for the positive electrode lead 25 include aluminum (Al) and nickel (Ni).

[Negative Electrode]

The negative electrode 22 has a structure in which, for example, a negative electrode active material layer 22B is provided on both surfaces of a negative electrode current collector 22A having a pair of surfaces that are opposite to each other. Meanwhile, although not shown in the diagram, it is still acceptable to provide the negative electrode active material layer 22B on only one surface of the negative electrode current collector 22A. The negative electrode current collector 22A is formed from, for example, a metal foil such as copper foil.

The negative electrode active material layer 22B is configured to include any one kind or two or more kinds of negative electrode materials capable of lithium intercalation and deintercalation as a negative electrode active material, and the negative electrode active material layer 22B may be configured to optionally include other materials such as a binder and a conductive agent similar to those of the positive electrode active material layer 21B.

Meanwhile, in this non-aqueous electrolyte battery 10, the electrochemical equivalent of the negative electrode material capable of lithium intercalation and deintercalation is larger than the electrochemical equivalent of the positive electrode 21, and theoretically, lithium metal is not supposed to be precipitated on the negative electrode 22 in the middle of charging.

Furthermore, this non-aqueous electrolyte battery 10 is designed such that the open circuit voltage (that is, the battery voltage) in a fully charged state is, for example, in the range of from 2.80 V to 6.00 V. Particularly, when a material which forms a lithium alloy at near 0 V with respect to $Li/Li^+$ is used as the negative electrode active material, it is designed such that the open circuit voltage in a fully charged state is, for example, in the range of from 4.20 V to 6.00 V. In this case, the open circuit voltage in a fully charged state is preferably set to from 4.25 V to 6.00 V. When the open circuit voltage in a fully charged state is set to 4.25 V or higher, even if the same positive electrode active material is used, the amount of lithium released per unit mass is larger compared with a battery having an open circuit voltage of 4.20 V. Therefore, the amounts of the positive electrode active material and the negative electrode active material are adjusted in accordance thereto. Thereby, a high energy density may be obtained.

Examples of the negative electrode material capable of lithium intercalation and deintercalation include carbon materials such as non-graphitizable carbon, easily graphitizable carbon, graphite, pyrolytic carbons, cokes, glassy carbons, organic polymer compound calcination products, carbon fibers, and activated carbon. Among these, examples of the cokes include pitch coke, needle coke, and petroleum coke. An organic polymer compound calcination product means a product obtained by carbonizing a polymer material such as a phenolic resin or a furan resin by calcination at an appropriate temperature, and some of the organic polymer compound calcination products are classified as non-graphitizable carbon or easily graphitizable carbon. These carbon materials are preferable because there is less change in the crystal structure occurring at the time of charging and discharging, a high charge-discharge capacity can be obtained, and satisfactory cycle characteristics can be obtained. Particularly, graphite is preferred because it has a high electrochemical equivalent and can give a high energy density. Furthermore, non-graphitizable carbon is preferred because excellent cycle characteristics are obtained. In addition, a material having a low charge-discharge potential, specifically a material having a charge-discharge potential close to that of lithium metal, is preferred because increase of the energy density of batteries can be easily realized.

Examples of other negative electrode materials that are capable of lithium intercalation and deintercalation and are capable of capacity increase include materials which are capable of lithium intercalation and deintercalation and contain at least one of metal elements and semimetal elements as a constituent element. It is because when such a material is used, a high energy density can be obtained. Particularly, when such a material is used together with a carbon material, it is more preferable because a high energy density can be obtained, and also, excellent cycle characteristics can be obtained. This negative electrode material may be a simple substance, an alloy or a compound of a metal element or a semimetal element, and may also be a material having one phase or two or more phases of these materials in at least a portion. Meanwhile, according to the present technology, alloys include alloys composed of two or more kinds of metal elements, as well as alloys containing one or more kinds of metal elements and one or more kinds of semimetal elements. Furthermore, alloys may also contain non-metal elements. The structure of an alloy may be a solid solution, a eutectic crystal (eutectic mixture), or an intermetallic compound, or two or more kinds thereof may co-exist in the structure.

Examples of the metal element or semimetal element that constitutes this negative electrode material include metal elements or semimetal elements that are capable of forming alloys with lithium. Specific examples thereof include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be in a crystalline state or may be in an amorphous state.

Examples of the negative electrode material include lithium titanate ($Li_4Ti_5O_{12}$). Furthermore, regarding the negative electrode material, a material containing a metal element or a semimetal element of Group 4B in the short period periodic table as a constituent element is preferred, and a more preferred one is a material containing at least one of silicon (Si) and tin (Sn) as a constituent element, while a particularly preferred one is a material containing at least silicon. It is because silicon (Si) and tin (Sn) have a high ability to intercalate and deintercalate lithium, and high energy densities can be obtained. Examples of the negative electrode material having at least one of silicon and tin include simple substance, an alloy or a compound of silicon, simple substance, an alloy or a compound of tin, and a material having one phase or two or more phases thereof in at least a portion thereof.

Examples of alloys of silicon include alloys containing, as a second constituent element in addition to silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of alloys of tin include alloys containing, as a second constituent element in addition to tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), and these compounds may also contain the second constituent elements described above, in addition to tin (Sn) or silicon (Si).

Among them, regarding this negative electrode material, a SnCoC-containing material that contains cobalt (Co), tin (Sn) and carbon (C) as constituent elements, has a content of carbon of from 9.9% by mass to 29.7% by mass, and has a proportion of cobalt (Co) of from 30% by mass to 70% by mass with respect to the sum of tin (Sn) and cobalt (Co), is preferred. It is because high energy densities can be obtained, and excellent cycle characteristics can be obtained in such a composition range.

This SnCoC-containing material may further contain another constituent element, if necessary. Preferred examples of the other constituent element include silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi), and the SnCoC-containing material may contain two or more kinds thereof. It is because the capacity or cycle characteristics can be further enhanced.

Meanwhile, it is preferable that this SnCoC-containing material has a phase containing tin (Sn), cobalt (Co) and carbon (C), and this phase has a structure with low crystallinity or an amorphous structure. Furthermore, it is preferable that in this SnCoC-containing material, at least a portion of carbon (C) as a constituent element is bonded to a metal element or semimetal element as another constituent element. It is because although deterioration of cycle characteristics is considered to be caused by aggregation or crystallization of tin (Sn) or the like, such aggregation or crystallization can be suppressed when carbon (C) is bonded to another element.

Regarding an analytic method of investigating the bonded state of elements, for example, X-ray photoelectron spectroscopy (XPS) may be used. In XPS, in the case of graphite, the peak of the is orbital (C1s) of carbon is observed at 284.5 eV when analyzed by an apparatus that has been subjected to energy calibration so as to obtain the peak of the 4f orbital of a gold atom (Au4f) at 84.0 eV. Furthermore, in the case of surface contamination carbon, the peak of C1s is observed at 284.8 eV. On the contrary, when the charge density of carbon element is increased, for example, when carbon is bonded to a metal element or a semimetal element, the peak of C1s is observed in a region lower than 284.5 eV. That is, in a case in which the peak of a synthetic wave of C1s obtainable from a SnCoC-containing material is observed in a region lower than 284.5 eV, at least a portion of the carbon contained in the SnCoC-containing material is bonded to a metal element or a semimetal element as another constituent element.

Meanwhile, in the XPS analysis, for example, the peak of C1s is used for the compensation of the energy axis of the spectrum. Since surface contamination carbon usually exists on the surface, the peak of C1s of the surface contamination carbon is set to 284.8 eV, and this is used as an energy reference. In the XPS analysis, since the waveform of the peak of C1s is obtained as a form including the peak of the surface contamination carbon and the peak of carbon in the SnCoC-containing material, for example, the peak of the surface contamination carbon and the peak of carbon in the SnCoC-containing material are separated by analyzing the waveform using a commercially available software. For the analysis of the waveform, the position of the main peak existing on the lowest bound energy side is designated as the energy reference (284.8 eV).

[Separator]

The separator 23 is similar to the separator 1 according to the first embodiment.

[Non-Aqueous Liquid Electrolyte]

The non-aqueous liquid electrolyte includes an electrolyte salt and a non-aqueous solvent that dissolves this electrolyte salt.

The electrolyte salt contains, for example, one kind or two or more kinds of light metal compounds such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Among them, at least one selected from the group consisting of lithium hexafluorophosphate, lithium tetrafluoroborate, lithium perchlorate, and lithium hexafluoroarsenate is preferred, and lithium hexafluorophosphate is more preferred.

Examples of the non-aqueous solvent include non-aqueous solvents, such as lactone-based solvents such as γ-butyrolactone, γ-valerolactone, δ-valerolactone, and ε-caprolactone; carbonic acid ester-based solvents such as ethylene carbonate, propylene carbonate, butylene carbonate, vinylene carbonate, dimethyl carbonate, ethyl methyl carbonate, and diethyl carbonate; ether-based solvents such as 1,2-dimethoxyethane, 1-ethoxy-2-methoxyethane, 1,2-diethoxyethane, tetrahydrofuran, and 2-methyltetrahydrofuran; nitrile-based solvents such as acetonitrile; sulfolane-based solvents; phosphoric acids and phosphoric acid ester solvents; and pyrrolidones. Regarding the solvents any one kind thereof may be used alone, or two or more kinds may be used in mixture.

Furthermore, it is preferable to use a cyclic carbonic acid ester and a chain-like carbonic acid ester in mixture as the non-aqueous solvent, and a solvent including a compound in which part or all of the hydrogen atoms of the cyclic carbonic acid ester or the chain-like carbonic acid ester have been fluorinated, is more preferred. Regarding this fluorinated compound, it is preferable to use fluoroethylene carbonate (4-fluoro-1,3-dioxolan-2-one; FEC) and difluoroethylene carbonate (4,5-difluoro-1,3-dioxolan-2-one; DFEC). It is because even in a case in which a negative electrode 22 containing a compound of silicon (Si), tin (Sn), germanium (Ge) or the like is used as the negative electrode active material, the charge-discharge cycle characteristics can be enhanced. Among them, it is preferable to use difluoroethylene carbonate as the non-aqueous solvent. It is because the cycle characteristics improving effect is excellent.

Furthermore, the non-aqueous liquid electrolyte may be in the form of a gel electrolyte by being retained in a polymer compound. The polymer compound that retains the non-aqueous liquid electrolyte may be any compound capable of absorbing a non-aqueous solvent and gelling, and examples thereof include fluorine-based polymer compounds such as polyvinylidene fluoride (PVdF) and a copolymer containing vinylidene fluoride (VdF) and hexafluoropropylene (HFP) in the repeating units; an ether-based polymer compound such as polyethylene oxide (PEO) and a crosslinked body containing polyethylene oxide (PEG); and polymer compounds including polyacrylonitrile (PAN), polypropylene oxide (PPO) and polymethyl methacrylate (PMMA) as repeating units. Regarding the polymer compounds, any one kind thereof may be used alone, or two or more kinds thereof may be used in mixture.

Particularly, a fluorine-based polymer compound is desirable from the viewpoint of oxidation-reduction stability, and among others, a copolymer containing vinylidene fluoride and hexafluoropropylene as components is preferred. Furthermore, this copolymer may include a monoester of an unsaturated dibasic acid such as maleic acid monomethyl ester (MMM), an ethylene halide such as ethylene trifluoride chloride (PCTFE), a cyclic carbonic acid ester of an unsaturated compound such as vinylene carbonate (VC), an epoxy group-containing acrylic vinyl monomer, or the like as a component. It is because superior characteristics can be obtained.

(2-2) Method for Producing Non-Aqueous Electrolyte Battery

[Method for Producing Positive Electrode]

A paste-like positive electrode mix slurry is produced by preparing a positive electrode mix by mixing a positive electrode active material, a conductive agent and a binder, and dispersing this positive electrode mix in a solvent such as N-methyl-2-pyrrolidone. Subsequently, this positive electrode mix slurry is applied on a positive electrode current collector 21A, the solvent is dried, and the assembly is compression molded using a roll pressing machine or the like to thereby form a positive electrode active material layer 21B. Thus, the positive electrode 21 is produced.

[Method for Producing Negative Electrode]

A paste-like negative electrode mix slurry is produced by preparing a negative electrode mix by mixing a negative electrode active material and a binder, and dispersing this negative electrode mix in a solvent such as N-methyl-2-pyrrolidone. Subsequently, this negative electrode mix slurry is applied on a negative electrode current collector 22A, the solvent is dried, and the assembly is compression molded using a roll pressing machine or the like to thereby form a negative electrode active material layer 22B. Thus, the negative electrode 22 is produced.

[Preparation of Non-Aqueous Liquid Electrolyte]

A non-aqueous liquid electrolyte is prepared by dissolving an electrolyte salt in a non-aqueous solvent.

[Assembling of Non-Aqueous Electrolyte Battery]

A positive electrode lead 25 is attached to the positive electrode current collector 21A by welding or the like, and also, a negative electrode lead 26 is attached to the negative electrode current collector 22A by welding or the like. Thereafter, the positive electrode 21 and the negative electrode 22 are wound, with the separator 23 of the present technology being interposed therebetween, and thus a wound electrode assembly 20 is obtained. The tip of the positive electrode lead 25 is welded to a safety valve mechanism, and the tip of the negative electrode lead 26 is welded to a battery can 11. Subsequently, the wound surface of the wound electrode assembly 20 is disposed between a pair of insulating plates 12 and 13, and the whole assembly is accommodated inside the battery can 11. After the wound electrode assembly 20 is accommodated inside the battery can 11, a non-aqueous liquid electrolyte is injected into the interior of the battery can 11, and the separator 23 is impregnated therewith. Thereafter, a battery lid 13, a safety valve mechanism composed of a safety valve 14 and the like, and a heat-sensitive resistance element 17 are fixed to the open end of the battery can 11 by caulking with a gasket 18. Thereby, the non-aqueous electrolyte battery 10 of the present technology illustrated in FIG. 4 is formed.

In this non-aqueous electrolyte battery 10, when the battery is charged, for example, lithium ions are deintercalated from the positive electrode active material layer 21B and are intercalated into the negative electrode active material layer 22B through the non-aqueous liquid electrolyte impregnated in the separator 23. Also, when the battery is discharged, for example, lithium ions are deintercalated from the negative electrode active material layer 22B and are intercalated into the positive electrode active material layer 21B through the non-aqueous liquid electrolyte impregnated in the separator 23.

<Effects>

In a cylindrical non-aqueous electrolyte battery employing the separator of the present technology, heat generated in the negative electrode, particularly heat generated in the negative electrode that uses a negative electrode active material containing at least one of a metal element and a semimetal element as a constituent element, can be absorbed by a heat absorbing layer and can also be insulated by the heat absorbing layer. Therefore, the heat generated in the negative electrode is not easily transferred to the positive electrode, and thus a thermal decomposition reaction of the positive electrode can be suppressed. Furthermore, even on the occasion of melting of the separator caused by heat generation at a high temperature, insulating properties can be maintained by the heat absorbing layer.

3. Third Embodiment

In the third embodiment, a square non-aqueous electrolyte battery which employs the separator according to the first embodiment is explained.

(3-1) Configuration of Non-Aqueous Electrolyte Battery

Figure 6:
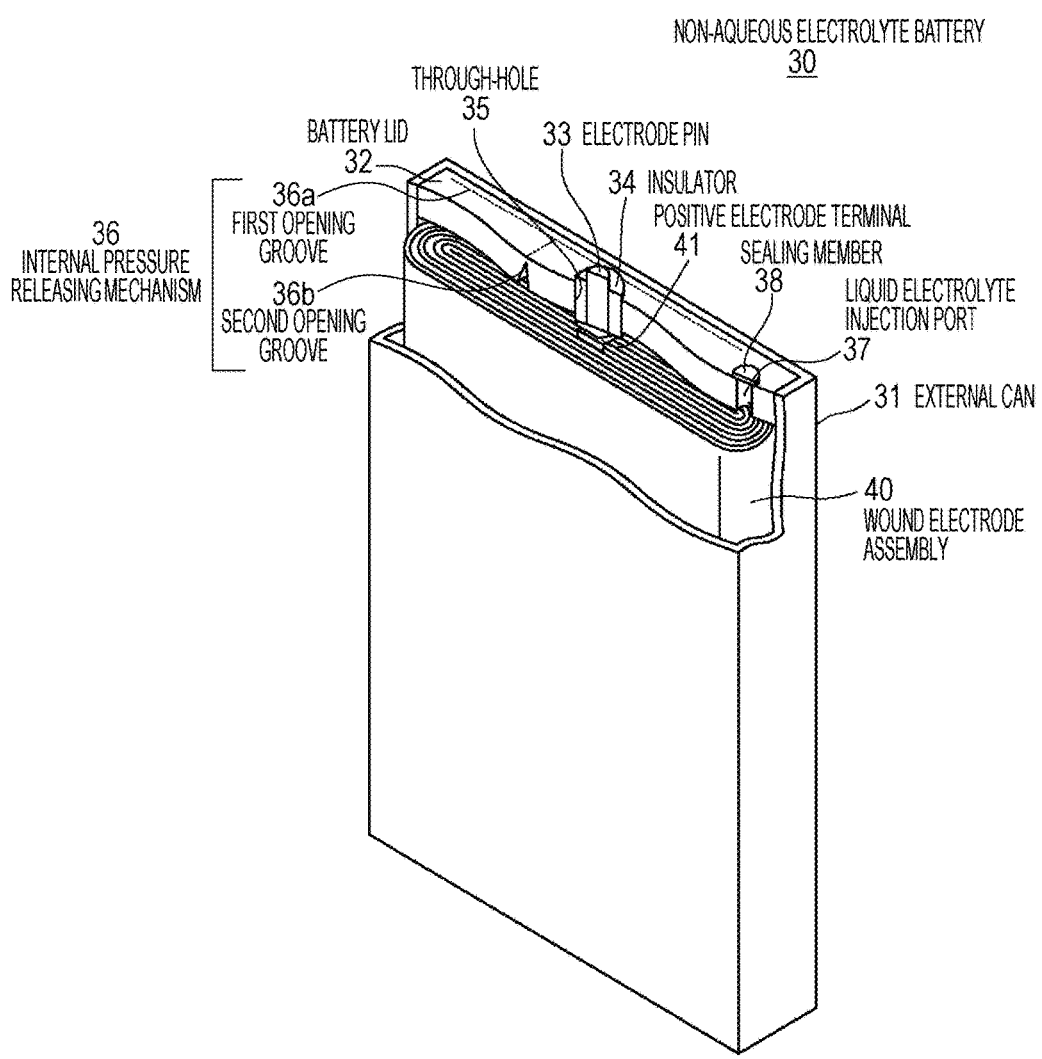
FIG. 6 is a schematic diagram illustrating the configuration of a square non-aqueous electrolyte battery related to a third embodiment of the present technology.

FIG. 6 illustrates the configuration of a non-aqueous electrolyte battery 30 according to the third embodiment. This non-aqueous electrolyte battery is a so-called square battery, and accommodates the wound electrode assembly 40 in a square outer can 31.

The non-aqueous electrolyte battery 30 is configured to include a square-shaped outer can 31; a wound electrode assembly 40, which is a power generating element, accommodated in this outer can 31; a battery lid 32 that closes the opening of the outer can 31; and an electrode pin 33 provided approximately at the center of the battery lid 32.

The outer can 31 is formed as a bottomed hollow square tube using, for example, an electrically conductive metal such as iron (Fe). The inner surface of this outer can 31 is preferably configured so as to increase electrical conductivity of the outer can 31, for example, by providing nickel plating or applying a conductive coating material. Furthermore, the outer peripheral surface of the outer can 31 may be protected by, for example, being covered with an external label formed from a plastic sheet or paper, or being coated with an insulating coating material. The battery lid 32 is formed of, for example, an electrically conductive metal such as iron (Fe) similarly to the outer can 31.

The wound electrode assembly 40 is obtained by laminating a positive electrode and a negative electrode, with a separator being interposed therebetween, and winding the laminate in an elliptic, elongated form. The positive electrode, negative electrode, separator and non-aqueous liquid electrolyte are similar to those of the first embodiment or the second embodiment, and detailed explanation will not be repeated. Furthermore, a gel-like non-aqueous electrolyte layer (gel electrolyte layer) obtained by retaining a non-aqueous liquid electrolyte in a polymer compound may be formed between the positive electrode, the separator, and the negative electrode.

The wound electrode assembly 40 having such a configuration is provided with a number of positive electrode terminals 41 connected to the positive electrode current collector, and a number of negative electrode terminals connected to the negative electrode current collector. All of the positive electrode terminals 41 and negative electrode terminals are led out to an end in the axial direction of the wound electrode assembly 40. The positive electrode terminals 41 are connected to the lower end of the electrode pin 33 by a fixing means such as welding. Furthermore, the negative electrode terminals are connected to the inner surface of the outer can 31 by a fixing means such as welding.

The electrode pin 33 is formed from an electrically conductive axial member, and is retained by an insulating body 34 in a state of having the head portion protruded to the upper end. The electrode pin 33 is fixed approximately at the center of the battery lid 32 through the insulating body 34. The insulating body 34 is formed of a material having high insulation properties, and is fitted to a through-hole 35 provided on the surface side of the battery lid 32. Furthermore, the electrode pin 33 passes through the through-hole 35, and the tips of the positive electrode terminals 41 are fixed to the lower end surface of the through-hole 35.

The battery lid 32 provided with such an electrode pin 33 and the like is fitted to the opening of the outer can 31, and the contact surface between the outer can 31 and the battery lid 32 is joined by a fixing means such as welding. Thereby, the opening of the outer can 31 is tightly sealed by the battery lid 32, and thus the outer can is constructed to be air-tight and liquid-tight. This battery lid 32 is provided with an internal pressure releasing mechanism 36 that breaks part of the battery lid 32 when the pressure inside the outer can 31 rises to a predetermined value or higher, and thereby loosens (releases) the internal pressure to the outside.

The internal pressure releasing mechanism 36 is configured to include two first opening grooves 36a (one first opening groove 36a is not shown in the diagram) extending linearly in the longitudinal direction on the inner surface of the battery lid 32; and a second opening groove 36b similarly extending in the width direction that is perpendicular to the longitudinal direction on the inner surface of the battery lid 32, with the two ends of the second opening groove 36b being in communication with the two first opening grooves 36a. The two first opening grooves 36a are installed in parallel to each other along the outer periphery of the longer edge side of the battery lid 32 in the vicinity of the inner side of two longer edges that are positioned to face the width direction of the battery lid 32. Furthermore, the second opening groove 36b is provided to be positioned approximately in the middle between the outer periphery on the side of one shorter edge in one side of the longitudinal direction of the electrode pin 33, and the electrode pin 33.

One of the first opening grooves 36a and the second opening groove 36b together form, for example, a V-shape in which the cross-section shape opens on the lower surface side. Meanwhile, the shape of the first opening groove 36a and the second opening groove 36b is not limited to the V-shape disclosed in this embodiment. For example, the shape of the first opening groove 36a and the second opening groove 36b may be a U-shape or a semicircular shape.

A liquid electrolyte injection port 37 is provided so as to pass through the battery lid 32. The liquid electrolyte injection port 37 is used to inject the non-aqueous liquid electrolyte after the battery lid 32 and the outer can 31 are caulked, and after the injection of the non-aqueous liquid electrolyte, the liquid electrolyte injection port is sealed with a sealing member 38. Therefore, in a case in which the wound electrode assembly is produced by forming a gel electrolyte between the positive electrode, the separator, and the negative electrode in advance, the liquid electrolyte injection port 37 and the sealing member 38 may not be provided.

[Separator]

The separator can have the same configuration as that of the separator 1 according to the first embodiment.

[Non-Aqueous Liquid Electrolyte]

Regarding the non-aqueous liquid electrolyte, the one described in the second embodiment can be used. Furthermore, a gel electrolyte obtained by retaining a non-aqueous liquid electrolyte in a polymer compound, such as described in the second embodiment, may also be used.

(3-2) Method for Producing Non-Aqueous Electrolyte Battery

This non-aqueous electrolyte battery can be produced, for example, as follows.

[Method for Producing Positive Electrode and Negative Electrode]

The positive electrode and the negative electrode can be produced by methods similar to those of the second embodiment.

[Assembling of Non-Aqueous Electrolyte Battery]

The positive electrode, the negative electrode, the separator of the present technology are laminated in order and wound, and thus a wound electrode assembly 40 that is wound in an elliptic, elongated form is produced. Subsequently, the wound electrode assembly 40 is accommodated in an outer can 31.

Then, an electrode pin 33 provided on the battery lid 32 and a positive electrode terminal 41 led out from the wound electrode assembly 40 are connected. Furthermore, although not shown in the diagram, a negative electrode terminal led out from the wound electrode assembly 40 and the battery can are connected. Subsequently, the outer can 31 and the battery lid 32 are fitted, a non-aqueous liquid electrolyte is injected through, for example, a liquid electrolyte injection port 37 under reduced pressure, and the battery can is sealed with a sealing member 38. Thus, a non-aqueous electrolyte battery 30 can be obtained.

<Effects>

The third embodiment can obtain effects similar to those of the second embodiment.

4. Fourth Embodiment

In the fourth embodiment, a laminate film type non-aqueous electrolyte battery employing the separator according to the first embodiment is explained.

(4-1) Configuration of Non-Aqueous Electrolyte Battery

Figure 7:
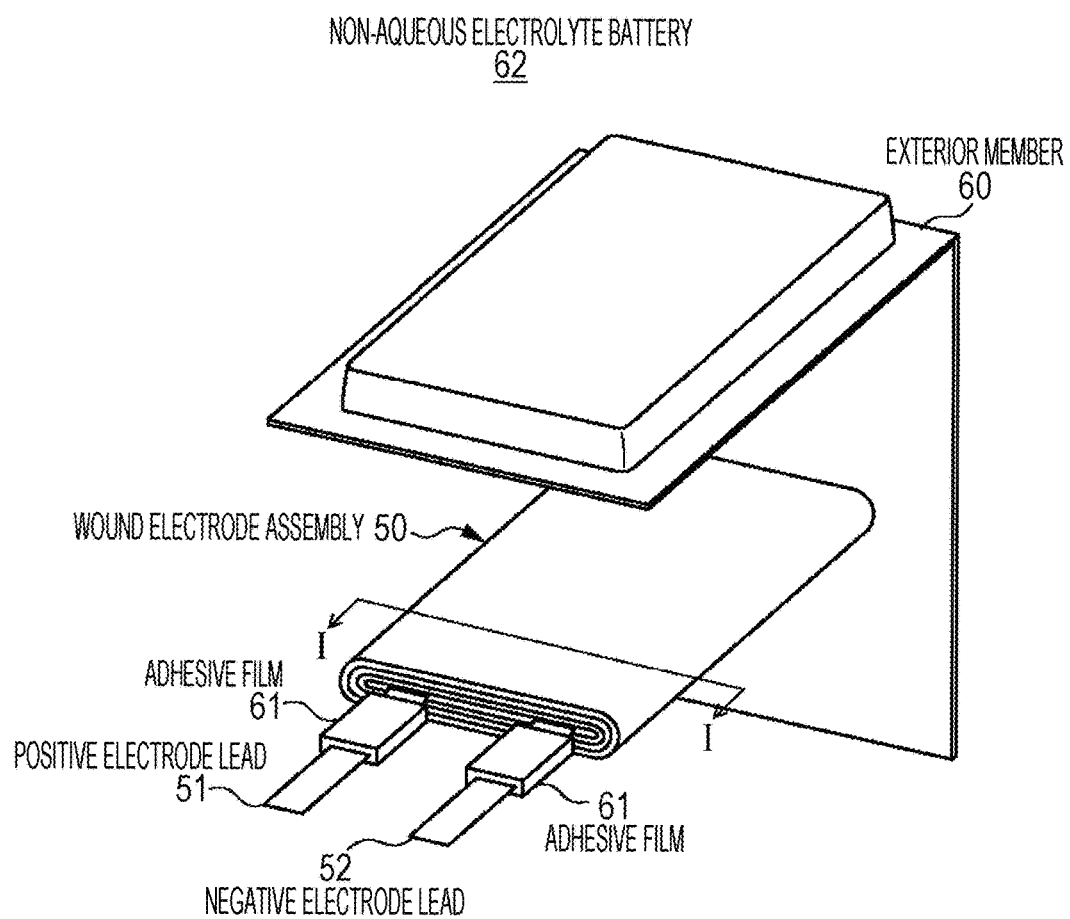
FIG. 7 is an exploded perspective view diagram illustrating the configuration of a laminate film type non-aqueous electrolyte battery related to a fourth embodiment of the present technology.

FIG. 7 illustrates the configuration of a non-aqueous electrolyte battery 62 according to the fourth embodiment. This non-aqueous electrolyte battery 62 is a so-called laminate film type, and is a product in which a wound electrode assembly 50 equipped with a positive electrode lead 51 and a negative electrode lead 52 is accommodated inside a film-like exterior member 60.

The positive electrode lead 51 and the negative electrode lead 52 are respectively led out from the interior of the exterior member 60 toward the outside, for example, in the same direction. The positive electrode lead 51 and the negative electrode lead 52 are respectively constructed from, for example, a metal material such as aluminum, copper, nickel or stainless steel, and are respectively formed in a thin plate form or a mesh form.

The exterior member 60 is formed from, for example, a laminate film in which a resin layer is formed on both surfaces of a metal layer. In the laminate film, an outer resin layer is formed on the surface that is exposed to the outside of the battery in the metal layer, and an inner resin layer is formed on the surface on the inner side of the battery, which faces the power generating element such as the wound electrode assembly 50.

The metal layer plays the most important role of blocking penetration of moisture, oxygen and light, and protecting the content, and from the viewpoints of lightness, extensibility, price, and the ease of processing, aluminum (Al) is most effectively used. The outer resin layers have good appearance, toughness, flexibility and the like, and a resin material such as nylon or polyethylene terephthalate (PET) is used. The inner resin layers are parts that are melted by heat or ultrasonic waves and are fused with each other, and therefore, a polyolefin resin is appropriate, while cast polypropylene (CPP) is frequently used. If necessary, an adhesive layer may be provided between the metal layer and the outer resin layer as well as the inner resin layer.

The exterior member 60 is provided with a recess for accommodating the wound electrode assembly 50, which is formed, for example, from the inner resin layer side toward the direction of the outer resin layer by deep drawing, and the inner resin layer is installed to face the wound electrode assembly 50. The inner resin layers facing each other in the exterior member 60 are closely adhered to each other by fusion or the like at the outer periphery of the recess. Disposed between the exterior member 60 and the positive electrode lead 51 as well as the negative electrode lead 52 is an adhesive film 61 for increasing the adhesiveness between the inner resin layer of the exterior member 60 and the positive electrode lead 51 as well as the negative electrode lead 52 formed from a metal material. The adhesive film 61 is formed from a resin material which is highly adhesive to a metal material, and the adhesive film 61 is constructed from, for example, a polyolefin resin such as polyethylene, polypropylene, or a modified polyethylene or a modified polypropylene obtained by modifying polyethylene or polypropylene.

Meanwhile, the exterior member 60 may be constructed from a laminate film having a different structure, a polymer film of polypropylene or the like, or a metal film, instead of the aluminum laminate film in which the metal layer is formed of aluminum (Al).

Figure 8:
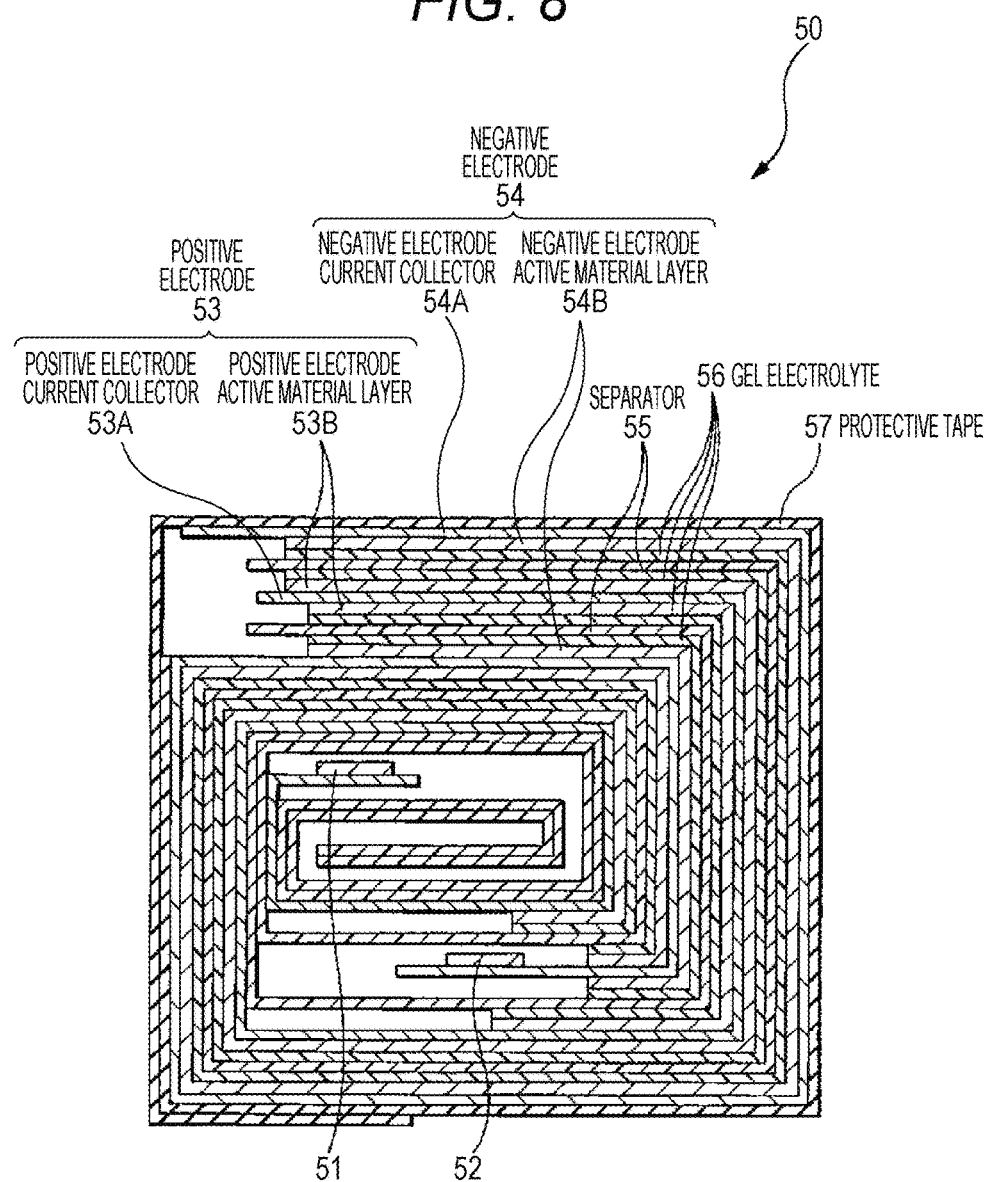
FIG. 8 is a cross-sectional diagram illustrating the cross-sectional configuration, as cut along the line I-I, of the wound electrode assembly illustrated in FIG. 7.

FIG. 8 illustrates the cross-sectional structure, which is cut along the I-I line, of the wound electrode assembly 50 illustrated in FIG. 7. The wound electrode assembly 50 is a product obtained by laminating a positive electrode 53 and the negative electrode 54, with a separator 55 and a gel electrolyte 56 being interposed therebetween, and winding the assembly, and the outermost periphery is protected by a protective tape 57 as necessary.

[Positive Electrode]

The positive electrode 53 has a structure in which a positive electrode active material layer 53B is provided on one surface or on both surfaces of a positive electrode current collector 53A. The configurations of the positive electrode current collector 53A and the positive electrode active material layer 53B are the same as those of the positive electrode current collector 21A and the positive electrode active material layer 21B of the second embodiment described above.

[Negative Electrode]

The negative electrode 54 has a structure in which a negative electrode active material layer 54B is provided on one surface or on both surfaces of a negative electrode current collector 54A, and the negative electrode active material layer 54B and the positive electrode active material layer 53B are disposed to face each other. The configurations of the negative electrode current collector 54A and the negative electrode active material layer 54B are the same as those of the negative electrode current collector 22A and the negative electrode active material layer 22B of the second embodiment described above.

[Separator]

The separator 55 is the same as the separator 1 according to the first embodiment.

[Non-Aqueous Electrolyte]

A gel electrolyte 56 is a non-aqueous electrolyte, and includes a non-aqueous liquid electrolyte and a polymer compound that serves as a retaining body retaining the non-aqueous liquid electrolyte, thus being in a so-called gel form. A gel-like electrolyte is preferable because a high ion conductivity can be obtained, and also, liquid leakage of the battery can be prevented. Meanwhile, for the non-aqueous electrolyte battery 62 according to the fourth embodiment, a non-aqueous liquid electrolyte similar to that of the second embodiment may also be used instead of the gel electrolyte 56.

(4-2) Method for Producing Non-Aqueous Electrolyte Battery

This non-aqueous electrolyte battery 62 can be produced, for example, as follows.

[Method for Producing Positive Electrode and Negative Electrode]

The positive electrode 53 and the negative electrode 54 can be produced by a method similar to that of the second embodiment.

[Assembling of Non-Aqueous Electrolyte Battery]

A precursor solution containing a non-aqueous electrolyte liquid, a polymer compound and a mixed solvent is applied on both surfaces of a positive electrode 53 and both surfaces of a negative electrode 54, the mixed solvent is volatilized, and thus a gel electrolyte 56 is formed. Thereafter, a positive electrode lead 51 is attached to an end of a positive electrode current collector 53A by welding, and also, a negative electrode lead 52 is attached to an end of the negative electrode current collector 54A by welding.

Next, the positive electrode 53 and the negative electrode 54, both having the gel electrolyte 56 formed thereon, were laminated with the separator 55 being interposed therebetween, to form a laminate, and then this laminate is wound in the longitudinal direction of the laminate. A protective tape 57 is adhered to the outermost periphery, and thus a wound electrode assembly 50 is formed. Finally, for example, the wound electrode assembly 50 is sandwiched between exterior members 60, and the outer peripheries of the exterior members 60 are sealed by adhering each other by heat fusion or the like. At that time, an adhesive film 61 is inserted between the positive electrode lead 51 as well as the negative electrode lead 52 and the exterior members 60. Thereby, the non-aqueous electrolyte battery 62 illustrated in FIG. 7 and FIG. 8 is completed.

Furthermore, this non-aqueous electrolyte battery 62 may be produced as follows. First, as described above, a positive electrode 53 and a negative electrode 54 are produced, and a positive electrode lead 51 and a negative electrode lead 52 are attached to the positive electrode 53 and the negative electrode 54. Subsequently, the positive electrode 53 and the negative electrode 54 are laminated, with a separator 55 being interposed therebetween, and wound, a protective tape 57 is adhered to the outermost periphery, and thus a wound electrode assembly 50 is formed. Next, this wound electrode assembly 50 is interposed between exterior members 60, the outer peripheral edges except one side are thermally fused to form a bag shape, and thus the wound electrode assembly 50 is accommodated inside the exterior members 60. Subsequently, a composition for electrolyte containing the monomers that serve as raw materials of a polymer compound, a polymerization initiator, and optionally other materials such as a polymerization inhibitor is prepared, together with the non-aqueous liquid electrolyte, and these are injected into the inside of the exterior member 60.

The composition for electrolyte is injected, and then the opening of the exterior members 60 is sealed by thermal fusion in a vacuum atmosphere. Next, the monomers are polymerized by applying heat, and thus a polymer compound is produced. Thereby, a gel-like gel electrolyte 56 is formed, and the non-aqueous electrolyte battery 62 illustrated in FIG. 7 and FIG. 8 is assembled.

Furthermore, in the case of using a non-aqueous liquid electrolyte instead of the gel electrolyte 56 in the non-aqueous electrolyte battery 62, a positive electrode 53 and a negative electrode 54 are laminated, with a separator 55 being interposed, and wound, a protective tape 57 is adhered to the outermost periphery, and thus a wound electrode assembly 50 is formed. Next, this wound electrode assembly 50 is sandwiched between exterior members 60, the outer peripheral edges except one side are thermally fused to form a bag shape, and the wound electrode assembly 50 is accommodated inside the exterior members 60. Subsequently, the non-aqueous liquid electrolyte is injected into the inside of the exterior members 60, the opening of the exterior members 60 is sealed by thermal fusion in a vacuum atmosphere, and thereby the non-aqueous electrolyte battery 62 is assembled.

(4-3) Other Examples of Laminate Film Type Non-Aqueous Electrolyte Battery

In the fourth embodiment, a non-aqueous electrolyte battery 62 in which the wound electrode assembly 50 is sheathed with exterior members 60 has been explained; however, a laminated electrode assembly 70 may also be used instead of the wound electrode assembly 50 as illustrated in FIG. 9A to FIG. 9C. FIG. 9A is an external appearance diagram of the non-aqueous electrolyte battery 62 accommodating the laminated electrode assembly 70. FIG. 9B is an exploded perspective view diagram illustrating the state of the laminated electrode assembly 70 accommodated in the exterior members 60. FIG. 9C is an external appearance diagram illustrating the external appearance from the bottom side of the non-aqueous electrolyte battery 62 illustrated in FIG. 9A.

Regarding the laminated electrode assembly 70, use is made of a laminated electrode assembly 70 in which a rectangular-shaped positive electrode 73 and a rectangular-shaped negative electrode 74 are laminated, with a separator 75 being interposed therebetween, and are fixed with a fixing member 76. In the laminated electrode assembly 70, a positive electrode lead 71 connected to the positive electrode 73 and a negative electrode lead 72 connected to the negative electrode 74 are led out, and an adhesive film 61 is provided between the positive electrode lead 71 as well as the negative electrode lead 72 and an exterior member 60.

Meanwhile, the method for forming the gel electrolyte 56 or the method for injecting a non-aqueous liquid electrolyte, and the method of thermally fusing the exterior member 60 are the same as those in the case of using the wound electrode assembly 50 described in section (4-2).

<Effects>

In the fourth embodiment, effects similar to those of the second embodiment can be obtained.

5. Fifth Embodiment

In the fifth embodiment, an example of a battery pack of a laminate film type non-aqueous electrolyte battery employing the separator according to the first embodiment will be explained.

The battery pack of a laminate film type non-aqueous electrolyte battery of the fifth embodiment will be explained below with reference to the drawings. Meanwhile, in the following explanation, a wound electrode assembly sheathed with a hard laminate film and a soft laminate film is referred to as a battery cell, and a battery cell connected with a circuit board and fitted with a top cover and a rear cover is referred to as a battery pack. For the battery pack and the battery cell, the protruded side of the positive electrode terminal and the negative electrode terminal is referred to as top part, the side opposite to the top part is referred to as bottom part, and the two edges excluding the top part and the bottom part are referred to as side part. Furthermore, the length in the direction of side part-side part is referred to as the width direction, and the length in the direction of top part-bottom part is referred to as height.

(5-1) Configuration of Battery Pack

Figure 10:
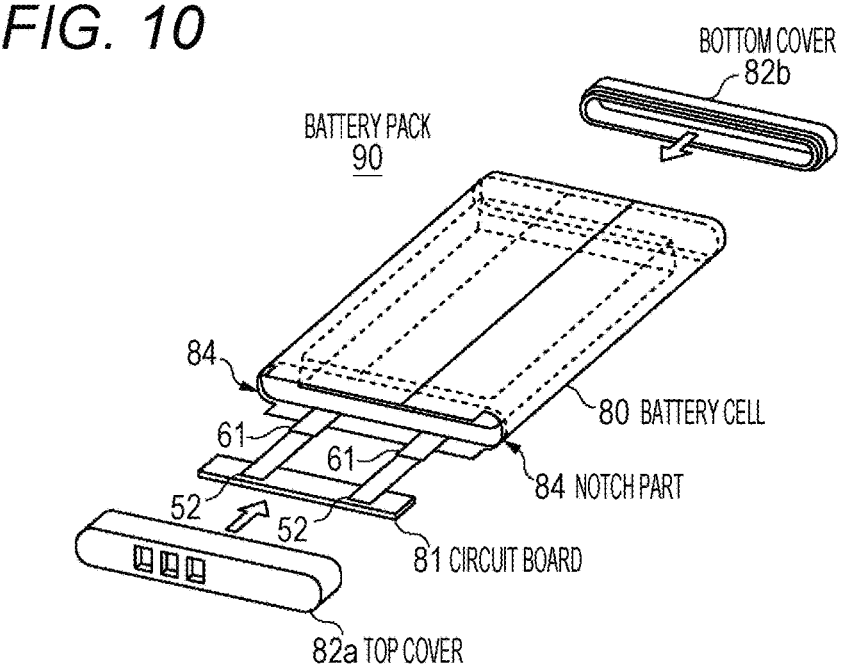
FIG. 10 is an exploded perspective view diagram illustrating the configuration of a battery pack of a laminate film type non-aqueous electrolyte battery related to a fifth embodiment of the present technology.
Figure 11:
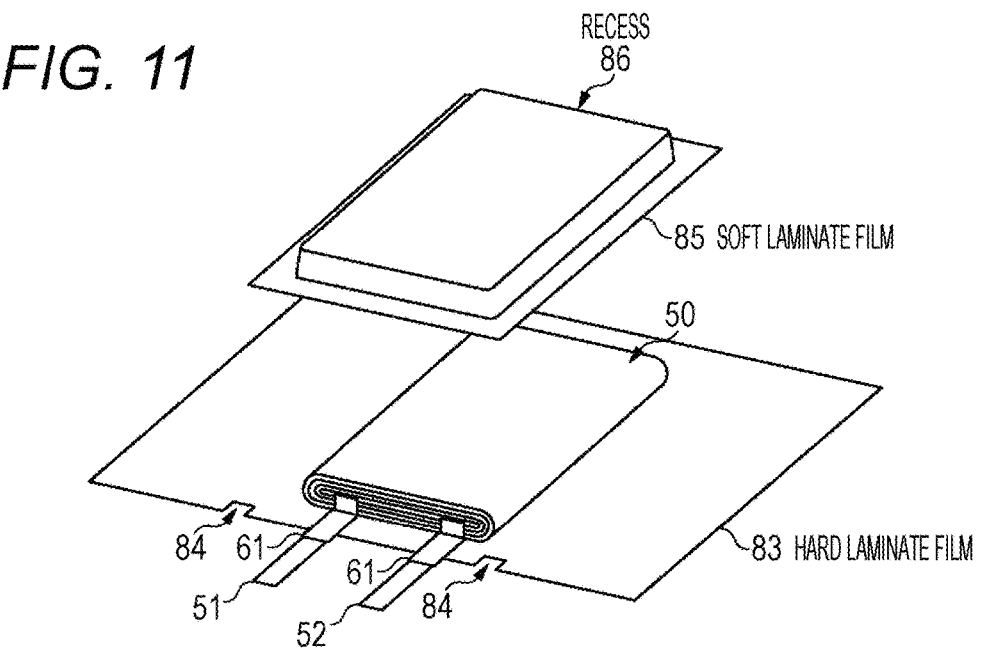
FIG. 11 is an exploded perspective view diagram illustrating the structure of a battery cell of the battery pack illustrated in FIG. 10.
Figure 12:
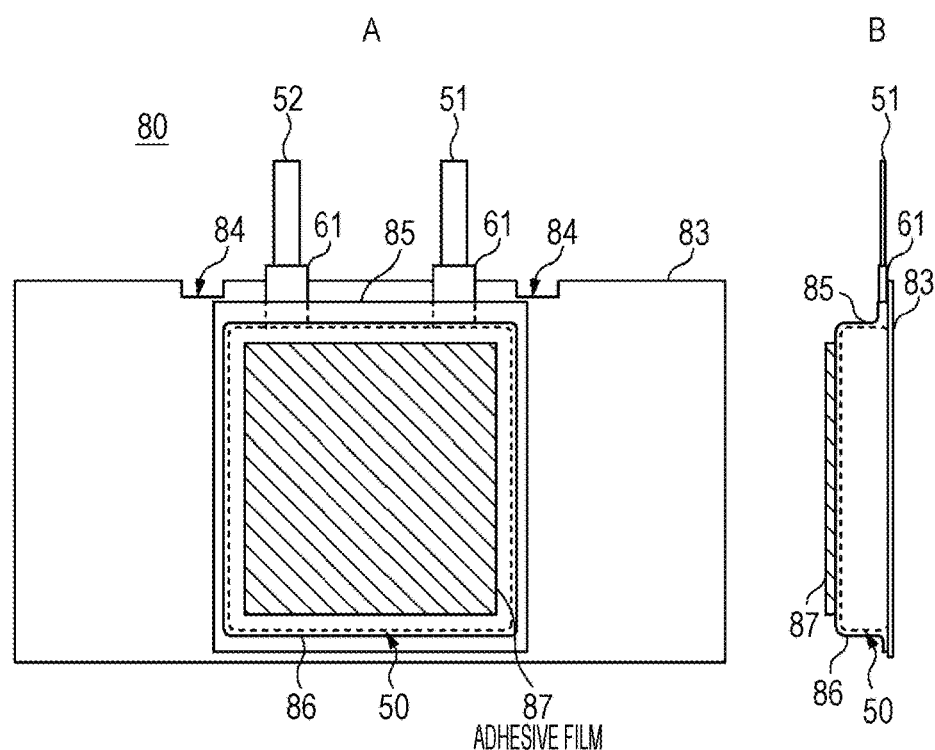
FIG. 12 is a development view diagram illustrating the structure of a battery cell of the battery pack illustrated in FIG. 10.
Figure 12:
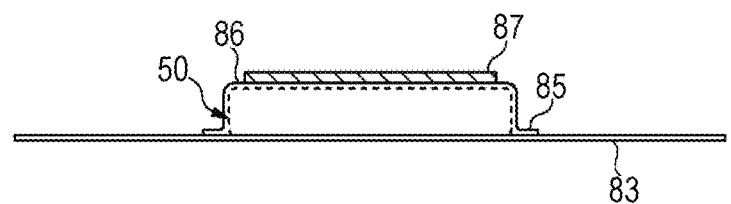
Figure 13:
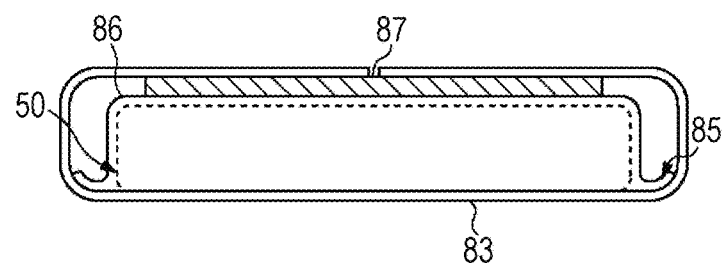
FIG. 13 is a cross-sectional diagram illustrating the structure of a battery cell of the battery pack illustrated in FIG. 10.

FIG. 10 is a perspective view diagram illustrating one configuration example of the battery pack 90 according to the fifth embodiment. FIG. 11 is an exploded perspective view diagram illustrating the structure of a battery cell 80. FIG. 12 is a top view diagram and a lateral view diagram illustrating the state in the middle of production of the battery cell 80 according to the fifth embodiment. FIG. 13 is a cross-sectional diagram illustrating the cross-sectional structure in the battery cell 80.

The battery pack 90 is, for example, a battery pack of a non-aqueous electrolyte battery having a rectangular shape or a flat shape, and as illustrated in FIG. 10, the battery pack 90 includes a battery cell 80 which has an opening formed, with two open ends, and has a wound electrode assembly 50 accommodated in an exterior material; and a top cover 82a and a bottom cover 82b respectively fitted to the openings at the two ends of the battery cell 80. Meanwhile, for the wound electrode assembly 50 accommodated in the battery pack 90, a wound electrode assembly 50 similar to that of the fourth embodiment can be used. In the battery cell 80, a positive electrode lead 51 and a negative electrode lead 52 connected to the wound electrode assembly 50 are led out from a fused area of the exterior material to the outside through an adhesive film 61, and the positive electrode lead 51 and the negative electrode lead 52 are connected to a circuit board 81.

As illustrated in FIG. 11 and FIG. 12, the exterior material has a general plate shape, and is formed from a hard laminate film 83 having a rectangular shape when viewed in the plane direction; and a soft laminate film 85 having a rectangular shape with a shorter length in the direction of the side part than that of the hard laminate film 83. The openings at the two ends of the battery cell 80 have a general rectangular shape, and the two shorter edges of the opening bulge out so as to form an elliptic arc toward the outer side.

The battery cell 80 is formed from a soft laminate film 85 provided with a recess 86; a wound electrode assembly 50 accommodated in the recess 86; and a hard laminate film 83 provided so as to cover the opening of the recess 86 accommodating the wound electrode assembly 50. The hard laminate film 83 is set such that while the hard laminate film 83 wraps the recess 86 accommodating the wound electrode assembly 50, the shorter edges on both sides are in close contact or are separated apart with a slight gap to face each other. Furthermore, the longer edges on the top side of the hard laminate film 83 may be provided with notch parts 84 as illustrated in FIG. 11 and FIG. 12. The notch parts 84 are provided so as to be positioned on the two shorter edges of the battery cell 80 as viewed from the front. When the notch parts 84 are provided, fitting of the top cover 82a can be made easier.

Furthermore, at the sealed part where the hard laminate film 83 and the soft laminate film 85 are sealed, a positive electrode lead 51 and a negative electrode lead 52 that are electrically connected to the positive electrode 53 and the negative electrode 54 of the wound electrode assembly 50, respectively, are led out.

The top cover 82a and the bottom cover 82b have a shape capable of fitting to the openings at both ends of the battery cell 80, and specifically, when viewed from the front, the top cover 82a and the bottom cover 82b have a general rectangular shape, with the two shorter edges bulging so as to form an elliptic arc toward the outer side. Meanwhile, the front means the direction of viewing the battery cell 80 from the top side.

[Exterior Material]

As illustrated in FIG. 11 and FIG. 12, this exterior material is formed from a soft laminate film 85 provided with a recess 86 for accommodating the wound electrode assembly 50; and a hard laminate film 83 that is superimposed on this soft laminate film 85 so as to cover the recess 86.

[Soft Laminate Film]

The soft laminate film 85 has a configuration similar to that of the exterior member 60 according to the fourth embodiment. Particularly, the soft laminate film 85 has a feature that a soft metal material, for example, annealing-treated aluminum (JIS A8021P-O) or (JIS A8079P-O) is used as the metal layer.

[Hard Laminate Film]

The soft laminate film 85 has a function of maintaining the shape after bending, and withstanding deformations from the outside. Therefore, the soft laminate film has a feature that a hard metal material, for example, a metal material such as aluminum (Al), stainless steel (SUS), iron (Fe), copper (Cu) or nickel (Ni), is used as the metal layer, and particularly, hard aluminum that has not been annealing-treated (JIS A3003P-H18) or (JIS A3004P-H18), austenite-based stainless steel (SUS304), or the like is used.

[Wound Electrode Assembly]

The wound electrode assembly 50 may have a configuration similar to that of the fourth embodiment. Furthermore, the laminated electrode assembly 70 explained as another example of the fourth embodiment may also be used.

[Non-Aqueous Liquid Electrolyte and Gel Electrolyte]

The non-aqueous liquid electrolyte that is injected into the battery cell 80, or the gel electrolyte formed at the surfaces of the positive electrode 53 and the negative electrode 54 can have a configuration similar to that of the second embodiment.

[Separator]

Regarding the separator 55, the separator 1 of the present technology can be used. Furthermore, the separator may have a configuration in which the substrate 2 according to the first embodiment is used as the separator, and a heat absorbing layer 3 is provided at the surfaces of the positive electrode 53 and the negative electrode 54.

[Circuit Board]

A circuit board 81 is electrically connected with the positive electrode lead 51 and the negative electrode lead 52 of the wound electrode assembly 50. On the circuit board 81, a protection circuit including a temperature protection element such as a fuse, a heat-sensitive resistance element (Positive Temperature Coefficient: PTC element), or a thermistor, as well as an ID resistance for identifying the battery pack, and the like are mounted, and plural (for example, three) contact points are further formed thereon. The protection circuit is provided with a charge-discharge control FET (Field Effect Transistor), an IC (Integrated Circuit) that performs monitoring of the battery cell 80 and the control of the charge-discharge control FET, and the like.

A heat-sensitive resistance element is connected in series to the wound electrode assembly, and when the temperature of the battery is higher compared to the set temperature, the electrical resistance is rapidly increased, and the current that flows through the battery is substantially cut off. A fuse is also connected in series to the wound electrode assembly, and when an overcurrent flows through the battery, the fuse undergoes fusion cutting caused by the current flowing therethrough and cuts the current off. Furthermore, the fuse is provided with a heater resistance in its vicinity, and at the time of excess voltage, the fuse undergoes fusion cutting as the temperature of the heater resistance is increased, and cuts the current off.

Furthermore, when the terminal voltage of the battery cell 80 becomes higher than or equal to the charge inhibiting voltage, which is higher than the full charge voltage, there is a possibility that the battery cell 80 may be in a hazardous condition leading to heat generation, ignition, or the like. Therefore, the protecting circuit monitors the voltage of the battery cell 80, and when the battery cell 80 reaches the charge inhibiting voltage, the protection circuit inhibits charging by turning off the charging control FET. Furthermore, when the terminal voltage of the battery cell 80 is over-discharged to a value lower than or equal to the discharge inhibiting voltage, and the voltage of the battery cell 80 reaches 0 V, there is a possibility that the battery cell 80 may be in an internal short circuit condition, and recharging may become unfeasible. Therefore, the protection circuit monitors the voltage of the battery cell 80, and when the voltage reaches the discharge inhibiting voltage, the protection circuit inhibits discharging by turning off the discharging control FET.

[Top Cover]

The top cover 82a is fitted to the top side opening of the battery cell 80, and a side wall for fitting to the top side opening is provided along a portion or the entirety of the outer periphery of the top cover 82a. The battery cell 80 and the top cover 82a are thermally fused with the side wall of the top cover 82a and the end inner surface of the hard laminate film 83, and are thus adhered.

The circuit board 81 is accommodated in the top cover 82a. The top cover 82a is provided with plural openings at positions corresponding to the contact points of the circuit board 81 so that the plural contact points are exposed to the outside. The contact points of the circuit board 81 are brought into contact with an electronic apparatus through the openings of the top cover 82a. Thereby, the battery pack 90 and the electronic apparatus are electronically connected. Such a top cover 82a is produced in advance by injection molding.

[Bottom Cover]

The bottom cover 82b is fitted to the opening on the bottom side of the battery cell 80, and is provided with a side wall for fitting to the opening on the bottom side along a portion or the entirety of the outer periphery of the bottom cover 82b. The battery cell 80 and the bottom cover 82b are thermally fused to the side wall of the bottom cover 82b and an end inner surface of the hard laminate film 83, and are thus adhered.

Such a bottom cover 82b is produced in advance by injection molding. Furthermore, a method of installing the battery cell 80 in a mold, pouring a hot melt resin into the bottom part, and thereby integrally molding the bottom cover with the battery cell 80 can also be used.

(5-2) Method for Producing Battery Pack

[Production of Battery Cell]

The wound electrode assembly 50 is accommodated in the recess 86 of the soft laminate film 85, and the hard laminate film 83 is disposed so as to cover the recess 86. At this time, the hard laminate film 83 and the soft laminate film 85 are disposed such that the inner resin layer of the hard laminate film 83 and the inner resin layer of the soft laminate film 85 face each other. Thereafter, the hard laminate film 83 and the soft laminate film 85 are sealed along the periphery of the recess 86. Sealing is carried out by thermally fusing the inner resin layer of the hard laminate film 83 and the inner resin layer of the soft laminate film 85 under reduced pressure, using a heater head made of metal that is not shown in the diagram.

When the inner resin layer of the hard laminate film 83 and the inner resin layer of the soft laminate film 85 are thermally fused under reduced pressure, a non-aqueous liquid electrolyte is injected through one edge that is not thermally fused. Alternatively, the wound electrode assembly 50 may be formed by forming a gel electrolyte in advance on both surfaces of the positive electrode and both surfaces of the negative electrode.

Next, as illustrated in FIG. 13, the hard laminate film 83 is deformed such that the shorter edges of the hard laminate film 83 are brought into contact. At this time, an adhesive film 87 formed from a resin material having high adhesiveness to both the inner resin layer of the hard laminate film 83 and the outer resin layer of the soft laminate film 85, is inserted between the hard laminate film 83 and the soft laminate film 85. Subsequently, when one surface at which the joint of the shorter edges of the hard laminate film 83 is positioned is heated with a heater head, the inner resin layer of the hard laminate film 83 and the outer resin layer of the soft laminate film 85 are thermally fused, and thus the battery cell 80 is obtained. Meanwhile, instead of using the adhesive film 87, an adhesive layer formed from a resin having high adhesiveness to the outer resin layer of the soft laminate film 85 may be provided on the surface of the inner resin layer of the hard laminate film 83, and the adhesive layer may be thermally fused.

[Production of Battery Pack]

Subsequently, the positive electrode lead 51 and the negative electrode lead 52 led out from the battery cell 80 are connected to the circuit board 81, subsequently the circuit board 81 is accommodated in the top cover 82a, and the top cover 82a is fitted to the opening on the top side of the battery cell 80. Furthermore, the bottom cover 82b is fitted to the opening on the bottom side of the battery cell 80.

Finally, the fitting parts of the top cover 82a and the bottom cover 82b are respectively heated using a heater head, and the top cover 82a and the bottom cover 82b are thermally fused with the inner resin layer of the hard laminate film 83. Thereby, the battery pack 90 is produced.

<Effects>

In the fifth embodiment, effects similar to those of the second embodiment can be obtained.

6. Sixth Embodiment

In the sixth embodiment, a battery pack which includes a non-aqueous electrolyte battery employing the separator according to the first embodiment will be explained.

Figure 14:
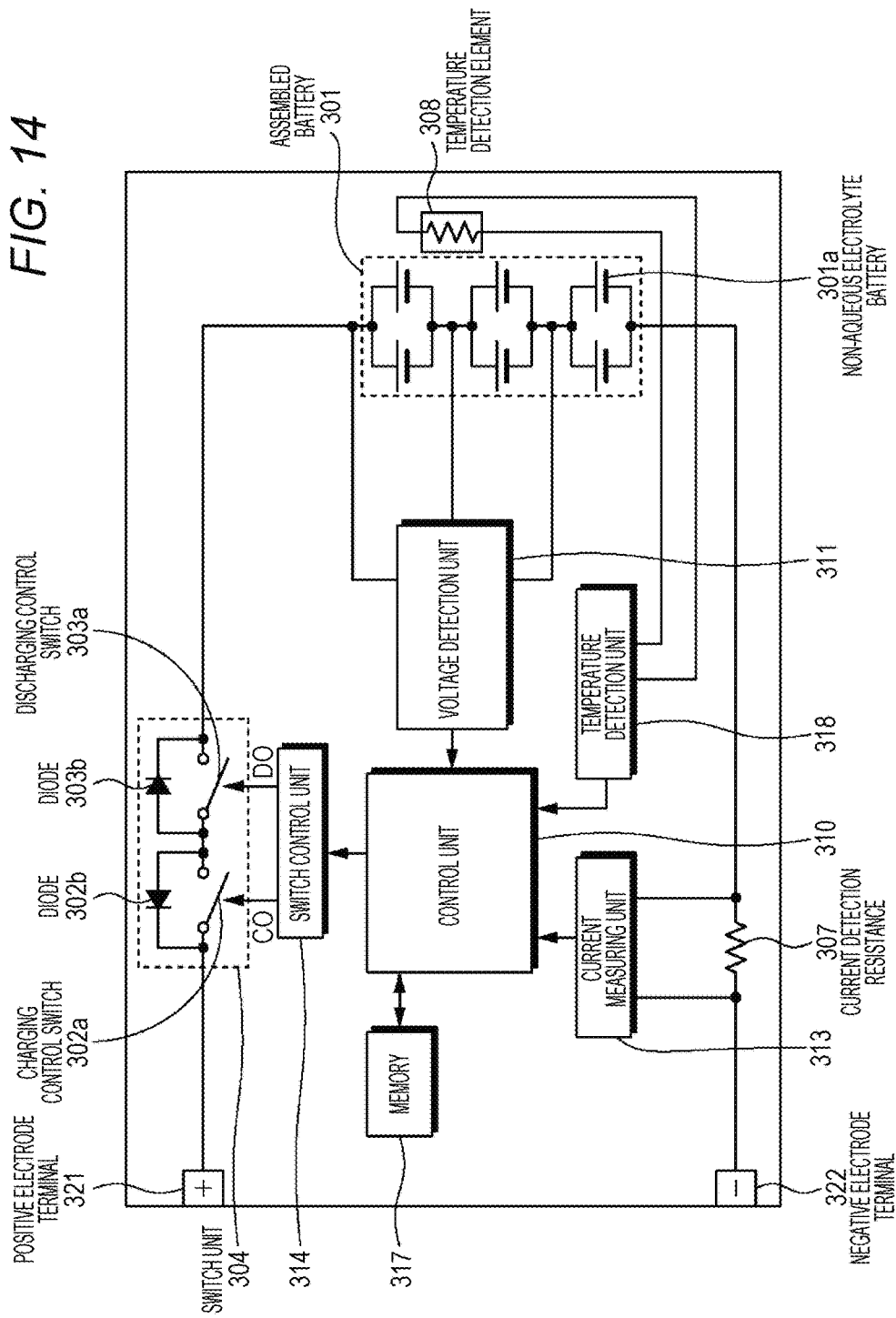
FIG. 14 is a block diagram illustrating a circuit configuration example of the battery pack according to an embodiment of the present technology.

FIG. 14 is a block diagram illustrating an example of the circuit configuration in a case in which the non-aqueous electrolyte battery of the present technology is applied to a battery pack. The battery pack includes an assembled battery 301, an exterior material, a switch unit 304 including a charging control switch 302a and a discharging control switch 303a, a current detection resistance 307, a temperature detection element 308, and a control unit 310.

Furthermore, the battery pack includes a positive electrode terminal 321 and a negative electrode terminal 322, and at the time of charging, the positive electrode terminal 321 and the negative electrode terminal 322 are connected to the positive electrode terminal and the negative electrode terminal of a battery charger, respectively, and charging is carried out. Furthermore, at the time of using an electronic apparatus, the positive electrode terminal 321 and the negative electrode terminal 322 are connected to the positive electrode terminal and the negative electrode terminal of an electronic apparatus, respectively, and discharging is carried out.

The assembled battery 301 is composed of plural non-aqueous electrolyte batteries 301a connected in series and/or in parallel. This non-aqueous electrolyte battery 301a is a non-aqueous electrolyte battery of the present technology. Meanwhile, FIG. 14 illustrates an example in which six non-aqueous electrolyte batteries 301a are connected in two-parallel three-serial (2P3S) connection; however, in addition to that, any connection method such as n-parallel m-serial (wherein n and m represent integers) connection may also be used.

The switch unit 304 includes a charging control switch 302a, a diode 302b, a discharging control switch 303a, and a diode 303b, and is controlled by the control unit 310. The diode 302b has polarity in the reverse direction with respect to the charging current that flows in the direction from the positive electrode terminal 321 to the assembled battery 301, and in the forward direction with respect to the discharging current that flows in the direction from the negative electrode terminal 322 to the assembled battery 301. The diode 303b has polarity in the forward direction with respect to the charging current, and in the reverse direction with respect to the discharging current. Meanwhile, in this example, the switch unit is provided on the plus (+)-side; however, the switch unit may also be provided on the minus (−)-side.

The charging control switch 302a is controlled by the charge-discharge control unit such that the charging control switch is turned off when the battery voltage reaches the overcharge detection voltage, and no charging current flows through the current path of the assembled battery 301. After the turning-off of the charging control switch, only discharging is enabled by means of the diode 302b. Furthermore, the charging control switch 302a is controlled by the control unit 310 such that the charging control switch is turned off when a large current flows at the time of charging, and cuts off the charging current that flows through the current path of the assembled battery 301.

The discharging control switch 303a is controlled by the control unit 310 such that the discharging control switch is turned off when the battery voltage reaches the overdischarge detection voltage, and no discharging current flows through the current path of the assembled battery 301. After the turning-off of the discharging control switch 303a, only charging is enabled by means of the diode 303b. Furthermore, the discharging control switch 303a is controlled by the control unit 310 such that the discharging control switch is turned off when a large current flows at the time of discharging, and cuts off the discharging current that flows through the current path of the assembled battery 301.

The temperature detection element 308 is, for example, a thermistor, and is provided in the vicinity of the assembled battery 301. The temperature detection element 308 measures the temperature of the assembled battery 301 and supplies the measured temperature to the control unit 310. A voltage detection unit 311 measures the voltages of the assembled battery 301 and the various non-aqueous electrolyte batteries 301a that constitute the assembled battery, performs A/D conversion of these measured voltages, and supplies the resultant values to the control unit 310. A current measuring unit 313 measures the current using the current detection resistance 307, and supplies the measured current to the control unit 310.

A switch control unit 314 controls the charging control switch 302a and the discharging control switch 303a of the switch unit 304 based on the voltages and currents input from the voltage detection unit 311 and the current measuring unit 313. The switch control unit 314 prevents overcharging, overdischarging, and overcurrent charge-discharge by sending control signals to the switch unit 304 when the voltages of some of the non-aqueous electrolyte batteries 301a reach a value lower than or equal to the overcharge detection voltage or the overdischarge detection voltage, and when a large current flows rapidly.

Here, for example, when the non-aqueous electrolyte battery is a lithium ion secondary battery, and a material which forms a lithium alloy at near 0 V with respect to Li/Li$^+$ is used as the negative electrode active material, the overcharge detection voltage is set to, for example, 4.20 V±0.05 V, and the overdischarge detection voltage is set to, for example, 2.4 V±0.1 V.

For the charge-discharge switch, for example, a semiconductor switch such as a MOSFET can be used. In this case, parasitic diodes of the MOSFET function as diodes 302b and 303b. When a P-channel type FET is used as the charge-discharge switch, the switch control unit 314 supplies control signals DO and CO respectively to the respective gates of the charging control switch 302a and the discharging control switch 303a. When the charging control switch 302a and the discharging control switch 303a are of P-channel type, the switches are turned on by a gate potential lower than the source potential by a predetermined value or more. That is, in a conventional charging and discharging operation, the control signals CO and DO are adjusted to a low level, and the charging control switch 302a and the discharging control switch 303a are brought to the on-state.

For example, at the time of overcharging or overdischarging, the control signals CO and DO are adjusted to a high level, and the charging control switch 302a and the discharging control switch 303a are brought to the off-state.

A memory 317 is composed of a RAM or a ROM, and is composed of, for example, EPROM (Erasable Programmable Read Only Memory), which is a non-volatile memory. In the memory 317, the values computed at the control unit 310, the internal resistance values of the batteries in the initial state of the various non-aqueous electrolyte batteries 301a measured in the stages of the production process, and the like are stored in advance, and rewriting can also be appropriately achieved. Furthermore, by causing the memory to store the full charge capacity of the non-aqueous electrolyte battery 301a, for example, the residual capacity can be calculated together with the control unit 310.

A temperature detection unit 318 measures the temperature using the temperature detection element 308, performs the charge-discharge control at the time of abnormal heat generation or performs compensation in the calculation of the residual capacity.

7. Seventh Embodiment

In the seventh embodiment, apparatuses such as an electronic apparatus, an electric vehicle, and a power storage device, which are equipped with the non-aqueous electrolyte battery according to the second to fourth embodiments and the battery pack according to the fifth and sixth embodiments, will be explained. The non-aqueous electrolyte battery and the battery pack explained in the second to fifth embodiments can be used to supply electric power to apparatuses such as an electronic apparatus, an electric vehicle, and a power storage device.

Examples of the electronic apparatus include a laptop computer, a PDA (personal digital assistant), a mobile telephone, a cordless phone headset, a video movie camera, a digital still camera, an electronic book, an electronic dictionary, a music player, a radio, a headphone, a game player, a navigator system, a memory card, a pacemaker, a hearing aid, an electric tool, an electric shaver, a refrigerator, an air conditioner, a television, a stereo system, a water heater, an electromagnetic range, a dish washer, a washing machine, a dryer, a lighting device, a toy, a medical instrument, a robot, a road conditioner, and a signal mechanism.

Furthermore, examples of the electric vehicle include a railway vehicle, a golf cart, an electric cart, and an electric car (including a hybrid car). The battery and battery pack are used as power supplies for driving or auxiliary power supplies.

Examples of the power storage device include power supplies for electric power storage for constructions including houses, or for power generation facilities.

In the following description, among the application examples described above, a specific example of a power storage system using a power storage device to which the non-aqueous electrolyte battery of the present technology is applied will be explained.

This power storage system has, for example, a configuration such as described below. A first power storage system is a power storage system in which a power storage device is charged by a power generation device that implements power generation from a renewable energy. A second power storage system is a power storage system which has a power storage device and supplies electric power to an electronic apparatus that is connected to a power storage device. A third power storage system is an electronic apparatus which receives the supply of electric power from a power storage device. These power storage systems are carried out as systems that promote efficient supply of electric power in cooperation with an external electric power supply network.

Furthermore, a fourth power storage system is an electric vehicle having a conversion device which receives supply of electric power from a power storage device and converts electric power to the driving force of a vehicle; and a control device which performs information processing related to the vehicle control according to the information related to the power storage device. A fifth power storage system is an electric power system which includes a power information transmission/reception unit that transmits and receives signals through a network with other apparatuses, and performs charge-discharge control of the power storage device described above, based on the information received by the transmission/reception unit. A sixth power storage system is an electric power system which receives supply of electric power from the power storage device described above or supplies electric power from a power generation device or a power network to a power storage device. Hereinafter, power storage systems will be explained.

(7-1) Power Storage System in House as Application Example

Figure 15:
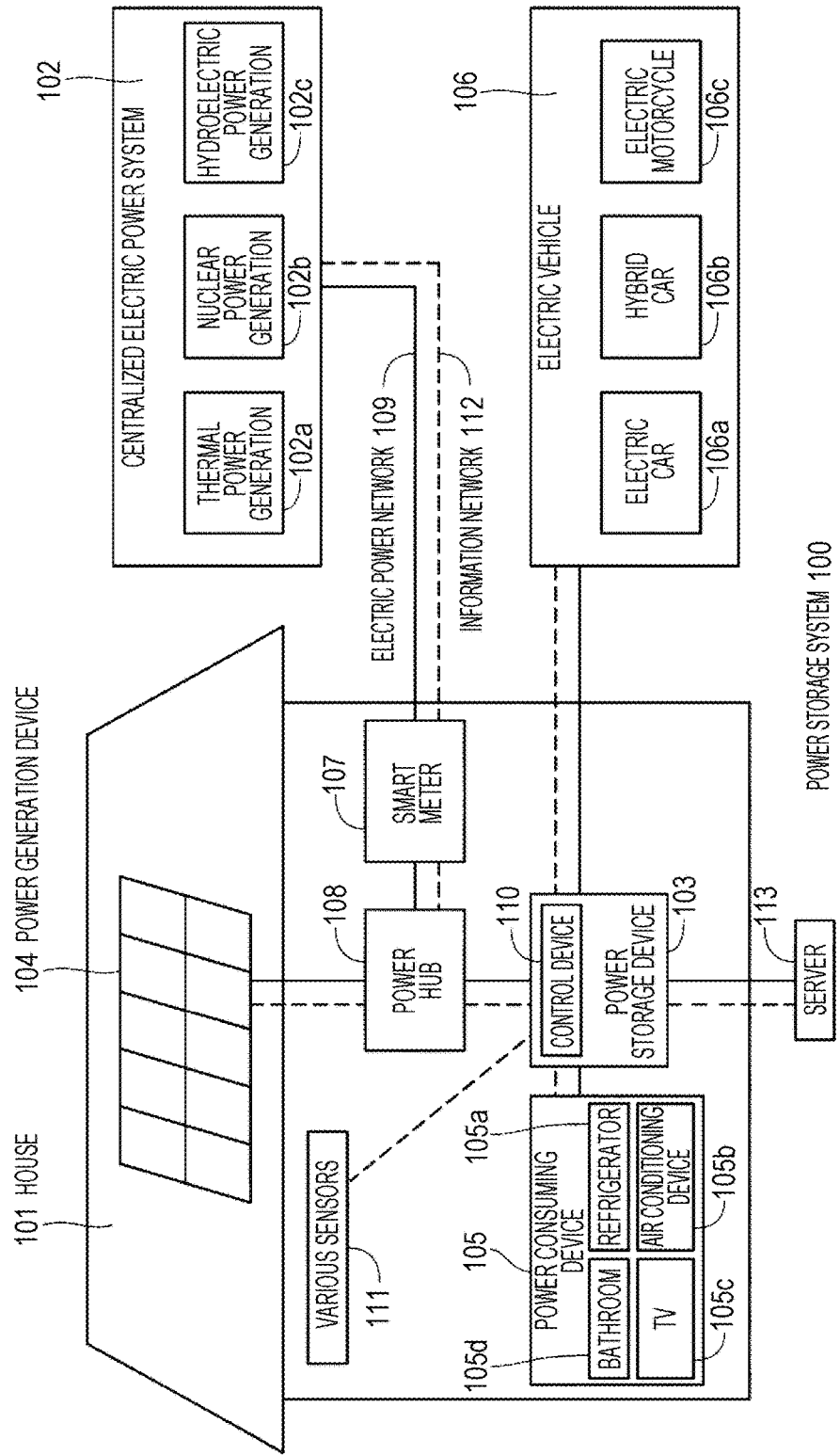
FIG. 15 is an outline diagram illustrating an example of applying the non-aqueous electrolyte battery of the present technology to a power storage system for houses.

An example of applying a power storage device which uses the non-aqueous electrolyte battery of the present technology to a power storage system for houses, is explained with reference to FIG. 15. For example, in a power storage system 100 for a house 101, electric power is supplied from a centralized electric power system 102 such as a thermal power station 102*a*, a nuclear power station 102*b*, or a hydroelectric power station 102*c*, to a power storage device 103 through an electric power network 109, an information network 112, a smart meter 107, a power hub 108 or the like. Together with this, electric power is supplied from an independent power source such as a domestic power generation device 104 to the power storage device 103. The electric power supplied to the power storage device 103 is stored. The electric power used in the house 101 is supplied using the power storage device 103. A similar power storage system can be used in buildings as well, without being limited to the house 101.

The house 101 is provided with a domestic power generation device 104, a power consuming device 105, a power storage device 103, a control device 110 that controls various devices, a smart meter 107, and a sensor 111 that acquires various types of information. The various devices are connected by an electric power network 109 and an information network 112. A solar cell, a fuel cell or the like is used as the domestic power generation device 104, and the electric power thus generated is supplied to the power consuming device 105 and/or power storage device 103. Examples of the power consuming device 105 include a refrigerator 105*a*, an air conditioning device 105*b*, a television receiver 105*c*, and a bathroom 105*d*. Furthermore, the power consuming device 105 includes an electric vehicle 106. Examples of the electric vehicle 106 include an electric car 106*a*, a hybrid car 106*b*, and an electric motorcycle 106*c*.

In the power storage device 103, the non-aqueous electrolyte battery of the present technology is applied. The non-aqueous electrolyte battery of the present technology may be configured to include, for example, the lithium ion secondary battery described above. The smart meter 107 has a function of measuring the amount of commercial electric power used, and transmits the amount of use thus measured to the power company. The electric power network 109 may use any one of direct current power supply, alternating current power supply, and non-contact power supply, or any combination of plural modes thereof.

Examples of various sensors 111 include a motion sensor, an illuminance sensor, an object detection sensor, a power consumption sensor, a vibration sensor, a contact sensor, a temperature sensor, and an infrared sensor. The information acquired by various sensors 111 are transmitted to the control device 110. The weather condition, the condition of a person and the like are understood based on the information obtained from the sensors 111, the power consuming device 105 is automatically controlled, and thus energy consumption can be minimized. Furthermore, the control device 110 can transmit the information on the house 101 to an external electric power company or the like through the internet.

The power hub 108 achieves processing such as branching of the electric power lines and direct current-alternating current conversion. Examples of the communication modes of an information network 112 that is connected to the control device 110 include a method of using a communication interface such as UART (Universal Asynchronous Receiver-Transceiver: transmission and reception circuit for asynchronous serial communication); and a method of utilizing a sensor network based on wireless communication standards such as Bluetooth, ZigBee, and Wi-Fi. The Bluetooth mode can be applied to multimedia communications, and one-to-many connection communication can be performed. ZigBee uses a physical layer of IEEE (Institute of Electrical and Electronics Engineers) 802.15.4. IEEE 802.15.4 is the title of the short distance wireless network standards called PAN (Personal Area Network) or W (Wireless) PAN.

The control device 110 is connected to an external server 113. This server 113 may be managed by any one of the house 101, an electric power company, and a service provider. The information transmitted and received by the server 113 is, for example, information on power consumption, information on lifestyle patterns, electric power fees, information on weather, information on natural disasters, and information on electricity transactions. These pieces of information may be transmitted and received from a power consuming device (for example, a television receiver) at home, or may be transmitted and received from an out-of-home device (for example, a mobile telephone). These pieces of information may be displayed on a device having a display function, for example, a television receiver, a mobile telephone, or a PDA (Personal Digital Assistant).

The control device 110 that controls various units is configured to include a CPU (Central Processing Unit), a RAM (Random Access Memory), a ROM (Read Only Memory), and the like, and in this example, the control device is housed in the power storage device 103. The control device 110 is connected to the power storage device 103, the domestic power generation device 104, the power consuming device 105, the various sensors 111, and the server 113 through the information network 112, and has a function of, for example, regulating the amount of use of commercial electric power and the amount of power generation. In addition to that, the control device 110 may also have a function of performing electricity transactions in the electric power market.

As described above, not only the electric power of the centralized electric power system 102 such as a thermal power station 102a, a nuclear power station 102b, or a hydroelectric power station 102c, but also the electric power generated by a domestic power generation device 104 (solar power generation and wind power generation) can be stored in the power storage device 103. Therefore, even if the electric power generated by the domestic power generation device 104 fluctuates, it is possible to perform control so as to make the amount of electric power sent to the outside constant, or to discharge electricity by a necessary amount. For example, a method of use in which the electric power obtained by solar power generation is stored in the power storage device 103, and inexpensive late night power is stored in the power storage device 103 during nighttime, while the electric power stored in the power storage device 103 is discharged and used in a time zone in which the fee during daytime is high, can be employed.

Meanwhile, in this example, an example in which the control device 110 is housed in the power storage device 103 has been described; however, the control device 110 may be housed in a smart meter 107 or may be configured to be used alone. Furthermore, the power storage system 100 may be used by plural households in a multiple dwelling house, or may be used by a plural numbers of single family-dwelling houses.

(7-2) Power Storage System in Vehicle as Application Example

Figure 16:
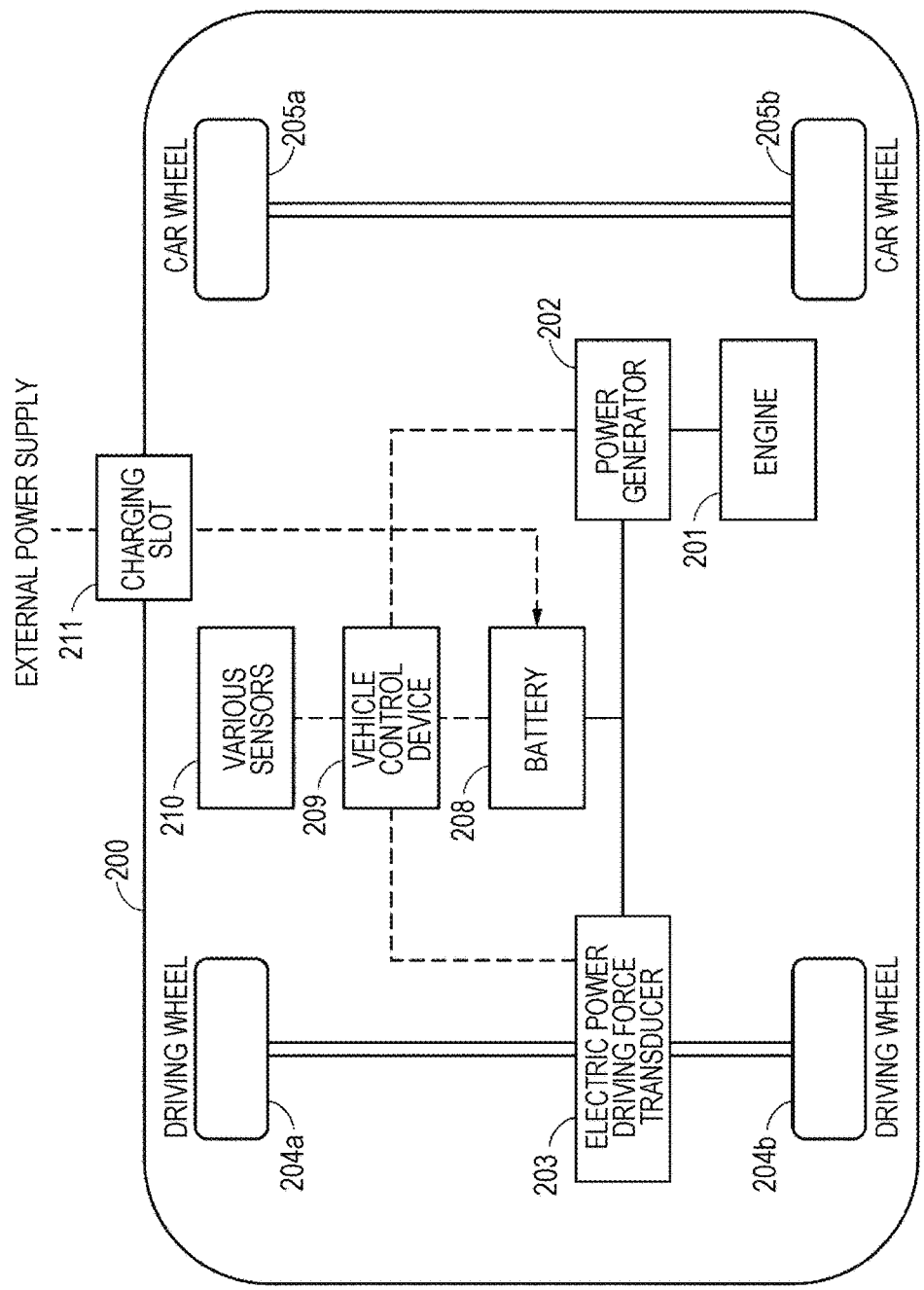
FIG. 16 is an outline diagram schematically illustrating an example of the configuration of a hybrid vehicle which employs a series hybrid system to which the present technology is applied.

An example of applying the present technology to a power storage system for vehicles will be explained with reference to FIG. 16. FIG. 16 schematically illustrates an example of the configuration of a hybrid vehicle which employs the series hybrid system to which the present technology is applied. A series hybrid system is a car which runs using an electric power driving force transducer, by using the electric power generated by a power generator that is driven by an engine, or by using electric power that has been temporarily stored in a battery.

This hybrid vehicle 200 is equipped with an engine 201, a power generator 202, an electric power driving force transducer 203, a driving wheel 204a, a driving wheel 204b, a wheel 205a, a wheel 205b, a battery 208, a vehicle control device 209, various sensors 210, and a charging slot 211. The non-aqueous electrolyte battery of the present technology described above is applied to the battery 208.

The hybrid vehicle 200 runs by means of the electric power driving force transducer 203 as a driving force source. An example of the electric power driving force transducer 203 is a motor. The electric power driving force transducer 203 is operated by the electric power of the battery 208, and the rotational force of this electric power driving force transducer 203 is transferred to the driving wheels 204a and 204b. Meanwhile, when direct current-alternating current (DC-AC) or inverse conversion (AC-DC conversion) is used at a site in need thereof, the electric power driving force transducer 203 can be applied to an alternating current motor or a direct current motor. The various sensors 210 control the engine speed through the vehicle control device 209, or control the opening (degree of throttle opening) of a throttle valve that is not shown in the diagram. The various sensors 210 include a speed sensor, an acceleration sensor, an engine speed sensor, and the like.

The rotational force of an engine 201 can be transferred to a power generator 202, and the electric power generated by the power generator 202 by means of the rotational force can be stored in a battery 208.

When a hybrid vehicle 200 is decelerated by a braking mechanism that is not shown in the diagram, the resistance force at the time of deceleration is added as a rotational force to the electric power driving force transducer 203, and the regenerative electric power generated by the electric power driving force transducer 203 by this rotational force is stored in the battery 208.

When the battery 208 is connected to an external power supply of the hybrid vehicle 200, the battery 208 can receive the supply of electric power from an external power supply through a charging slot 211 as an input slot and store the received electric power.

Although not shown in the diagram, an information processing device that performs information processing for vehicle control based on the information related to the non-aqueous electrolyte battery, may also be included. Examples of such an information processing device include an information processing device which performs display of the battery residual quantity based on the information on the residual quantity of the battery.

An explanation has been given above, for example, on a series hybrid car that runs using a motor by using electric power generated by a power generator that is driven by an engine, or by using electric power that has been temporarily stored in a battery. However, the present technology can also be effectively applied to a parallel hybrid car in which the power outputs of both the engine and the motor are used as a driving source, and three modes such as running only on the engine, running only on the motor, and running on both the engine and the motor, may be switched as appropriate upon use. In addition, the present technology can also be effectively applied to a so-called electric vehicle that runs by being driven by a driving motor only without using an engine.

EXAMPLES

Hereinafter, the present technology will be described in detail by way of Examples. Meanwhile, the present technology is not intended to be limited to the configurations of the Examples described below.

Example 1-1 to Example 1-50 and Comparative Example 1-1 to Comparative Example 1-16

In Example 1-1 to Example 1-50 and Comparative Example 1-1 to Comparative Example 1-16 described below, the effects of the present technology were confirmed by employing separators in each of which the heat capacity per unit area and the heat capacity per unit volume of the heat absorbing layer had been adjusted.

Example 1-1

Production of Positive Electrode

A positive electrode mix was prepared by mixing 91% by mass of lithium cobaltate ($LiCoO_2$) as a positive electrode active material, 6% by mass of carbon black as a conductive material, and 3% by mass of polyvinylidene fluoride (PVdF) as a binder, and this positive electrode mix was dispersed in N-methyl-2-pyrrolidone (NMP) as a dispersing medium to obtain a positive electrode mix slurry. This positive electrode mix slurry was applied on both surfaces of a positive electrode current collector formed from a band-shaped aluminum foil having a thickness of 12 μm, such that a part of the positive electrode current collector was exposed. Subsequently, the dispersing medium of the applied positive electrode mix slurry was evaporated and dried, and the remaining positive electrode mix slurry was compression molded using a roll press. Thereby, a positive electrode active material layer was formed. Lastly, a positive electrode terminal was attached to an exposed area of the positive electrode current collector, and thus a positive electrode was formed.

[Production of Negative Electrode]

A negative electrode mix was produced by mixing 96% by mass of a granular graphite powder having an average particle size of 20 μm as a negative electrode active material, 1.5% by mass of an acrylic acid modification product of a styrene-butadiene copolymer as a binder, and 1.5% by mass of carboxymethyl cellulose as a thickening agent, and an appropriate amount of water was added thereto with stirring. Thereby, a negative electrode mix slurry was prepared. This negative electrode mix slurry was applied on both surfaces of a negative electrode current collector formed from a band-shaped copper foil having a thickness of 15 μm, such that a part of the negative electrode current collector was exposed. Subsequently, the dispersing medium of the applied negative electrode mix slurry was evaporated and dried, and the remaining negative electrode mix slurry was compression molded using a roll press. Thereby, a negative electrode active material layer was formed. Lastly, a negative electrode terminal was attached to an exposed area of the negative electrode current collector, and thus a negative electrode was formed.

[Production of Separator]

A microporous film made of polyethylene (PE) having a thickness of 9 μm and a porosity of 35% was used as a substrate. A heat absorbing layer was formed as described below, on both surfaces of the substrate. First, boehmite (specific heat capacity: 1.2 J/gK) having an average particle size of 0.8 μm, which were heat absorbent particles, and polyvinylidene fluoride (PVdF) as a resin material were mixed at a mass ratio of 9:1, and the mixture was dispersed in N-methyl-2-pyrrolidone (NMP). Thus, a resin solution was produced. Subsequently, this resin solution was uniformly applied on both surfaces of the substrate to the same thickness, and then the substrate coated with the resin solution was immersed in a water bath in which water was vibrated by ultrasonic waves, to thereby cause phase separation. N-methyl-2-pyrrlidone (NMP) in the resin solution was removed.

Thereafter, the substrate coated with the resin solution was dipped into a dryer, and thereby water and residual NMP were removed. Thus, a separator in which a substrate and heat absorbing layers formed from a resin material and boehmite were laminated was produced.

At this time, the amount of boehmite per unit area was regulated by the coating thickness of the resin solution. Specifically, thickness adjustment was carried out such that the amount of boehmite per unit area would be 0.0005 $g/cm^2$ in total on the front and back sides of the substrate, and the total heat capacity per unit area of the heat absorbing layer was adjusted to 0.0006 $J/Kcm^2$ (0.0005 $[g/cm^2] \times 1.2$ $[J/gK]$).

Furthermore, the packing amount of boehmite per unit volume was regulated by the energy of ultrasonic waves applied at the time of phase separation of the heat absorbing layer, and the solids content ratio of the resin solution. Specifically, the total thickness of the heat absorbing layers on both surfaces of the substrate was adjusted to 15 μm (0.0005 $[g/cm^2] \div 0.33$ $[g/cm^3]$) such that the amount of boehmite per unit volume would be 0.33 $g/cm^3$ in total on the front and back sides of the substrate, and the total heat capacity per unit volume of the heat absorbing layer was adjusted to 0.4 $J/Kcm^3$ (0.33 $[g/cm^3] \times 1.2$ $[J/gK]$). Thereby, a separator having heat absorbing layers having a heat capacity per unit area of 0.0006 $J/Kcm^2$ and a heat capacity per unit volume of 0.4 $J/Kcm^3$ was obtained.

A heat absorbing layer after being subjected to vibration with ultrasonic waves has a larger thickness than the thickness at the time of application of the resin solution. The thickness of the heat absorbing layer after completion is regulated by regulating the energy of ultrasonic waves, and the heat capacity per unit volume can be regulated while the heat capacity per unit area is maintained constant.

[Preparation of Non-Aqueous Liquid Electrolyte]

A non-aqueous liquid electrolyte was prepared by dissolving lithium hexafluorophosphate ($LiPF_6$) as an electrolyte salt at a concentration of 1 $mol/dm^3$, in a non-aqueous solvent obtained by mixing ethylene carbonate (EC), vinylene carbonate (VC), and diethyl carbonate (DEC) at a mass ratio of 30:10:60.

[Assembling of Cylindrical Battery]

The separator in which a positive electrode, a negative electrode and a heat absorbing layer were formed together on both surfaces, was laminated in the order of the positive electrode, the separator, the negative electrode, and the separator. The assembly was wound several times in the longitudinal direction, and then the winding end portion was fixed with an adhesive tape. Thus, a wound electrode assembly was formed. Subsequently, the positive electrode terminal was joined to a safety valve that was joined to a battery lid, and at the same time, the negative electrode lead was connected to a negative electrode can. The wound electrode assembly was interposed between a pair of insulating plates and was accommodated inside the battery can. Subsequently, a center pin was inserted at the center of the wound electrode assembly.

Subsequently, the non-aqueous liquid electrolyte was injected into the inside of the cylindrical battery can from above the insulating plate. Finally, a safety valve mechanism composed of a safety valve, a disc holder and a cut-off disc, a PTC element, and a battery lid were placed at the opening of the battery can, and the opening was sealed by caulking with an insulating sealing gasket. Thereby, a cylindrical battery as illustrated in FIG. 4, having a battery shape with a diameter of 18 mm and a height of 65 mm (ICR18650 size) and having a battery capacity of 3500 mAh, was produced.

Example 1-2 to Example 1-7

At the time of forming the heat absorbing layers of the separator, the thickness of the heat absorbing layer was regulated by regulating the intensity of ultrasonic waves, and thereby the heat capacity per unit volume of the heat absorbing layer was adjusted to the value indicated in Table 1. Thereby, separators of Example 1-2 to Example 1-7 that each included a heat absorbing layer having a heat capacity per unit area of 0.0006 J/Kcm$^2$ and a heat capacity per unit volume of 0.2 J/Kcm$^3$, 0.3 J/Kcm$^3$, 1.0 J/Kcm$^3$, 1.5 J/Kcm$^3$, 2.5 J/Kcm$^3$, or 3.0 J/Kcm$^3$, respectively, were produced. Cylindrical batteries of Example 1-2 to Example 1-7 were respectively produced using these separators.

Example 1-8 to Example 1-12

At the time of applying the resin solution to the substrate, the heat capacity per unit area of the heat absorbing layer was regulated by adjusting the coating thickness of the resin solution. Specifically, the heat capacity per unit area of the heat absorbing layer was adjusted to be 0.0001 J/Kcm$^2$, 0.0002 J/Kcm$^2$, 0.0010 J/Kcm$^2$, 0.0013 J/Kcm$^2$, and 0.0015 J/Kcm$^2$, respectively. Subsequently, at the time of forming the heat absorbing layer of the separator, the thickness of the heat absorbing layer was respectively regulated by regulating the energy of ultrasonic waves, and thereby the heat capacity per unit volume of the heat absorbing layer was adjusted to 0.4 J/Kcm$^3$. Thus, separators of Example 1-8 to Example 1-12 were respectively produced. Cylindrical batteries of Example 1-8 to Example 1-12 were produced using these separators respectively.

Example 1-13 to Example 1-24

At the time of forming the negative electrode active material layer, a silicon powder was used as the negative electrode active material instead of graphite. A negative electrode mix was produced by mixing 85% by mass of silicon (Si) particles as a negative electrode active material, 10% by mass of carbon black as a conductive material, and 5% by mass of polyvinylidene fluoride (PVdF) as a binder, and this negative electrode mix was dispersed in N-methyl-2-pyrrolidone (NMP) as a dispersing medium. Thereby, a negative electrode mix slurry was obtained. Cylindrical batteries of Example 1-13 to Example 1-24 were produced in the same manner as in Example 1-1 to Example 1-12, respectively, except that this negative electrode mix slurry was used.

Example 1-25 to Example 1-36

At the time of forming the negative electrode active material layer, a carbon-tin composite material was used as the negative electrode active material instead of graphite. Regarding the carbon-tin composite material, SnCoC-containing material which contained tin (Sn), cobalt (Co) and carbon (C) as constituent elements, had a tin content in the composition of 22% by mass, a content of cobalt of 55% by mass, a content of carbon of 23% by mass, and had a ratio of tin with respect to the sum of tin and cobalt (Co/(Sn+Co)) of 71.4% by mass, was used.

A negative electrode mix was produced by mixing 80% by mass of a SnCoC-containing material powder as a negative electrode active material, 12% by mass of graphite as a conductive agent, and 8% by mass of polyvinylidene fluoride (PVdF) as a binder. Subsequently, the negative electrode mix was dispersed in N-methyl-2-pyrrolidone, and thus a paste-like negative electrode mix slurry was prepared. Cylindrical batteries of Example 1-25 to Example 1-36 were produced in the same manner as in Example 1-1 to Example 1-12, respectively, except that this negative electrode mix slurry was used.

Example 1-37 to Example 1-48

At the time of forming the negative electrode active material layer, lithium titanate ($Li_4Ti_5O_{12}$) was used as the negative electrode active material instead of graphite. A negative electrode mix was produced by mixing 85% by mass of lithium titanate ($Li_4Ti_5O_{12}$) as a negative electrode active material, 10% by mass of graphite as a conductive agent, and 5% by mass of polyvinylidene fluoride (PVdF) as a binder. Subsequently, the negative electrode mix was dispersed in N-methyl-2-pyrrolidone, and thus a paste-like negative electrode mix slurry was prepared. Cylindrical batteries of Example 1-37 to Example 1-48 were produced in the same manner as in Example 1-1 to Example 1-12, respectively, except that this negative electrode mix slurry was used.

Example 1-49

A gas-permeable cellulose film having a porosity of 60%, which was paper having a thickness of 9 μm, was used as a substrate. A resin solution similar to that of Example 1-1 was uniformly applied on both surfaces of the substrate to the same thickness. At this time, the pores of the gas-permeable cellulose film as the substrate were impregnated with the coating material. Thereafter, the substrate coated with the resin solution was immersed in a water bath in which water was vibrated with ultrasonic waves, to thereby cause phase separation. Thereafter, N-methyl-2-pyrrlidone (NMP) in the resin solution was removed. Thereafter, the substrate coated with the resin solution was dipped into a dryer, and thereby water and residual NMP were removed. Thus, a heat absorbing layer formed from a resin material and boehmite was formed. At the time of forming the heat absorbing layer of the separator, the intensity of ultrasonic waves was regulated such that the porosity in the gas-permeable cellulose film as the substrate would be 35%. Furthermore, the coating amount of the coating material was regulated such that the thickness of the heat absorbing layer would be the same as that of Example 1-1.

Thereby, a separator of Example 1-49 having a heat absorbing layer which had a heat capacity per unit area of 0.00142 J/Kcm$^2$ and a heat capacity per unit volume of 1.0 J/Kcm$^3$ was produced. This separator included a heat absorbing layer, a portion of which was included in the pores inside the substrate, on one surface side and the other surface side of the substrate. A cylindrical battery of Example 1-49 was produced using this separator.

Example 1-50

A gas-permeable polyethylene terephthalate (PET) film having a porosity of 80%, which was a nonwoven fabric having a thickness of 9 μm, was used as a substrate. A resin solution similar to that of Example 1-1 was uniformly applied on both surfaces of the substrate to the same thickness. At this time, the pores of the gas-permeable polyethylene terephthalate film as the substrate were also impregnated with the coating material. Thereafter, the substrate coated with the resin solution was immersed in a water bath in which water was vibrated using ultrasonic waves, to thereby cause phase separation, and then N-methyl-2-pyrrolidone (NMP) in the resin solution was removed. Thereafter, the substrate coated with the resin solution was dipped into a dryer, and thereby water and residual NMP were removed. Thus, a heat absorbing layer formed from a resin material and boehmite was formed. At the time of forming the heat absorbing layer of the separator, the intensity of ultrasonic waves was regulated such that the porosity inside the gas-permeable polyethylene terephthalate film as the substrate would be 35%. Furthermore, the coating amount of the coating material was regulated such that the thickness of the heat absorbing layer would be the same as that of Example 1-1.

Thereby, a separator of Example 1-50 having a heat absorbing layer which had a heat capacity per unit area of 0.00208 J/Kcm$^2$ and a heat capacity per unit volume of 1.6 J/Kcm$^3$ was produced. This separator included a heat absorbing layer, a portion of which was included in the pores inside the substrate, on one surface side and the other surface side of the substrate. A cylindrical battery of Example 1-50 was produced using this separator.

Comparative Example 1-1

A cylindrical battery of Comparative Example 1-1 was produced in the same manner as in Example 1-1, except that a polyethylene microporous film having a thickness of 23 μm was used as the separator.

Comparative Example 1-2

A cylindrical battery of Comparative Example 1-2 was produced in the same manner as in Example 1-1, except that a separator in which the coating amount of the resin solution was adjusted such that the heat capacity per unit area of the heat absorbing layer of the separator would be 0.00005 J/Kcm$^2$, was used.

Comparative Example 1-3

A cylindrical battery of Comparative Example 1-3 was produced in the same manner as in Example 1-1, except that a separator in which a heat absorbing layer was formed without applying ultrasonic waves to the bath at the time of phase separation, was used. In Comparative Example 1-3, since no ultrasonic waves were applied at the time of forming the heat absorbing layer, the heat capacity per unit volume did not become small, and a heat capacity per unit volume of 3.5 J/Kcm$^3$ was obtained.

Comparative Example 1-4

A cylindrical battery of Comparative Example 1-4 was produced in the same manner as in Example 1-1, except that a separator in which a heat absorbing layer was formed by adjusting the coating amount of the resin solution such that the heat capacity per unit area of the heat absorbing layer of the separator would be 0.00005 J/Kcm$^2$, and without applying ultrasonic waves to the bath at the time of phase separation, was used. In Comparative Example 1-4, since ultrasonic waves were not applied at the time of forming the heat absorbing layer, the heat capacity per unit volume did not become small, and a heat capacity per unit volume of 3.5 J/Kcm$^3$ was obtained.

Comparative Example 1-5

A cylindrical battery of Comparative Example 1-1 was produced in the same manner as in Comparative Example 1-1, except that silicon was used as the negative electrode active material, and the negative electrode mix slurry was produced to have the same composition as that of Example 1-13.

Comparative Example 1-6 to Comparative Example 1-8

Cylindrical batteries of Comparative Example 1-6 to Comparative Example 1-8 were respectively produced in the same manner as in Comparative Example 1-2 to Comparative Example 1-4, except that silicon was used as the negative electrode active material, and the negative electrode mix slurry was produced to have the same composition as that of Example 1-13.

Comparative Example 1-9

A cylindrical battery of Comparative Example 1-1 was produced in the same manner as in Comparative Example 1-1, except that a carbon-tin composite material was used as the negative electrode active material, and the negative electrode mix slurry was produced to have the same composition as that of Example 1-25.

Comparative Example 1-10 to Comparative Example 1-12

Cylindrical batteries of Comparative Example 1-10 to Comparative Example 1-12 were produced in the same manner as in Comparative Example 1-2 to Comparative Example 1-4, respectively, except that a carbon-tin composite material was used as the negative electrode active material, and the negative electrode mix slurry was produced to have the same composition as that of Example 1-25.

Comparative Example 1-13

A cylindrical battery of Comparative Example 1-1 was produced in the same manner as in Comparative Example 1-1, except that lithium titanate ($Li_4Ti_5O_{12}$) was used as the negative electrode active material, and the negative electrode mix slurry was produced to have the same composition as that of Example 1-37.

Comparative Example 1-14 to Comparative Example 1-16

Cylindrical batteries of Comparative Example 1-14 to Comparative Example 1-16 were produced in the same manner as in Comparative Example 1-2 to Comparative Example 1-4, respectively, except that lithium titanate ($Li_4Ti_5O_{12}$) was used as the negative electrode active material, and the negative electrode mix slurry was produced to have the same composition as that of Example 1-37.

[Evaluation of Batteries: Short Circuit Test]

For each of the cylindrical batteries of various Examples and various Comparative Examples thus produced, the positive electrode and the negative electrode were electrically short-circuited on the outside of the battery, and measurement of the heat generation temperature of the cylindrical battery and checking of the presence or absence of gas eruption were carried out. At the time of a short circuit, when the heat generation temperature of the cylindrical battery was 100° C. or lower, it was considered that the battery was in a safe state. In this case, a battery is accompanied by heat generation at 100° C. or lower due to a shutdown of the separator, operation of the safety valve mechanism included in the cylindrical battery, a short circuit inside the battery, and the like; however, subsequently the battery enters into a state of being not usable, and the temperature of the battery is decreased. Thus, no more risk occurs thereafter. Meanwhile, if the maximum temperature of the battery is 80° C. or lower, the safety valve mechanism operates; however, since a shutdown of the separator or a short circuit inside the battery does not occur, when the battery temperature is decreased, the safety valve mechanism recovers its usual state, and the battery can be continuously used. Thus, it is more preferable.

Furthermore, when gas erupted from the battery, it was considered that the battery was in a hazardous condition. Even if a shutdown of the separator, operation of the safety valve mechanism, a short circuit inside the battery, and the like occur, when the positive electrode is in a markedly overheated state, the positive electrode undergoes a thermal decomposition reaction, and gas erupts from the inside of the battery.

The evaluation results are presented in the following Table 1.

TABLE 1

| | Negative electrode active material | Heat absorbing layer | | | | Short circuit test | |
|---|---|---|---|---|---|---|---|
| | | Inorganic particles | Resin material | Heat capacity per unit area [J/Kcm$^2$] | Heat capacity per unit volume [J/Kcm$^3$] | Heat generation temperature [° C.] | Gas eruption |
| Example 1-1 | Graphite | Boehmite | PVdF | 0.0006 | 0.4 | 62 | No |
| Example 1-2 | | | | 0.0006 | 0.2 | 51 | No |
| Example 1-3 | | | | 0.0006 | 0.3 | 56 | No |
| Example 1-4 | | | | 0.0006 | 1.0 | 61 | No |
| Example 1-5 | | | | 0.0006 | 1.5 | 67 | No |
| Example 1-6 | | | | 0.0006 | 2.5 | 69 | No |
| Example 1-7 | | | | 0.0006 | 3.0 | 89 | No |
| Example 1-8 | | | | 0.0001 | 0.4 | 89 | No |
| Example 1-9 | | | | 0.0002 | 0.4 | 66 | No |
| Example 1-10 | | | | 0.0010 | 0.4 | 50 | No |
| Example 1-11 | | | | 0.0013 | 0.4 | 44 | No |
| Example 1-12 | | | | 0.0015 | 0.4 | 38 | No |
| Example 1-13 | Silicon | Boehmite | PVdF | 0.0006 | 0.4 | 72 | No |
| Example 1-14 | | | | 0.0006 | 0.2 | 61 | No |
| Example 1-15 | | | | 0.0006 | 0.3 | 66 | No |
| Example 1-16 | | | | 0.0006 | 1.0 | 71 | No |
| Example 1-17 | | | | 0.0006 | 1.5 | 77 | No |
| Example 1-18 | | | | 0.0006 | 2.5 | 79 | No |
| Example 1-19 | | | | 0.0006 | 3.0 | 99 | No |
| Example 1-20 | | | | 0.0001 | 0.4 | 99 | No |
| Example 1-21 | | | | 0.0002 | 0.4 | 76 | No |
| Example 1-22 | | | | 0.0010 | 0.4 | 60 | No |
| Example 1-23 | | | | 0.0013 | 0.4 | 54 | No |
| Example 1-24 | | | | 0.0015 | 0.4 | 48 | No |
| Example 1-25 | Carbon-tin composite material | Boehmite | PVdF | 0.0006 | 0.4 | 65 | No |
| Example 1-26 | | | | 0.0006 | 0.2 | 54 | No |
| Example 1-27 | | | | 0.0006 | 0.3 | 59 | No |
| Example 1-28 | | | | 0.0006 | 1.0 | 64 | No |
| Example 1-29 | | | | 0.0006 | 1.5 | 70 | No |
| Example 1-30 | | | | 0.0006 | 2.5 | 72 | No |
| Example 1-31 | | | | 0.0006 | 3.0 | 92 | No |
| Example 1-32 | | | | 0.0001 | 0.4 | 92 | No |
| Example 1-33 | | | | 0.0002 | 0.4 | 69 | No |
| Example 1-34 | | | | 0.0010 | 0.4 | 53 | No |
| Example 1-35 | | | | 0.0013 | 0.4 | 47 | No |
| Example 1-36 | | | | 0.0015 | 0.4 | 41 | No |
| Example 1-37 | Lithium titanate | Boehmite | PVdF | 0.0006 | 0.4 | 64 | No |
| Example 1-38 | | | | 0.0006 | 0.2 | 53 | No |
| Example 1-39 | | | | 0.0006 | 0.3 | 58 | No |
| Example 1-40 | | | | 0.0006 | 1.0 | 63 | No |
| Example 1-41 | | | | 0.0006 | 1.5 | 69 | No |
| Example 1-42 | | | | 0.0006 | 2.5 | 71 | No |
| Example 1-43 | | | | 0.0006 | 3.0 | 91 | No |
| Example 1-44 | | | | 0.0001 | 0.4 | 91 | No |
| Example 1-45 | | | | 0.0002 | 0.4 | 68 | No |
| Example 1-46 | | | | 0.0010 | 0.4 | 52 | No |
| Example 1-47 | | | | 0.0013 | 0.4 | 46 | No |
| Example 1-48 | | | | 0.0015 | 0.4 | 40 | No |
| Example 1-49 | Graphite | Boehmite | PVdF | 0.00142 | 1.0 | 32 | No |
| Example 1-50 | | | | 0.00208 | 1.6 | 30 | No |
| Comparative Example 1-1 | Graphite | — | — | — | — | 500 | Yes |

TABLE 1-continued

| | Negative electrode active material | Inorganic particles | Resin material | Heat absorbing layer Heat capacity per unit area [J/Kcm$^2$] | Heat capacity per unit volume [J/Kcm$^3$] | Short circuit test Heat generation temperature [° C.] | Gas eruption |
|---|---|---|---|---|---|---|---|
| Comparative Example 1-2 | | Boehmite | PVdF | 0.00005 | 0.4 | 350 | Yes |
| Comparative Example 1-3 | | | | 0.0006 | 3.5 | 290 | Yes |
| Comparative Example 1-4 | | | | 0.00005 | 3.5 | 410 | Yes |
| Comparative Example 1-5 | Silicon | — | — | — | — | 500 | Yes |
| Comparative Example 1-6 | | Boehmite | PVdF | 0.00005 | 0.4 | 450 | Yes |
| Comparative Example 1-7 | | | | 0.0006 | 3.5 | 390 | Yes |
| Comparative Example 1-8 | | | | 0.00005 | 3.5 | 510 | Yes |
| Comparative Example 1-9 | Carbon-tin composite material | — | — | — | — | 500 | Yes |
| Comparative Example 1-10 | | Boehmite | PVdF | 0.00005 | 0.4 | 420 | Yes |
| Comparative Example 1-11 | | | | 0.0006 | 3.5 | 360 | Yes |
| Comparative Example 1-12 | Carbon-tin composite material | Boehmite | PVdF | 0.00005 | 3.5 | 480 | Yes |
| Comparative Example 1-13 | Lithium titanate | — | — | — | — | 500 | Yes |
| Comparative Example 1-14 | | Boehmite | PVdF | 0.00005 | 0.4 | 380 | Yes |
| Comparative Example 1-15 | | | | 0.0006 | 3.5 | 320 | Yes |
| Comparative Example 1-16 | | | | 0.00005 | 3.5 | 440 | Yes |

As can be seen from Table 1, in Example 1-1 to Example 1-50 in which the heat capacity per unit area of the heat absorbing layer of the separator was 0.0001 J/Kcm$^2$ or more, and the heat capacity per unit volume was 3.0 J/Kcm$^3$ or less, it was confirmed that the batteries were in a safe state in the short circuit test.

On the other hand, in Comparative Example 1-2 in which the heat capacity per unit area of the heat absorbing layer of the separator is less than 0.0001 J/Kcm$^2$; in Comparative Example 1-3 in which the heat capacity per unit volume is more than 3.0 J/Kcm$^3$; and in Comparative Example 1-4 in which the heat capacity per unit area and the heat capacity per unit volume were not in the ranges described above, it was found that the batteries were in a hazardous state in the short circuit test.

Example 2-1 to Example 2-175 and Comparative Example 2-1

In Example 2-1 to Example 2-175 and Comparative Example 2-1, the effects of the present technology were confirmed by replacing the heat absorbent particles and the resin material that constitute the heat absorbing layer of the separator.

Example 2-1

A cylindrical battery that used graphite as the negative electrode active material was produced in the same manner as in Example 1-1, by using a separator having a heat absorbing layer having a single surface thickness of 7.5 μm (two-surface thickness: 15 μm) that was produced on a polyethylene microporous film having a thickness of 9 μm, using boehmite (specific heat capacity: 1.2 J/gK) as the heat absorbent particles and polyvinylidene fluoride (PVdF) as the resin material, such that the total heat capacity per unit area was 0.0006 J/Kcm$^2$ and the total heat capacity per unit volume was 0.4 J/Kcm$^3$.

Example 2-2

A cylindrical battery was produced in the same manner as in Example 2-1, except that polyimide was used as the resin material used in the heat absorbing layer of the separator, instead of polyvinylidene fluoride.

Example 2-3

A cylindrical battery was produced in the same manner as in Example 2-1, except that an all-aromatic polyamide (aramid) was used as the resin material used in the heat absorbing layer of the separator, instead of polyvinylidene fluoride.

Example 2-4

A cylindrical battery was produced in the same manner as in Example 2-1, except that polyacrylonitrile was used as the resin material used in the heat absorbing layer of the separator, instead of polyvinylidene fluoride.

Example 2-5

A cylindrical battery was produced in the same manner as in Example 2-1, except that polyvinyl alcohol was used as the resin material used in the heat absorbing layer of the separator, instead of polyvinylidene fluoride.

Example 2-6

A cylindrical battery was produced in the same manner as in Example 2-1, except that polyether was used as the resin material used in the heat absorbing layer of the separator, instead of polyvinylidene fluoride.

Example 2-7

A cylindrical battery was produced in the same manner as in Example 2-1, except that an acrylic acid resin was used as the resin material used in the heat absorbing layer of the separator, instead of polyvinylidene fluoride.

Example 2-8 to Example 2-14

Cylindrical batteries were produced in the same manner as in Example 2-1 to Example 2-7, respectively, except that aluminum nitride (specific heat capacity: 0.7 J/gK) was used instead of alumina as the heat absorbent particles used in the heat absorbing layer of the separator. Meanwhile, aluminum nitride and boehmite have different specific heat capacities, and the specific heat capacity of aluminum nitride is smaller than the specific heat capacity of boehmite. For this reason, in order to adjust the total heat capacity per unit area to 0.0006 J/Kcm$^2$, the amount of aluminum nitride per unit area was adjusted to be larger than the amounts of boehmite per unit area of Example 2-1 to Example 2-7.

Specifically, the total heat capacity per unit area of the heat absorbing layer was adjusted to 0.0006 J/Kcm$^2$ (0.00086 [g/cm$^2$]×0.7 [J/gK]), by adjusting the amount of aluminum nitride per unit area to 0.00086 g/cm$^2$. Hereinafter, the coating amount of the heat absorbent particles was adjusted similarly, and thereby the heat capacity per unit area of the heat absorbing layer was made constant.

Example 2-15 to Example 2-21

Cylindrical batteries were produced in the same manner as in Example 2-1 to Example 2-7, respectively, except that boron nitride (specific heat capacity: 0.8 J/gK) was used as the heat absorbent particles used in the heat absorbing layer of the separator, instead of boehmite.

Example 2-22 to Example 2-28

Cylindrical batteries were produced in the same manner as in Example 2-1 to Example 2-7, respectively, except that silicon carbide (specific heat capacity: 0.7 J/gK) was used as the heat absorbent particles used in the heat absorbing layer of the separator, instead of boehmite.

Example 2-29 to Example 2-35

Cylindrical batteries were produced in the same manner as in Example 2-1 to Example 2-7, respectively, except that talc (specific heat capacity: 1.1 J/gK) was used as the heat absorbent particles used in the heat absorbing layer of the separator, instead of boehmite.

Example 2-36 to Example 2-42

Cylindrical batteries were produced in the same manner as in Example 2-1 to Example 2-7, respectively, except that $Li_2O_4$ (specific heat capacity: 0.8 J/gK) was used as the heat absorbent particles used in the heat absorbing layer of the separator, instead of boehmite.

Example 2-43 to Example 2-49

Cylindrical batteries were produced in the same manner as in Example 2-1 to Example 2-7, respectively, except that $Li_3PO_4$ (specific heat capacity: 0.8 J/gK) was used as the heat absorbent particles used in the heat absorbing layer of the separator, instead of boehmite.

Example 2-50 to Example 2-56

Cylindrical batteries were produced in the same manner as in Example 2-1 to Example 2-7, respectively, except that LiF (specific heat capacity: 0.9 J/gK) was used as the heat absorbent particles used in the heat absorbing layer of the separator, instead of boehmite.

Example 2-57 to Example 2-63

Cylindrical batteries were produced in the same manner as in Example 2-1 to Example 2-7, respectively, except that diamond (specific heat capacity: 0.5 J/gK) was used as the heat absorbent particles used in the heat absorbing layer of the separator, instead of boehmite.

Example 2-64 to Example 2-70

Cylindrical batteries were produced in the same manner as in Example 2-1 to Example 2-7, respectively, except that zirconium oxide (specific heat capacity: 0.7 J/gK) was used as the heat absorbent particles used in the heat absorbing layer of the separator, instead of boehmite.

Example 2-71 to Example 2-77

Cylindrical batteries were produced in the same manner as in Example 2-1 to Example 2-7, respectively, except that yttrium oxide (specific heat capacity: 0.5 J/gK) was used as the heat absorbent particles used in the heat absorbing layer of the separator, instead of boehmite.

Example 2-78 to Example 2-84

Cylindrical batteries were produced in the same manner as in Example 2-1 to Example 2-7, respectively, except that barium titanate (specific heat capacity: 0.8 J/gK) was used as the heat absorbent particles used in the heat absorbing layer of the separator, instead of boehmite.

Example 2-85 to Example 2-91

Cylindrical batteries were produced in the same manner as in Example 2-1 to Example 2-7, respectively, except that strontium titanate (specific heat capacity: 0.8 J/gK) was used as the heat absorbent particles used in the heat absorbing layer of the separator, instead of boehmite.

Example 2-92 to Example 2-98

Cylindrical batteries were produced in the same manner as in Example 2-1 to Example 2-7, respectively, except that silicon oxide (specific heat capacity: 0.8 J/gK) was used as the heat absorbent particles used in the heat absorbing layer of the separator, instead of boehmite.

Example 2-99 to Example 2-105

Cylindrical batteries were produced in the same manner as in Example 2-1 to Example 2-7, respectively, except that zeolite (specific heat capacity: 1.0 J/gK) was used as the heat absorbent particles used in the heat absorbing layer of the separator, instead of boehmite.

Example 2-106 to Example 2-112

Cylindrical batteries were produced in the same manner as in Example 2-1 to Example 2-7, respectively, except that barium sulfate (specific heat capacity: 0.9 J/gK) was used as the heat absorbent particles used in the heat absorbing layer of the separator, instead of boehmite.

Example 2-113 to Example 2-119

Cylindrical batteries were produced in the same manner as in Example 2-1 to Example 2-7, respectively, except that titanium oxide (specific heat capacity: 0.8 J/gK) was used as the heat absorbent particles used in the heat absorbing layer of the separator, instead of boehmite.

Example 2-120 to Example 2-126

Cylindrical batteries were produced in the same manner as in Example 2-1 to Example 2-7, respectively, except that magnesium oxide (specific heat capacity: 1.0 J/gK) was used as the heat absorbent particles used in the heat absorbing layer of the separator, instead of boehmite.

Example 2-127 to Example 2-133

Cylindrical batteries were produced in the same manner as in Example 2-1 to Example 2-7, respectively, except that graphite (specific heat capacity: 0.8 J/gK) was used as the heat absorbent particles used in the heat absorbing layer of the separator, instead of boehmite.

Example 2-134 to Example 2-140

Cylindrical batteries were produced in the same manner as in Example 2-1 to Example 2-7, respectively, except that carbon nanotubes (specific heat capacity: 0.8 J/gK) was used as the heat absorbent particles used in the heat absorbing layer of the separator, instead of boehmite.

Example 2-141 to Example 2-147

Cylindrical batteries were produced in the same manner as in Example 2-1 to Example 2-7, respectively, except that aluminum hydroxide (specific heat capacity: 1.5 J/gK) was used as the heat absorbent particles used in the heat absorbing layer of the separator, instead of boehmite.

Example 2-148 to Example 2-154

Cylindrical batteries were produced in the same manner as in Example 2-1 to Example 2-7, respectively, except that boron carbide (specific heat capacity: 1.0 J/gK) was used as the heat absorbent particles used in the heat absorbing layer of the separator, instead of boehmite.

Example 2-155 to Example 2-161

Cylindrical batteries were produced in the same manner as in Example 2-1 to Example 2-7, respectively, except that silicon nitride (specific heat capacity: 0.7 J/gK) was used as the heat absorbent particles used in the heat absorbing layer of the separator, instead of boehmite.

Example 2-162 to Example 2-168

Cylindrical batteries were produced in the same manner as in Example 2-1 to Example 2-7, respectively, except that titanium nitride (specific heat capacity: 0.6 J/gK) was used as the heat absorbent particles used in the heat absorbing layer of the separator, instead of boehmite.

Example 2-169 to Example 2-175

Cylindrical batteries were produced in the same manner as in Example 2-1 to Example 2-7, respectively, except that zinc oxide (specific heat capacity: 0.5 J/gK) was used as the heat absorbent particles used in the heat absorbing layer of the separator, instead of boehmite.

Comparative Example 2-1

A cylindrical battery was produced in the same manner as in Example 2-1, except that a polyethylene microporous film having a thickness of 23 μm was used as the separator.

[Evaluation of Batteries: Short Circuit Test]

A short circuit test was carried out in the same manner as in Example 1-1 for the cylindrical batteries of various Examples and various Comparative Examples thus produced.

The evaluation results are presented in the following Table 2.

TABLE 2

| | Negative electrode active material | Heat absorbing layer | | Short circuit test | |
|---|---|---|---|---|---|
| | | Inorganic particles | Resin material | Heat generation temperature | Gas eruption |
| Example 2-1 | Graphite | Boehmite | Polyvinylidene fluoride | 62° C. | No |
| Example 2-2 | | Specific heat capacity: 1.2 J/gK | Polyimide | 63° C. | No |
| Example 2-3 | | | Aramid (polyamide) | 61° C. | No |
| Example 2-4 | | | Polyacrylonitrile | 68° C. | No |
| Example 2-5 | | | Polyvinyl alcohol | 69° C. | No |
| Example 2-6 | | | Polyether | 70° C. | No |

Heat absorbing layer: Heat capacity per area: 0.0006 J/Kcm², heat capacity per volume: 0.4 J/Kcm³

TABLE 2-continued

Heat absorbing layer: Heat capacity per area:
0.0006 J/Kcm², heat capacity per volume: 0.4 J/Kcm³

|  | Negative electrode active material | Heat absorbing layer | | Short circuit test | |
|---|---|---|---|---|---|
|  |  | Inorganic particles | Resin material | Heat generation temperature | Gas eruption |
| Example 2-7 |  |  | Acrylic acid resin | 67° C. | No |
| Example 2-8 |  | Aluminum nitride | Polyvinylidene fluoride | 62° C. | No |
| Example 2-9 |  | Specific heat | Polyimide | 63° C. | No |
| Example 2-10 |  | capacity: 0.7 J/gK | Aramid (polyamide) | 61° C. | No |
| Example 2-11 |  |  | Polyacrylonitrile | 68° C. | No |
| Example 2-12 |  |  | Polyvinyl alcohol | 69° C. | No |
| Example 2-13 |  |  | Polyether | 70° C. | No |
| Example 2-14 |  |  | Acrylic acid resin | 67° C. | No |
| Example 2-15 |  | Boron nitride | Polyvinylidene fluoride | 69° C. | No |
| Example 2-16 |  | Specific heat | Polyimide | 70° C. | No |
| Example 2-17 |  | capacity: 0.8 J/gK | Aramid (polyamide) | 68° C. | No |
| Example 2-18 |  |  | Polyacrylonitrile | 75° C. | No |
| Example 2-19 |  |  | Polyvinyl alcohol | 76° C. | No |
| Example 2-20 |  |  | Polyether | 77° C. | No |
| Example 2-21 |  |  | Acrylic acid resin | 74° C. | No |
| Example 2-22 |  | Silicon carbide | Polyvinylidene fluoride | 62° C. | No |
| Example 2-23 |  | Specific heat | Polyimide | 63° C. | No |
| Example 2-24 |  | capacity: 0.7 J/gK | Aramid (polyamide) | 61° C. | No |
| Example 2-25 |  |  | Polyacrylonitrile | 68° C. | No |
| Example 2-26 |  |  | Polyvinyl alcohol | 69° C. | No |
| Example 2-27 |  |  | Polyether | 70° C. | No |
| Example 2-28 |  |  | Acrylic acid resin | 67° C. | No |
| Example 2-29 |  | Talc | Polyvinylidene fluoride | 62° C. | No |
| Example 2-30 |  | Specific heat | Polyimide | 63° C. | No |
| Example 2-31 |  | capacity: 1.1 J/gK | Aramid (polyamide) | 61° C. | No |
| Example 2-32 |  |  | Polyacrylonitrile | 68° C. | No |
| Example 2-33 |  |  | Polyvinyl alcohol | 69° C. | No |
| Example 2-34 |  |  | Polyether | 70° C. | No |
| Example 2-35 |  |  | Acrylic acid resin | 67° C. | No |
| Example 2-36 |  | Li$_2$O$_4$ | Polyvinylidene fluoride | 69° C. | No |
| Example 2-37 |  | Specific heat | Polyimide | 70° C. | No |
| Example 2-38 |  | capacity: 0.8 J/gK | Aramid (polyamide) | 68° C. | No |
| Example 2-39 |  |  | Polyacrylonitrile | 75° C. | No |
| Example 2-40 |  |  | Polyvinyl alcohol | 76° C. | No |
| Example 2-41 |  |  | Polyether | 77° C. | No |
| Example 2-42 |  |  | Acrylic acid resin | 74° C. | No |
| Example 2-43 |  | Li$_3$PO$_4$ | Polyvinylidene fluoride | 69° C. | No |
| Example 2-44 |  | Specific heat | Polyimide | 70° C. | No |
| Example 2-45 |  | capacity: 0.8 J/gK | Aramid (polyamide) | 68° C. | No |
| Example 2-46 |  |  | Polyacrylonitrile | 75° C. | No |
| Example 2-47 |  |  | Polyvinyl alcohol | 76° C. | No |
| Example 2-48 |  |  | Polyether | 77° C. | No |
| Example 2-49 |  |  | Acrylic acid resin | 74° C. | No |
| Example 2-50 |  | LiF | Polyvinylidene fluoride | 69° C. | No |
| Example 2-51 |  | Specific heat | Polyimide | 70° C. | No |
| Example 2-52 |  | capacity: 0.9 J/gK | Aramid (polyamide) | 68° C. | No |
| Example 2-53 |  |  | Polyacrylonitrile | 75° C. | No |
| Example 2-54 |  |  | Polyvinyl alcohol | 76° C. | No |
| Example 2-55 |  |  | Polyether | 77° C. | No |
| Example 2-56 |  |  | Acrylic acid resin | 74° C. | No |
| Example 2-57 |  | Diamond | Polyvinylidene fluoride | 69° C. | No |
| Example 2-58 |  | Specific heat | Polyimide | 70° C. | No |
| Example 2-59 |  | capacity: 0.5 J/gK | Aramid (polyamide) | 68° C. | No |
| Example 2-60 |  |  | Polyacrylonitrile | 75° C. | No |
| Example 2-61 |  |  | Polyvinyl alcohol | 76° C. | No |
| Example 2-62 |  |  | Polyether | 77° C. | No |
| Example 2-63 |  |  | Acrylic acid resin | 74° C. | No |
| Example 2-64 |  | Zirconium oxide | Polyvinylidene fluoride | 61° C. | No |
| Example 2-65 |  | Specific heat | Polyimide | 62° C. | No |
| Example 2-66 |  | capacity: 0.7 J/gK | Aramid (polyamide) | 60° C. | No |
| Example 2-67 |  |  | Polyacrylonitrile | 67° C. | No |
| Example 2-68 |  |  | Polyvinyl alcohol | 68° C. | No |
| Example 2-69 |  |  | Polyether | 69° C. | No |
| Example 2-70 |  |  | Acrylic acid resin | 66° C. | No |
| Example 2-71 |  | Yttrium oxide | Polyvinylidene fluoride | 68° C. | No |
| Example 2-72 |  | Specific heat | Polyimide | 69° C. | No |
| Example 2-73 |  | capacity: 0.5 J/gK | Aramid (polyamide) | 67° C. | No |
| Example 2-74 |  |  | Polyacrylonitrile | 74° C. | No |
| Example 2-75 |  |  | Polyvinyl alcohol | 75° C. | No |
| Example 2-76 |  |  | Polyether | 76° C. | No |

TABLE 2-continued

Heat absorbing layer: Heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 2-77 | | | Acrylic acid resin | 73° C. | No |
| Example 2-78 | | Barium titanate | Polyvinylidene fluoride | 63° C. | No |
| Example 2-79 | | Specific heat | Polyimide | 64° C. | No |
| Example 2-80 | | capacity: 0.8 J/gK | Aramid (polyamide) | 62° C. | No |
| Example 2-81 | | | Polyacrylonitrile | 69° C. | No |
| Example 2-82 | | | Polyvinyl alcohol | 70° C. | No |
| Example 2-83 | | | Polyether | 71° C. | No |
| Example 2-84 | | | Acrylic acid resin | 68° C. | No |
| Example 2-85 | | Strontium titanate | Polyvinylidene fluoride | 68° C. | No |
| Example 2-86 | | Specific heat | Polyimide | 69° C. | No |
| Example 2-87 | | capacity: 0.8 J/gK | Aramid (polyamide) | 67° C. | No |
| Example 2-88 | | | Polyacrylonitrile | 74° C. | No |
| Example 2-89 | | | Polyvinyl alcohol | 75° C. | No |
| Example 2-90 | | | Polyether | 76° C. | No |
| Example 2-91 | | | Acrylic acid resin | 73° C. | No |
| Example 2-92 | | Silicon oxide | Polyvinylidene fluoride | 63° C. | No |
| Example 2-93 | | Specific heat | Polyimide | 64° C. | No |
| Example 2-94 | | capacity: 0.8 J/gK | Aramid (polyamide) | 62° C. | No |
| Example 2-95 | | | Polyacrylonitrile | 69° C. | No |
| Example 2-96 | | | Polyvinyl alcohol | 70° C. | No |
| Example 2-97 | | | Polyether | 71° C. | No |
| Example 2-98 | | | Acrylic acid resin | 68° C. | No |
| Example 2-99 | | Zeolite | Polyvinylidene fluoride | 69° C. | No |
| Example 2-100 | | Specific heat capacity: 1.0 J/gK | Polyimide | 70° C. | No |
| Example 2-101 | | | Aramid (polyamide) | 68° C. | No |
| Example 2-102 | | | Polyacrylonitrile | 75° C. | No |
| Example 2-103 | | | Polyvinyl alcohol | 76° C. | No |
| Example 2-104 | | | Polyether | 77° C. | No |
| Example 2-105 | | | Acrylic acid resin | 74° C. | No |
| Example 2-106 | | Barium sulfate Specific heat | Polyvinylidene fluoride | 69° C. | No |
| Example 2-107 | | capacity: 0.9 J/gK | Polyimide | 70° C. | No |
| Example 2-108 | | | Aramid (polyamide) | 68° C. | No |
| Example 2-109 | | | Polyacrylonitrile | 75° C. | No |
| Example 2-110 | | | Polyvinyl alcohol | 76° C. | No |
| Example 2-111 | | | Polyether | 77° C. | No |
| Example 2-112 | | | Acrylic acid resin | 74° C. | No |
| Example 2-113 | | Titanium oxide Specific heat | Polyvinylidene fluoride | 62° C. | No |
| Example 2-114 | | capacity: 0.8 J/gK | Polyimide | 63° C. | No |
| Example 2-115 | | | Aramid (polyamide) | 61° C. | No |
| Example 2-116 | | | Polyacrylonitrile | 68° C. | No |
| Example 2-117 | | | Polyvinyl alcohol | 69° C. | No |
| Example 2-118 | | | Polyether | 70° C. | No |
| Example 2-119 | | | Acrylic acid resin | 67° C. | No |
| Example 2-120 | | Magnesium oxide Specific heat | Polyvinylidene fluoride | 62° C. | No |
| Example 2-121 | | capacity: 1.0 J/gK | Polyimide | 63° C. | No |
| Example 2-122 | | | Aramid (polyamide) | 61° C. | No |

TABLE 2-continued

Heat absorbing layer: Heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 2-123 | | | Polyacrylonitrile | 68° C. | No |
| Example 2-124 | | | Polyvinyl alcohol | 69° C. | No |
| Example 2-125 | | | Polyether | 70° C. | No |
| Example 2-126 | | | Acrylic acid resin | 67° C. | No |
| Example 2-127 | | Graphite Specific heat capacity: 0.8 J/gK | Polyvinylidene fluoride | 69° C. | No |
| Example 2-128 | | | Polyimide | 70° C. | No |
| Example 2-129 | | | Aramid (polyamide) | 68° C. | No |
| Example 2-130 | | | Polyacrylonitrile | 75° C. | No |
| Example 2-131 | | | Polyvinyl alcohol | 76° C. | No |
| Example 2-132 | | | Polyether | 77° C. | No |
| Example 2-133 | | | Acrylic acid resin | 74° C. | No |
| Example 2-134 | | Carbon nanotubes Specific heat capacity: 0.8 J/gK | Polyvinylidene fluoride | 69° C. | No |
| Example 2-135 | | | Polyimide | 70° C. | No |
| Example 2-136 | | | Aramid (polyamide) | 68° C. | No |
| Example 2-137 | | | Polyacrylonitrile | 75° C. | No |
| Example 2-138 | | | Polyvinyl alcohol | 76° C. | No |
| Example 2-139 | | | Polyether | 77° C. | No |
| Example 2-140 | | | Acrylic acid resin | 74° C. | No |
| Example 2-141 | | Aluminum hydroxide Specific heat capacity: 1.5 J/gK | Polyvinylidene fluoride | 69° C. | No |
| Example 2-142 | | | Polyimide | 70° C. | No |
| Example 2-143 | | | Aramid (polyamide) | 68° C. | No |
| Example 2-144 | | | Polyacrylonitrile | 75° C. | No |
| Example 2-145 | | | Polyvinyl alcohol | 76° C. | No |
| Example 2-146 | | | Polyether | 77° C. | No |
| Example 2-147 | | | Acrylic acid resin | 74° C. | No |
| Example 2-148 | | Boron carbide Specific heat capacity: 1.0 J/gK | Polyvinylidene fluoride | 69° C. | No |
| Example 2-149 | | | Polyimide | 70° C. | No |
| Example 2-150 | | | Aramid (polyamide) | 68° C. | No |
| Example 2-151 | | | Polyacrylonitrile | 75° C. | No |
| Example 2-152 | | | Polyvinyl alcohol | 76° C. | No |
| Example 2-153 | | | Polyether | 77° C. | No |
| Example 2-154 | | | Acrylic acid resin | 74° C. | No |
| Example 2-155 | | Silicon nitride Specific heat capacity: 0.7 J/gK | Polyvinylidene fluoride | 69° C. | No |
| Example 2-156 | | | Polyimide | 70° C. | No |
| Example 2-157 | | | Aramid (polyamide) | 68° C. | No |

TABLE 2-continued

Heat absorbing layer: Heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 2-158 | | | Polyacrylonitrile | 75° C. | No |
| Example 2-159 | | | Polyvinyl alcohol | 76° C. | No |
| Example 2-160 | | | Polyether | 77° C. | No |
| Example 2-161 | | | Acrylic acid resin | 74° C. | No |
| Example 2-162 | | Titanium nitride Specific heat capacity: 0.6 J/gK | Polyvinylidene fluoride | 69° C. | No |
| Example 2-163 | | | Polyimide | 70° C. | No |
| Example 2-164 | | | Aramid (polyamide) | 68° C. | No |
| Example 2-165 | | | Polyacrylonitrile | 75° C. | No |
| Example 2-166 | | | Polyvinyl alcohol | 76° C. | No |
| Example 2-167 | | | Polyether | 77° C. | No |
| Example 2-168 | | | Acrylic acid resin | 74° C. | No |
| Example 2-169 | | Zinc oxide Specific heat capacity: 0.5 J/gK | Polyvinylidene fluoride | 69° C. | No |
| Example 2-170 | | | Polyimide | 70° C. | No |
| Example 2-171 | | | Aramid (polyamide) | 68° C. | No |
| Example 2-172 | | | Polyacrylonitrile | 75° C. | No |
| Example 2-173 | | | Polyvinyl alcohol | 76° C. | No |
| Example 2-174 | | | Polyether | 77° C. | No |
| Example 2-175 | | | Acrylic acid resin | 74° C. | No |
| Comparative Example 2-1 | Graphite | — | — | 500° C. | Yes |

As can be seen from Table 2, in the cylindrical batteries of various Examples that used a separator having a heat absorbing layer that was produced such that the total heat capacity per unit area was 0.0006 J/Kcm² and the total heat capacity per unit volume was 0.4 J/Kcm³, the heat generation temperature in the short circuit test was low, such as 80° C. or lower, and the cylindrical batteries were highly safe. On the other hand, with a separator that did not have a heat absorbing layer such as described above, the cylindrical battery in the short circuit test was in a hazardous state.

Example 3-1 to Example 3-175 and Comparative Example 3-1

Cylindrical batteries of Example 3-1 to Example 3-175 and Comparative Example 3-1 were produced in the same manner as in Example 2-1 to Example 2-175 and Comparative Example 2-1, respectively, except that silicon similar to that of Example 1-13 was used as the negative electrode active material, instead of graphite. Meanwhile, the negative electrode mix slurry that formed the negative electrode active material layer was produced to have a composition similar to that of Example 1-13.

[Evaluation of Batteries: Short Circuit Test]

For the cylindrical batteries of various Examples and various Comparative Examples thus produced, a short circuit test was carried out in the same manner as in Example 1-1.

The evaluation results are presented in the following Table 3.

TABLE 3

Heat absorbing layer: Heat capacity per area:
0.0006 J/Kcm², heat capacity per volume: 0.4 J/Kcm³

|  | Negative electrode active material | Heat absorbing layer | | Short circuit test | |
| --- | --- | --- | --- | --- | --- |
|  |  | Inorganic particles | Resin material | Heat generation temperature | Gas eruption |
| Example 3-1 | Silicon | Boehmite | Polyvinylidene fluoride | 72° C. | No |
| Example 3-2 |  | Specific heat | Polyimide | 73° C. | No |
| Example 3-3 |  | capacity: 1.2 J/gK | Aramid (polyamide) | 71° C. | No |
| Example 3-4 |  |  | Polyacrylonitrile | 78° C. | No |
| Example 3-5 |  |  | Polyvinyl alcohol | 79° C. | No |
| Example 3-6 |  |  | Polyether | 80° C. | No |
| Example 3-7 |  |  | Acrylic acid resin | 77° C. | No |
| Example 3-8 |  | Aluminum nitride | Polyvinylidene fluoride | 72° C. | No |
| Example 3-9 |  | Specific heat | Polyimide | 73° C. | No |
| Example 3-10 |  | capacity: 0.7 J/gK | Aramid (polyamide) | 71° C. | No |
| Example 3-11 |  |  | Polyacrylonitrile | 78° C. | No |
| Example 3-12 |  |  | Polyvinyl alcohol | 79° C. | No |
| Example 3-13 |  |  | Polyether | 80° C. | No |
| Example 3-14 |  |  | Acrylic acid resin | 77° C. | No |
| Example 3-15 |  | Boron nitride | Polyvinylidene fluoride | 79° C. | No |
| Example 3-16 |  | Specific heat | Polyimide | 80° C. | No |
| Example 3-17 |  | capacity: 0.8 J/gK | Aramid (polyamide) | 78° C. | No |
| Example 3-18 |  |  | Polyacrylonitrile | 85° C. | No |
| Example 3-19 |  |  | Polyvinyl alcohol | 86° C. | No |
| Example 3-20 |  |  | Polyether | 87° C. | No |
| Example 3-21 |  |  | Acrylic acid resin | 84° C. | No |
| Example 3-22 |  | Silicon carbide | Polyvinylidene fluoride | 72° C. | No |
| Example 3-23 |  | Specific heat | Polyimide | 73° C. | No |
| Example 3-24 |  | capacity: 0.7 J/gK | Aramid (polyamide) | 71° C. | No |
| Example 3-25 |  |  | Polyacrylonitrile | 78° C. | No |
| Example 3-26 |  |  | Polyvinyl alcohol | 79° C. | No |
| Example 3-27 |  |  | Polyether | 80° C. | No |
| Example 3-28 |  |  | Acrylic acid resin | 77° C. | No |
| Example 3-29 |  | Talc | Polyvinylidene fluoride | 72° C. | No |
| Example 3-30 |  | Specific heat | Polyimide | 73° C. | No |
| Example 3-31 |  | capacity: 1.1 J/gK | Aramid (polyamide) | 71° C. | No |
| Example 3-32 |  |  | Polyacrylonitrile | 78° C. | No |
| Example 3-33 |  |  | Polyvinyl alcohol | 79° C. | No |
| Example 3-34 |  |  | Polyether | 80° C. | No |
| Example 3-35 |  |  | Acrylic acid resin | 77° C. | No |
| Example 3-36 |  | $Li_2O_4$ | Polyvinylidene fluoride | 79° C. | No |
| Example 3-37 |  | Specific heat | Polyimide | 80° C. | No |
| Example 3-38 |  | capacity: 0.8 J/gK | Aramid (polyamide) | 78° C. | No |
| Example 3-39 |  |  | Polyacrylonitrile | 85° C. | No |
| Example 3-40 |  |  | Polyvinyl alcohol | 86° C. | No |
| Example 3-41 |  |  | Polyether | 87° C. | No |
| Example 3-42 |  |  | Acrylic acid resin | 84° C. | No |
| Example 3-43 |  | $Li_3PO_4$ | Polyvinylidene fluoride | 79° C. | No |
| Example 3-44 |  | Specific heat | Polyimide | 80° C. | No |
| Example 3-45 |  | capacity: 0.8 J/gK | Aramid (polyamide) | 78° C. | No |
| Example 3-46 |  |  | Polyacrylonitrile | 85° C. | No |
| Example 3-47 |  |  | Polyvinyl alcohol | 86° C. | No |
| Example 3-48 |  |  | Polyether | 87° C. | No |
| Example 3-49 |  |  | Acrylic acid resin | 84° C. | No |
| Example 3-50 |  | LiF | Polyvinylidene fluoride | 79° C. | No |
| Example 3-51 |  | Specific heat | Polyimide | 80° C. | No |
| Example 3-52 |  | capacity: 0.9 J/gK | Aramid (polyamide) | 78° C. | No |
| Example 3-53 |  |  | Polyacrylonitrile | 85° C. | No |
| Example 3-54 |  |  | Polyvinyl alcohol | 86° C. | No |
| Example 3-55 |  |  | Polyether | 87° C. | No |
| Example 3-56 |  |  | Acrylic acid resin | 84° C. | No |
| Example 3-57 |  | Diamond | Polyvinylidene fluoride | 79° C. | No |
| Example 3-58 |  | Specific heat | Polyimide | 80° C. | No |
| Example 3-59 |  | capacity: 0.5 J/gK | Aramid (polyamide) | 78° C. | No |
| Example 3-60 |  |  | Polyacrylonitrile | 85° C. | No |
| Example 3-61 |  |  | Polyvinyl alcohol | 86° C. | No |
| Example 3-62 |  |  | Polyether | 87° C. | No |
| Example 3-63 |  |  | Acrylic acid resin | 84° C. | No |
| Example 3-64 |  | Zirconium oxide | Polyvinylidene fluoride | 71° C. | No |
| Example 3-65 |  | Specific heat | Polyimide | 72° C. | No |
| Example 3-66 |  | capacity: 0.7 J/gK | Aramid (polyamide) | 70° C. | No |
| Example 3-67 |  |  | Polyacrylonitrile | 77° C. | No |
| Example 3-68 |  |  | Polyvinyl alcohol | 78° C. | No |
| Example 3-69 |  |  | Polyether | 79° C. | No |
| Example 3-70 |  |  | Acrylic acid resin | 76° C. | No |
| Example 3-71 |  | Yttrium oxide | Polyvinylidene fluoride | 78° C. | No |

TABLE 3-continued

Heat absorbing layer: Heat capacity per area:
0.0006 J/Kcm², heat capacity per volume: 0.4 J/Kcm³

| | Negative electrode active material | Heat absorbing layer Inorganic particles | Heat absorbing layer Resin material | Short circuit test Heat generation temperature | Short circuit test Gas eruption |
|---|---|---|---|---|---|
| Example 3-72 | | Specific heat capacity: 0.5 J/gK | Polyimide | 79° C. | No |
| Example 3-73 | | | Aramid (polyamide) | 77° C. | No |
| Example 3-74 | | | Polyacrylonitrile | 84° C. | No |
| Example 3-75 | | | Polyvinyl alcohol | 85° C. | No |
| Example 3-76 | | | Polyether | 86° C. | No |
| Example 3-77 | | | Acrylic acid resin | 83° C. | No |
| Example 3-78 | | Barium titanate | Polyvinylidene fluoride | 73° C. | No |
| Example 3-79 | | Specific heat capacity: 0.8 J/gK | Polyimide | 74° C. | No |
| Example 3-80 | | | Aramid (polyamide) | 72° C. | No |
| Example 3-81 | | | Polyacrylonitrile | 79° C. | No |
| Example 3-82 | | | Polyvinyl alcohol | 80° C. | No |
| Example 3-83 | | | Polyether | 81° C. | No |
| Example 3-84 | | | Acrylic acid resin | 78° C. | No |
| Example 3-85 | | Strontium titanate | Polyvinylidene fluoride | 78° C. | No |
| Example 3-86 | | Specific heat capacity: 0.8 J/gK | Polyimide | 79° C. | No |
| Example 3-87 | | | Aramid (polyamide) | 77° C. | No |
| Example 3-88 | | | Polyacrylonitrile | 84° C. | No |
| Example 3-89 | | | Polyvinyl alcohol | 85° C. | No |
| Example 3-90 | | | Polyether | 86° C. | No |
| Example 3-91 | | | Acrylic acid resin | 83° C. | No |
| Example 3-92 | | Silicon oxide | Polyvinylidene fluoride | 73° C. | No |
| Example 3-93 | | Specific heat capacity: 0.8 J/gK | Polyimide | 74° C. | No |
| Example 3-94 | | | Aramid (polyamide) | 72° C. | No |
| Example 3-95 | | | Polyacrylonitrile | 79° C. | No |
| Example 3-96 | | | Polyvinyl alcohol | 80° C. | No |
| Example 3-97 | | | Polyether | 81° C. | No |
| Example 3-98 | | | Acrylic acid resin | 78° C. | No |
| Example 3-99 | | Zeolite | Polyvinylidene fluoride | 79° C. | No |
| Example 3-100 | | Specific heat capacity: 1.0 J/gK | Polyimide | 80° C. | No |
| Example 3-101 | | | Aramid (polyamide) | 78° C. | No |
| Example 3-102 | | | Polyacrylonitrile | 85° C. | No |
| Example 3-103 | | | Polyvinyl alcohol | 86° C. | No |
| Example 3-104 | | | Polyether | 87° C. | No |
| Example 3-105 | | | Acrylic acid resin | 84° C. | No |
| Example 3-106 | | Barium sulfate Specific heat capacity: 0.9 J/gK | Polyvinylidene fluoride | 79° C. | No |
| Example 3-107 | | | Polyimide | 80° C. | No |
| Example 3-108 | | | Aramid (polyamide) | 78° C. | No |
| Example 3-109 | | | Polyacrylonitrile | 85° C. | No |
| Example 3-110 | | | Polyvinyl alcohol | 86° C. | No |
| Example 3-111 | | | Polyether | 87° C. | No |
| Example 3-112 | | | Acrylic acid resin | 84° C. | No |
| Example 3-113 | | Titanium oxide Specific heat capacity: 0.8 J/gK | Polyvinylidene fluoride | 72° C. | No |
| Example 3-114 | | | Polyimide | 73° C. | No |
| Example 3-115 | | | Aramid (polyamide) | 71° C. | No |
| Example 3-116 | | | Polyacrylonitrile | 78° C. | No |
| Example 3-117 | | | Polyvinyl alcohol | 79° C. | No |
| Example 3-118 | | | Polyether | 80° C. | No |
| Example 3-119 | | | Acrylic acid resin | 77° C. | No |
| Example 3-120 | | Magnesium oxide Specific heat | Polyvinylidene fluoride | 72° C. | No |

TABLE 3-continued

Heat absorbing layer: Heat capacity per area: 0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 3-121 | | capacity: 1.0 J/gK | Polyimide | 73° C. | No |
| Example 3-122 | | | Aramid (polyamide) | 71° C. | No |
| Example 3-123 | | | Polyacrylonitrile | 78° C. | No |
| Example 3-124 | | | Polyvinyl alcohol | 79° C. | No |
| Example 3-125 | | | Polyether | 80° C. | No |
| Example 3-126 | | | Acrylic acid resin | 77° C. | No |
| Example 3-127 | | Graphite Specific heat capacity: 0.8 J/gK | Polyvinylidene fluoride | 79° C. | No |
| Example 3-128 | | | Polyimide | 80° C. | No |
| Example 3-129 | | | Aramid (polyamide) | 78° C. | No |
| Example 3-130 | | | Polyacrylonitrile | 85° C. | No |
| Example 3-131 | | | Polyvinyl alcohol | 86° C. | No |
| Example 3-132 | | | Polyether | 87° C. | No |
| Example 3-133 | | | Acrylic acid resin | 84° C. | No |
| Example 3-134 | | Carbon nanotubes Specific heat capacity: 0.8 J/gK | Polyvinylidene fluoride | 79° C. | No |
| Example 3-135 | | | Polyimide | 80° C. | No |
| Example 3-136 | | | Aramid (polyamide) | 78° C. | No |
| Example 3-137 | | | Polyacrylonitrile | 85° C. | No |
| Example 3-138 | | | Polyvinyl alcohol | 86° C. | No |
| Example 3-139 | | | Polyether | 87° C. | No |
| Example 3-140 | | | Acrylic acid resin | 84° C. | No |
| Example 3-141 | | Aluminum hydroxide Specific heat capacity: 1.5 J/gK | Polyvinylidene fluoride | 79° C. | No |
| Example 3-142 | | | Polyimide | 80° C. | No |
| Example 3-143 | | | Aramid (polyamide) | 78° C. | No |
| Example 3-144 | | | Polyacrylonitrile | 85° C. | No |
| Example 3-145 | | | Polyvinyl alcohol | 86° C. | No |
| Example 3-146 | | | Polyether | 87° C. | No |
| Example 3-147 | | | Acrylic acid resin | 84° C. | No |
| Example 3-148 | | Boron carbide Specific heat capacity: 1.0 J/gK | Polyvinylidene fluoride | 79° C. | No |
| Example 3-149 | | | Polyimide | 80° C. | No |
| Example 3-150 | | | Aramid (polyamide) | 78° C. | No |
| Example 3-151 | | | Polyacrylonitrile | 85° C. | No |
| Example 3-152 | | | Polyvinyl alcohol | 86° C. | No |
| Example 3-153 | | | Polyether | 87° C. | No |
| Example 3-154 | | | Acrylic acid resin | 84° C. | No |
| Example 3-155 | | Silicon nitride Specific heat | Polyvinylidene fluoride | 79° C. | No |

TABLE 3-continued

Heat absorbing layer: Heat capacity per area:
0.0006 J/Kcm², heat capacity per volume: 0.4 J/Kcm³

| | Negative electrode active material | Heat absorbing layer Inorganic particles | Heat absorbing layer Resin material | Short circuit test Heat generation temperature | Short circuit test Gas eruption |
|---|---|---|---|---|---|
| Example 3-156 | | capacity: 0.7 J/gK | Polyimide | 80° C. | No |
| Example 3-157 | | | Aramid (polyamide) | 78° C. | No |
| Example 3-158 | | | Polyacrylonitrile | 85° C. | No |
| Example 3-159 | | | Polyvinyl alcohol | 86° C. | No |
| Example 3-160 | | | Polyether | 87° C. | No |
| Example 3-161 | | | Acrylic acid resin | 84° C. | No |
| Example 3-162 | | Titanium nitride Specific heat capacity: 0.6 J/gK | Polyvinylidene fluoride | 79° C. | No |
| Example 3-163 | | | Polyimide | 80° C. | No |
| Example 3-164 | | | Aramid (polyamide) | 78° C. | No |
| Example 3-165 | | | Polyacrylonitrile | 85° C. | No |
| Example 3-166 | | | Polyvinyl alcohol | 86° C. | No |
| Example 3-167 | | | Polyether | 87° C. | No |
| Example 3-168 | | | Acrylic acid resin | 84° C. | No |
| Example 3-169 | | Zinc oxide Specific heat capacity: 0.5 J/gK | Polyvinylidene fluoride | 79° C. | No |
| Example 3-170 | | | Polyimide | 80° C. | No |
| Example 3-171 | | | Aramid (polyamide) | 78° C. | No |
| Example 3-172 | | | Polyacrylonitrile | 85° C. | No |
| Example 3-173 | | | Polyvinyl alcohol | 86° C. | No |
| Example 3-174 | | | Polyether | 87° C. | No |
| Example 3-175 | | | Acrylic acid resin | 84° C. | No |
| Comparative Example 3-1 | Silicon | — | — | 500° C. | Yes |

As can be seen from Table 3, in the cylindrical batteries of various Examples that used a separator having a heat absorbing layer that was produced such that the total heat capacity per unit area was 0.0006 J/Kcm² and the total heat capacity per unit volume was 0.4 J/Kcm³, even if silicon was used as the negative electrode active material, the heat generation temperature in the short circuit test was low, such as below 80° C., and the cylindrical batteries were highly safe. On the other hand, with a separator that did not have a heat absorbing layer such as described above, the cylindrical battery in the short circuit test was in a hazardous state.

Example 4-1 to Example 4-175 and Comparative Example 4-1

Cylindrical batteries of Example 4-1 to Example 4-175 and Comparative Example 4-1 were produced in the same manner as in Example 2-1 to Example 2-175 and Comparative Example 2-1, respectively, except that a carbon-tin composite material similar to that of Example 1-25 was used as the negative electrode active material, instead of graphite. Meanwhile, the negative electrode mix slurry that formed the negative electrode active material layer was produced to have a composition similar to that of Example 1-25.

[Evaluation of Batteries: Short Circuit Test]

For the cylindrical batteries of various Examples and various Comparative Examples thus produced, a short circuit test was carried out in the same manner as in Example 1-1.

The evaluation results are presented in the following Table 4.

TABLE 4

Heat absorbing layer: Heat capacity per area:
0.0006 J/Kcm², heat capacity per volume: 0.4 J/Kcm³

|  | Negative electrode active material | Heat absorbing layer Inorganic particles | Resin material | Short circuit test Heat generation temperature | Gas eruption |
|---|---|---|---|---|---|
| Example 4-1 | Carbon-tin composite material | Boehmite Specific heat capacity: 1.2 J/gK | Polyvinylidene fluoride | 66° C. | No |
| Example 4-2 | | | Polyimide | 63° C. | No |
| Example 4-3 | | | Aramid (polyamide) | 61° C. | No |
| Example 4-4 | | | Polyacrylonitrile | 68° C. | No |
| Example 4-5 | | | Polyvinyl alcohol | 69° C. | No |
| Example 4-6 | | | Polyether | 70° C. | No |
| Example 4-7 | | | Acrylic acid resin | 67° C. | No |
| Example 4-8 | | Aluminum nitride Specific heat capacity: 0.7 J/gK | Polyvinylidene fluoride | 66° C. | No |
| Example 4-9 | | | Polyimide | 63° C. | No |
| Example 4-10 | | | Aramid (polyamide) | 61° C. | No |
| Example 4-11 | | | Polyacrylonitrile | 68° C. | No |
| Example 4-12 | | | Polyvinyl alcohol | 69° C. | No |
| Example 4-13 | | | Polyether | 70° C. | No |
| Example 4-14 | | | Acrylic acid resin | 67° C. | No |
| Example 4-15 | | Boron nitride Specific heat capacity: 0.8 J/gK | Polyvinylidene fluoride | 73° C. | No |
| Example 4-16 | | | Polyimide | 74° C. | No |
| Example 4-17 | | | Aramid (polyamide) | 72° C. | No |
| Example 4-18 | | | Polyacrylonitrile | 79° C. | No |
| Example 4-19 | | | Polyvinyl alcohol | 80° C. | No |
| Example 4-20 | | | Polyether | 81° C. | No |
| Example 4-21 | | | Acrylic acid resin | 78° C. | No |
| Example 4-22 | | Silicon carbide Specific heat capacity: 0.7 J/gK | Polyvinylidene fluoride | 66° C. | No |
| Example 4-23 | | | Polyimide | 67° C. | No |
| Example 4-24 | | | Aramid (polyamide) | 65° C. | No |
| Example 4-25 | | | Polyacrylonitrile | 72° C. | No |
| Example 4-26 | | | Polyvinyl alcohol | 73° C. | No |
| Example 4-27 | | | Polyether | 74° C. | No |
| Example 4-28 | | | Acrylic acid resin | 71° C. | No |
| Example 4-29 | | Talc Specific heat capacity: 1.1 J/gK | Polyvinylidene fluoride | 66° C. | No |
| Example 4-30 | | | Polyimide | 63° C. | No |
| Example 4-31 | | | Aramid (polyamide) | 61° C. | No |
| Example 4-32 | | | Polyacrylonitrile | 68° C. | No |
| Example 4-33 | | | Polyvinyl alcohol | 69° C. | No |
| Example 4-34 | | | Polyether | 70° C. | No |
| Example 4-35 | | | Acrylic acid resin | 67° C. | No |
| Example 4-36 | | $Li_2O_4$ Specific heat capacity: 0.8 J/gK | Polyvinylidene fluoride | 73° C. | No |
| Example 4-37 | | | Polyimide | 74° C. | No |
| Example 4-38 | | | Aramid (polyamide) | 72° C. | No |
| Example 4-39 | | | Polyacrylonitrile | 79° C. | No |
| Example 4-40 | | | Polyvinyl alcohol | 80° C. | No |
| Example 4-41 | | | Polyether | 81° C. | No |
| Example 4-42 | | | Acrylic acid resin | 78° C. | No |
| Example 4-43 | | $Li_3PO_4$ Specific heat capacity: 0.8 J/gK | Polyvinylidene fluoride | 73° C. | No |
| Example 4-44 | | | Polyimide | 74° C. | No |
| Example 4-45 | | | Aramid (polyamide) | 72° C. | No |
| Example 4-46 | | | Polyacrylonitrile | 79° C. | No |
| Example 4-47 | | | Polyvinyl alcohol | 80° C. | No |
| Example 4-48 | | | Polyether | 81° C. | No |
| Example 4-49 | | | Acrylic acid resin | 78° C. | No |
| Example 4-50 | | LiF Specific heat capacity: 0.9 J/gK | Polyvinylidene fluoride | 73° C. | No |
| Example 4-51 | | | Polyimide | 74° C. | No |
| Example 4-52 | | | Aramid (polyamide) | 72° C. | No |
| Example 4-53 | | | Polyacrylonitrile | 79° C. | No |
| Example 4-54 | | | Polyvinyl alcohol | 80° C. | No |
| Example 4-55 | | | Polyether | 81° C. | No |
| Example 4-56 | | | Acrylic acid resin | 78° C. | No |
| Example 4-57 | | Diamond Specific heat capacity: 0.5 J/gK | Polyvinylidene fluoride | 73° C. | No |
| Example 4-58 | | | Polyimide | 74° C. | No |
| Example 4-59 | | | Aramid (polyamide) | 72° C. | No |
| Example 4-60 | | | Polyacrylonitrile | 79° C. | No |
| Example 4-61 | | | Polyvinyl alcohol | 80° C. | No |
| Example 4-62 | | | Polyether | 81° C. | No |
| Example 4-63 | | | Acrylic acid resin | 78° C. | No |
| Example 4-64 | | Zirconium oxide Specific heat capacity: 0.7 J/gK | Polyvinylidene fluoride | 65° C. | No |
| Example 4-65 | | | Polyimide | 62° C. | No |
| Example 4-66 | | | Aramid (polyamide) | 60° C. | No |
| Example 4-67 | | | Polyacrylonitrile | 67° C. | No |
| Example 4-68 | | | Polyvinyl alcohol | 68° C. | No |
| Example 4-69 | | | Polyether | 69° C. | No |
| Example 4-70 | | | Acrylic acid resin | 66° C. | No |
| Example 4-71 | | Yttrium oxide | Polyvinylidene fluoride | 72° C. | No |

TABLE 4-continued

Heat absorbing layer: Heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 4-72 | | Specific heat capacity: 0.5 J/gK | Polyimide | 73° C. | No |
| Example 4-73 | | | Aramid (polyamide) | 71° C. | No |
| Example 4-74 | | | Polyacrylonitrile | 78° C. | No |
| Example 4-75 | | | Polyvinyl alcohol | 79° C. | No |
| Example 4-76 | | | Polyether | 80° C. | No |
| Example 4-77 | | | Acrylic acid resin | 77° C. | No |
| Example 4-78 | | Barium titanate Specific heat capacity: 0.8 J/gK | Polyvinylidene fluoride | 67° C. | No |
| Example 4-79 | | | Polyimide | 68° C. | No |
| Example 4-80 | | | Aramid (polyamide) | 66° C. | No |
| Example 4-81 | | | Polyacrylonitrile | 73° C. | No |
| Example 4-82 | | | Polyvinyl alcohol | 74° C. | No |
| Example 4-83 | | | Polyether | 75° C. | No |
| Example 4-84 | | | Acrylic acid resin | 72° C. | No |
| Example 4-85 | | Strontium titanate Specific heat capacity: 0.8 J/gK | Polyvinylidene fluoride | 72° C. | No |
| Example 4-86 | | | Polyimide | 73° C. | No |
| Example 4-87 | | | Aramid (polyamide) | 71° C. | No |
| Example 4-88 | | | Polyacrylonitrile | 78° C. | No |
| Example 4-89 | | | Polyvinyl alcohol | 79° C. | No |
| Example 4-90 | | | Polyether | 80° C. | No |
| Example 4-91 | | | Acrylic acid resin | 77° C. | No |
| Example 4-92 | | Silicon oxide Specific heat capacity: 0.8 J/gK | Polyvinylidene fluoride | 67° C. | No |
| Example 4-93 | | | Polyimide | 68° C. | No |
| Example 4-94 | | | Aramid (polyamide) | 66° C. | No |
| Example 4-95 | | | Polyacrylonitrile | 73° C. | No |
| Example 4-96 | | | Polyvinyl alcohol | 74° C. | No |
| Example 4-97 | | | Polyether | 75° C. | No |
| Example 4-98 | | | Acrylic acid resin | 72° C. | No |
| Example 4-99 | | Zeolite Specific heat capacity: 1.0 J/gK | Polyvinylidene fluoride | 73° C. | No |
| Example 4-100 | | | Polyimide | 74° C. | No |
| Example 4-101 | | | Aramid (polyamide) | 72° C. | No |
| Example 4-102 | | | Polyacrylonitrile | 79° C. | No |
| Example 4-103 | | | Polyvinyl alcohol | 80° C. | No |
| Example 4-104 | | | Polyether | 81° C. | No |
| Example 4-105 | | | Acrylic acid resin | 78° C. | No |
| Example 4-106 | | Barium sulfate Specific heat capacity: 0.9 J/gK | Polyvinylidene fluoride | 73° C. | No |
| Example 4-107 | | | Polyimide | 74° C. | No |
| Example 4-108 | | | Aramid (polyamide) | 72° C. | No |
| Example 4-109 | | | Polyacrylonitrile | 79° C. | No |
| Example 4-110 | | | Polyvinyl alcohol | 80° C. | No |
| Example 4-111 | | | Polyether | 81° C. | No |
| Example 4-112 | | | Acrylic acid resin | 78° C. | No |
| Example 4-113 | | Titanium oxide Specific heat capacity: 0.8 J/gK | Polyvinylidene fluoride | 66° C. | No |
| Example 4-114 | | | Polyimide | 63° C. | No |
| Example 4-115 | | | Aramid (polyamide) | 61° C. | No |
| Example 4-116 | | | Polyacrylonitrile | 68° C. | No |
| Example 4-117 | | | Polyvinyl alcohol | 69° C. | No |
| Example 4-118 | | | Polyether | 70° C. | No |
| Example 4-119 | | | Acrylic acid resin | 67° C. | No |
| Example 4-120 | | Magnesium oxide Specific heat capacity: 1.0 J/gK | Polyvinylidene fluoride | 66° C. | No |
| Example 4-121 | | | Polyimide | 63° C. | No |
| Example 4-122 | | | Aramid (polyamide) | 61° C. | No |
| Example 4-123 | | | Polyacrylonitrile | 68° C. | No |
| Example 4-124 | | | Polyvinyl alcohol | 69° C. | No |
| Example 4-125 | | | Polyether | 70° C. | No |
| Example 4-126 | | | Acrylic acid resin | 67° C. | No |
| Example 4-127 | | Graphite Specific heat capacity: 0.8 J/gK | Polyvinylidene fluoride | 73° C. | No |
| Example 4-128 | | | Polyimide | 74° C. | No |
| Example 4-129 | | | Aramid (polyamide) | 72° C. | No |
| Example 4-130 | | | Polyacrylonitrile | 79° C. | No |
| Example 4-131 | | | Polyvinyl alcohol | 80° C. | No |
| Example 4-132 | | | Polyether | 81° C. | No |
| Example 4-133 | | | Acrylic acid resin | 78° C. | No |
| Example 4-134 | | Carbon nanotubes Specific heat capacity: 0.8 J/gK | Polyvinylidene fluoride | 73° C. | No |
| Example 4-135 | | | Polyimide | 74° C. | No |
| Example 4-136 | | | Aramid (polyamide) | 72° C. | No |
| Example 4-137 | | | Polyacrylonitrile | 79° C. | No |
| Example 4-138 | | | Polyvinyl alcohol | 80° C. | No |
| Example 4-139 | | | Polyether | 81° C. | No |
| Example 4-140 | | | Acrylic acid resin | 78° C. | No |
| Example 4-141 | | Aluminum hydroxide | Polyvinylidene fluoride | 73° C. | No |
| Example 4-142 | | | Polyimide | 74° C. | No |

TABLE 4-continued

Heat absorbing layer: Heat capacity per area:
0.0006 J/Kcm², heat capacity per volume: 0.4 J/Kcm³

| | Negative electrode active material | Heat absorbing layer Inorganic particles | Heat absorbing layer Resin material | Short circuit test Heat generation temperature | Short circuit test Gas eruption |
|---|---|---|---|---|---|
| Example 4-143 | | Specific heat | Aramid (polyamide) | 72° C. | No |
| Example 4-144 | | capacity: 1.5 J/gK | Polyacrylonitrile | 79° C. | No |
| Example 4-145 | | | Polyvinyl alcohol | 80° C. | No |
| Example 4-146 | | | Polyether | 81° C. | No |
| Example 4-147 | | | Acrylic acid resin | 78° C. | No |
| Example 4-148 | | Boron carbide | Polyvinylidene fluoride | 73° C. | No |
| Example 4-149 | | Specific heat | Polyimide | 74° C. | No |
| Example 4-150 | | capacity: 1.0 J/gK | Aramid (polyamide) | 72° C. | No |
| Example 4-151 | | | Polyacrylonitrile | 79° C. | No |
| Example 4-152 | | | Polyvinyl alcohol | 80° C. | No |
| Example 4-153 | | | Polyether | 81° C. | No |
| Example 4-154 | | | Acrylic acid resin | 78° C. | No |
| Example 4-155 | | Silicon nitride | Polyvinylidene fluoride | 73° C. | No |
| Example 4-156 | | Specific heat | Polyimide | 74° C. | No |
| Example 4-157 | | capacity: 0.7 J/gK | Aramid (polyamide) | 72° C. | No |
| Example 4-158 | | | Polyacrylonitrile | 79° C. | No |
| Example 4-159 | | | Polyvinyl alcohol | 80° C. | No |
| Example 4-160 | | | Polyether | 81° C. | No |
| Example 4-161 | | | Acrylic acid resin | 78° C. | No |
| Example 4-162 | | Titanium nitride | Polyvinylidene fluoride | 73° C. | No |
| Example 4-163 | | Specific heat | Polyimide | 74° C. | No |
| Example 4-164 | | capacity: 0.6 J/gK | Aramid (polyamide) | 72° C. | No |
| Example 4-165 | | | Polyacrylonitrile | 79° C. | No |
| Example 4-166 | | | Polyvinyl alcohol | 80° C. | No |
| Example 4-167 | | | Polyether | 81° C. | No |
| Example 4-168 | | | Acrylic acid resin | 78° C. | No |
| Example 4-169 | | Zinc oxide | Polyvinylidene fluoride | 73° C. | No |
| Example 4-170 | | Specific heat | Polyimide | 74° C. | No |
| Example 4-171 | | capacity: 0.5 J/gK | Aramid (polyamide) | 72° C. | No |
| Example 4-172 | | | Polyacrylonitrile | 79° C. | No |
| Example 4-173 | | | Polyvinyl alcohol | 80° C. | No |
| Example 4-174 | | | Polyether | 81° C. | No |
| Example 4-175 | | | Acrylic acid resin | 78° C. | No |
| Comparative Example 4-1 | Carbon-tin composite material | — | — | 500° C. | Yes |

As can be seen from Table 4, in the cylindrical batteries of various Examples that used a separator having a heat absorbing layer that was produced such that the total heat capacity per unit area was 0.0006 J/Kcm² and the total heat capacity per unit volume was 0.4 J/Kcm³, even if a carbon-tin composite material was used as the negative electrode active material, the heat generation temperature in the short circuit test was low, such as below 80° C., and the cylindrical batteries were highly safe. On the other hand, with a separator that did not have a heat absorbing layer such as described above, the cylindrical battery in the short circuit test was in a hazardous state.

Example 5-1 to Example 5-175 and Comparative Example 5-1

Cylindrical batteries of Example 5-1 to Example 5-175 and Comparative Example 5-1 were produced in the same manner as in Example 2-1 to Example 2-175 and Comparative Example 2-1, respectively, except that lithium titanate similar to that of Example 1-37 was used as the negative electrode active material, instead of graphite. Meanwhile, the negative electrode mix slurry that formed the negative electrode active material layer was produced to have a composition similar to that of Example 1-37.

[Evaluation of Batteries: Short Circuit Test]

For the cylindrical batteries of various Examples and various Comparative Examples thus produced, a short circuit test was carried out in the same manner as in Example 1-1.

The evaluation results are presented in the following Table 5.

TABLE 5

Heat absorbing layer: Heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 5-1 | Lithium titanate | Boehmite | Polyvinylidene fluoride | 64° C. | No |
| Example 5-2 | | Specific heat | Polyimide | 63° C. | No |
| Example 5-3 | | capacity: 1.2 J/gK | Aramid (polyamide) | 61° C. | No |
| Example 5-4 | | | Polyacrylonitrile | 68° C. | No |
| Example 5-5 | | | Polyvinyl alcohol | 69° C. | No |
| Example 5-6 | | | Polyether | 70° C. | No |
| Example 5-7 | | | Acrylic acid resin | 67° C. | No |
| Example 5-8 | | Aluminum nitride | Polyvinylidene fluoride | 64° C. | No |
| Example 5-9 | | Specific heat | Polyimide | 63° C. | No |
| Example 5-10 | | capacity: 0.7 J/gK | Aramid (polyamide) | 61° C. | No |
| Example 5-11 | | | Polyacrylonitrile | 68° C. | No |
| Example 5-12 | | | Polyvinyl alcohol | 69° C. | No |
| Example 5-13 | | | Polyether | 70° C. | No |
| Example 5-14 | | | Acrylic acid resin | 67° C. | No |
| Example 5-15 | | Boron nitride | Polyvinylidene fluoride | 71° C. | No |
| Example 5-16 | | Specific heat | Polyimide | 72° C. | No |
| Example 5-17 | | capacity: 0.8 J/gK | Aramid (polyamide) | 70° C. | No |
| Example 5-18 | | | Polyacrylonitrile | 77° C. | No |
| Example 5-19 | | | Polyvinyl alcohol | 78° C. | No |
| Example 5-20 | | | Polyether | 79° C. | No |
| Example 5-21 | | | Acrylic acid resin | 76° C. | No |
| Example 5-22 | | Silicon carbide | Polyvinylidene fluoride | 64° C. | No |
| Example 5-23 | | Specific heat | Polyimide | 65° C. | No |
| Example 5-24 | | capacity: 0.7 J/gK | Aramid (polyamide) | 63° C. | No |
| Example 5-25 | | | Polyacrylonitrile | 70° C. | No |
| Example 5-26 | | | Polyvinyl alcohol | 71° C. | No |
| Example 5-27 | | | Polyether | 72° C. | No |
| Example 5-28 | | | Acrylic acid resin | 69° C. | No |
| Example 5-29 | | Talc | Polyvinylidene fluoride | 64° C. | No |
| Example 5-30 | | Specific heat | Polyimide | 65° C. | No |
| Example 5-31 | | capacity: 1.1 J/gK | Aramid (polyamide) | 63° C. | No |
| Example 5-32 | | | Polyacrylonitrile | 70° C. | No |
| Example 5-33 | | | Polyvinyl alcohol | 71° C. | No |
| Example 5-34 | | | Polyether | 72° C. | No |
| Example 5-35 | | | Acrylic acid resin | 69° C. | No |
| Example 5-36 | | $Li_2O_4$ | Polyvinylidene fluoride | 71° C. | No |
| Example 5-37 | | Specific heat | Polyimide | 72° C. | No |
| Example 5-38 | | capacity: 0.8 J/gK | Aramid (polyamide) | 70° C. | No |
| Example 5-39 | | | Polyacrylonitrile | 77° C. | No |
| Example 5-40 | | | Polyvinyl alcohol | 78° C. | No |
| Example 5-41 | | | Polyether | 79° C. | No |
| Example 5-42 | | | Acrylic acid resin | 76° C. | No |
| Example 5-43 | | $Li_3PO_4$ | Polyvinylidene fluoride | 71° C. | No |
| Example 5-44 | | Specific heat | Polyimide | 72° C. | No |
| Example 5-45 | | capacity: 0.8 J/gK | Aramid (polyamide) | 70° C. | No |
| Example 5-46 | | | Polyacrylonitrile | 77° C. | No |
| Example 5-47 | | | Polyvinyl alcohol | 78° C. | No |
| Example 5-48 | | | Polyether | 79° C. | No |
| Example 5-49 | | | Acrylic acid resin | 76° C. | No |
| Example 5-50 | | LiF | Polyvinylidene fluoride | 71° C. | No |
| Example 5-51 | | Specific heat | Polyimide | 72° C. | No |
| Example 5-52 | | capacity: 0.9 J/gK | Aramid (polyamide) | 70° C. | No |
| Example 5-53 | | | Polyacrylonitrile | 77° C. | No |
| Example 5-54 | | | Polyvinyl alcohol | 78° C. | No |
| Example 5-55 | | | Polyether | 79° C. | No |
| Example 5-56 | | | Acrylic acid resin | 76° C. | No |
| Example 5-57 | | Diamond | Polyvinylidene fluoride | 71° C. | No |
| Example 5-58 | | Specific heat | Polyimide | 72° C. | No |
| Example 5-59 | | capacity: 0.5 J/gK | Aramid (polyamide) | 70° C. | No |
| Example 5-60 | | | Polyacrylonitrile | 77° C. | No |
| Example 5-61 | | | Polyvinyl alcohol | 78° C. | No |
| Example 5-62 | | | Polyether | 79° C. | No |
| Example 5-63 | | | Acrylic acid resin | 76° C. | No |
| Example 5-64 | | Zirconium oxide | Polyvinylidene fluoride | 63° C. | No |
| Example 5-65 | | Specific heat | Polyimide | 64° C. | No |
| Example 5-66 | | capacity: 0.7 J/gK | Aramid (polyamide) | 62° C. | No |
| Example 5-67 | | | Polyacrylonitrile | 69° C. | No |
| Example 5-68 | | | Polyvinyl alcohol | 70° C. | No |
| Example 5-69 | | | Polyether | 71° C. | No |
| Example 5-70 | | | Acrylic acid resin | 68° C. | No |
| Example 5-71 | | Yttrium oxide | Polyvinylidene fluoride | 70° C. | No |

TABLE 5-continued

Heat absorbing layer: Heat capacity per area: 0.0006 J/Kcm², heat capacity per volume: 0.4 J/Kcm³

| | Negative electrode active material | Heat absorbing layer Inorganic particles | Heat absorbing layer Resin material | Short circuit test Heat generation temperature | Short circuit test Gas eruption |
|---|---|---|---|---|---|
| Example 5-72 | | Specific heat capacity: 0.5 J/gK | Polyimide | 71° C. | No |
| Example 5-73 | | | Aramid (polyamide) | 69° C. | No |
| Example 5-74 | | | Polyacrylonitrile | 76° C. | No |
| Example 5-75 | | | Polyvinyl alcohol | 77° C. | No |
| Example 5-76 | | | Polyether | 78° C. | No |
| Example 5-77 | | | Acrylic acid resin | 75° C. | No |
| Example 5-78 | | Barium titanate Specific heat capacity: 0.8 J/gK | Polyvinylidene fluoride | 65° C. | No |
| Example 5-79 | | | Polyimide | 66° C. | No |
| Example 5-80 | | | Aramid (polyamide) | 64° C. | No |
| Example 5-81 | | | Polyacrylonitrile | 71° C. | No |
| Example 5-82 | | | Polyvinyl alcohol | 72° C. | No |
| Example 5-83 | | | Polyether | 73° C. | No |
| Example 5-84 | | | Acrylic acid resin | 70° C. | No |
| Example 5-85 | | Strontium titanate Specific heat capacity: 0.8 J/gK | Polyvinylidene fluoride | 70° C. | No |
| Example 5-86 | | | Polyimide | 71° C. | No |
| Example 5-87 | | | Aramid (polyamide) | 69° C. | No |
| Example 5-88 | | | Polyacrylonitrile | 76° C. | No |
| Example 5-89 | | | Polyvinyl alcohol | 77° C. | No |
| Example 5-90 | | | Polyether | 78° C. | No |
| Example 5-91 | | | Acrylic acid resin | 75° C. | No |
| Example 5-92 | | Silicon oxide Specific heat capacity: 0.8 J/gK | Polyvinylidene fluoride | 65° C. | No |
| Example 5-93 | | | Polyimide | 66° C. | No |
| Example 5-94 | | | Aramid (polyamide) | 64° C. | No |
| Example 5-95 | | | Polyacrylonitrile | 71° C. | No |
| Example 5-96 | | | Polyvinyl alcohol | 72° C. | No |
| Example 5-97 | | | Polyether | 73° C. | No |
| Example 5-98 | | | Acrylic acid resin | 70° C. | No |
| Example 5-99 | | Zeolite Specific heat capacity: 1.0 J/gK | Polyvinylidene fluoride | 71° C. | No |
| Example 5-100 | | | Polyimide | 72° C. | No |
| Example 5-101 | | | Aramid (polyamide) | 70° C. | No |
| Example 5-102 | | | Polyacrylonitrile | 77° C. | No |
| Example 5-103 | | | Polyvinyl alcohol | 78° C. | No |
| Example 5-104 | | | Polyether | 79° C. | No |
| Example 5-105 | | | Acrylic acid resin | 76° C. | No |
| Example 5-106 | | Barium sulfate Specific heat capacity: 0.9 J/gK | Polyvinylidene fluoride | 71° C. | No |
| Example 5-107 | | | Polyimide | 72° C. | No |
| Example 5-108 | | | Aramid (polyamide) | 70° C. | No |
| Example 5-109 | | | Polyacrylonitrile | 77° C. | No |
| Example 5-110 | | | Polyvinyl alcohol | 78° C. | No |
| Example 5-111 | | | Polyether | 79° C. | No |
| Example 5-112 | | | Acrylic acid resin | 76° C. | No |
| Example 5-113 | | Titanium oxide Specific heat capacity: 0.8 J/gK | Polyvinylidene fluoride | 64° C. | No |
| Example 5-114 | | | Polyimide | 65° C. | No |
| Example 5-115 | | | Aramid (polyamide) | 63° C. | No |
| Example 5-116 | | | Polyacrylonitrile | 70° C. | No |
| Example 5-117 | | | Polyvinyl alcohol | 71° C. | No |
| Example 5-118 | | | Polyether | 72° C. | No |
| Example 5-119 | | | Acrylic acid resin | 69° C. | No |
| Example 5-120 | | Magnesium oxide Specific heat | Polyvinylidene fluoride | 64° C. | No |

TABLE 5-continued

Heat absorbing layer: Heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Resin material | Heat generation temperature | Gas eruption |
| Example 5-121 | | capacity: 1.0 J/gK | Polyimide | 65° C. | No |
| Example 5-122 | | | Aramid (polyamide) | 63° C. | No |
| Example 5-123 | | | Polyacrylonitrile | 70° C. | No |
| Example 5-124 | | | Polyvinyl alcohol | 71° C. | No |
| Example 5-125 | | | Polyether | 72° C. | No |
| Example 5-126 | | | Acrylic acid resin | 69° C. | No |
| Example 5-127 | | Graphite Specific heat capacity: 0.8 J/gK | Polyvinylidene fluoride | 71° C. | No |
| Example 5-128 | | | Polyimide | 72° C. | No |
| Example 5-129 | | | Aramid (polyamide) | 70° C. | No |
| Example 5-130 | | | Polyacrylonitrile | 77° C. | No |
| Example 5-131 | | | Polyvinyl alcohol | 78° C. | No |
| Example 5-132 | | | Polyether | 79° C. | No |
| Example 5-133 | | | Acrylic acid resin | 76° C. | No |
| Example 5-134 | | Carbon nanotubes Specific heat capacity: 0.8 J/gK | Polyvinylidene fluoride | 71° C. | No |
| Example 5-135 | | | Polyimide | 72° C. | No |
| Example 5-136 | | | Aramid (polyamide) | 70° C. | No |
| Example 5-137 | | | Polyacrylonitrile | 77° C. | No |
| Example 5-138 | | | Polyvinyl alcohol | 78° C. | No |
| Example 5-139 | | | Polyether | 79° C. | No |
| Example 5-140 | | | Acrylic acid resin | 76° C. | No |
| Example 5-141 | | Aluminum hydroxide Specific heat capacity: 1.5 J/gK | Polyvinylidene fluoride | 71° C. | No |
| Example 5-142 | | | Polyimide | 72° C. | No |
| Example 5-143 | | | Aramid (polyamide) | 70° C. | No |
| Example 5-144 | | | Polyacrylonitrile | 77° C. | No |
| Example 5-145 | | | Polyvinyl alcohol | 78° C. | No |
| Example 5-146 | | | Polyether | 79° C. | No |
| Example 5-147 | | | Acrylic acid resin | 76° C. | No |
| Example 5-148 | | Boron carbide Specific heat capacity: 1.0 J/gK | Polyvinylidene fluoride | 71° C. | No |
| Example 5-149 | | | Polyimide | 72° C. | No |
| Example 5-150 | | | Aramid (polyamide) | 70° C. | No |
| Example 5-151 | | | Polyacrylonitrile | 77° C. | No |
| Example 5-152 | | | Polyvinyl alcohol | 78° C. | No |
| Example 5-153 | | | Polyether | 79° C. | No |
| Example 5-154 | | | Acrylic acid resin | 76° C. | No |
| Example 5-155 | | Silicon nitride Specific heat | Polyvinylidene fluoride | 71° C. | No |

TABLE 5-continued

Heat absorbing layer: Heat capacity per area:
0.0006 J/Kcm², heat capacity per volume: 0.4 J/Kcm³

| | Negative electrode active material | Heat absorbing layer | | Short circuit test | |
| --- | --- | --- | --- | --- | --- |
| | | Inorganic particles | Resin material | Heat generation temperature | Gas eruption |
| Example 5-156 | | capacity: 0.7 J/gK | Polyimide | 72° C. | No |
| Example 5-157 | | | Aramid (polyamide) | 70° C. | No |
| Example 5-158 | | | Polyacrylonitrile | 77° C. | No |
| Example 5-159 | | | Polyvinyl alcohol | 78° C. | No |
| Example 5-160 | | | Polyether | 79° C. | No |
| Example 5-161 | | | Acrylic acid resin | 76° C. | No |
| Example 5-162 | | Titanium nitride Specific heat capacity: 0.6 J/gK | Polyvinylidene fluoride | 71° C. | No |
| Example 5-163 | | | Polyimide | 72° C. | No |
| Example 5-164 | | | Aramid (polyamide) | 70° C. | No |
| Example 5-165 | | | Polyacrylonitrile | 77° C. | No |
| Example 5-166 | | | Polyvinyl alcohol | 78° C. | No |
| Example 5-167 | | | Polyether | 79° C. | No |
| Example 5-168 | | | Acrylic acid resin | 76° C. | No |
| Example 5-169 | | Zinc oxide Specific heat capacity: 0.5 J/gK | Polyvinylidene fluoride | 71° C. | No |
| Example 5-170 | | | Polyimide | 72° C. | No |
| Example 5-171 | | | Aramid (polyamide) | 70° C. | No |
| Example 5-172 | | | Polyacrylonitrile | 77° C. | No |
| Example 5-173 | | | Polyvinyl alcohol | 78° C. | No |
| Example 5-174 | | | Polyether | 79° C. | No |
| Example 5-175 | | | Acrylic acid resin | 76° C. | No |
| Comparative Example 5-1 | Lithium titanate | | | 500° C. | Yes |

As can be seen from Table 5, in the cylindrical batteries of various Examples that used a separator having a heat absorbing layer that was produced such that the total heat capacity per unit area was 0.0006 J/Kcm² and the total heat capacity per unit volume was 0.4 J/Kcm³, even if lithium titanate was used as the negative electrode active material, the heat generation temperature in the short circuit test was low, such as below 80° C., and the cylindrical batteries were highly safe. On the other hand, with a separator that did not have a heat absorbing layer such as described above, the cylindrical battery in the short circuit test was in a hazardous state.

Example 6-1 to Example 6-60

In Example 6-1 to Example 6-60, batteries were produced by changing the battery configuration, the negative electrode active material, and the position of the heat absorbing layer of the separator, and thus the effects of the present technology were confirmed.

Example 6-1

A cylindrical battery similar to that of Example 1-1 was produced, and this was designated as a cylindrical battery of Example 6-1. That is, the battery was configured to include a cylindrical external can as the battery exterior material, and graphite as the negative electrode active material. Furthermore, the separator was configured to include a heat absorbing layer having a single surface thickness of 7.5 μm (two-surface thickness: 15 μm), which was formed from boehmite as the heat absorbent particles and polyvinylidene fluoride as the resin material on both surfaces of a polyethylene microporous film having a thickness of 9 μm.

Example 6-2

A cylindrical battery was produced in the same manner as in Example 6-1, except that a separator provided with a heat absorbing layer having a single surface thickness of 15 μm, only on the positive electrode side (surface facing the positive electrode at the time of battery production) of the polyethylene microporous film having a thickness of 9 μm.

Example 6-3

A cylindrical battery was produced in the same manner as in Example 6-1, except that a separator provided with a heat absorbing layer having a single surface thickness of 15 μm, only on the negative electrode side (surface facing the negative electrode at the time of battery production) of the polyethylene microporous film having a thickness of 9 μm.

Example 6-4 to Example 6-6

Cylindrical batteries of Example 6-4 to Example 6-6 were produced in the same manner as in Example 6-1 to Example 6-3, respectively, except that silicon was used as the negative electrode active material, and the negative electrode mix slurry was produced to have a composition similar to that of Example 1-13.

Example 6-7 to Example 6-9

Cylindrical batteries of Example 6-7 to Example 6-9 were produced in the same manner as in Example 6-1 to Example 6-3, respectively, except that a carbon-tin composite material was used as the negative electrode active material, and the negative electrode mix slurry was produced to have a composition similar to that of Example 1-25.

Example 6-10 to Example 6-12

Cylindrical batteries of Example 6-10 to Example 6-12 were produced in the same manner as in Example 6-1 to Example 6-3, respectively, except that lithium titanate was used as the negative electrode active material, and the negative electrode mix slurry was produced to have a composition similar to that of Example 1-37.

Example 6-13

A rectangular battery was produced, in which the configurations of the positive electrode, the negative electrode, the separator, and the non-aqueous liquid electrolyte were similar to those of Example 6-1. That is, the battery was configured to include a rectangular external can for the battery exterior material, and graphite as the negative electrode active material. Furthermore, the separator was configured to include a heat absorbing layer having a single surface thickness of 7.5 μm (two-surface thickness: 15 μm), which was formed from boehmite as heat absorbent particles and polyvinylidene fluoride as a resin material on both surfaces of a polyethylene microporous film having a thickness of 9 μm. The method for assembling the rectangular battery is explained below.

[Assembling of Rectangular Battery]

A positive electrode, a negative electrode, and a separator having a heat absorbing layer formed on both surfaces, were laminated in the order of the positive electrode, the separator, the negative electrode, and the separator, and the assembly was wound several times in the longitudinal direction in a flat shape. Subsequently, the winding end portion was fixed with an adhesive tape, and thereby a wound electrode assembly was formed. Next, as illustrated in FIG. 6, the wound electrode assembly was accommodated in a rectangular battery can. Subsequently, an electrode pin provided on a battery lid and a positive electrode terminal led out from the wound electrode assembly were connected, and then the battery can was sealed with the battery lid. A non-aqueous liquid electrolyte was injected through a liquid electrolyte injection port, and the battery can was tightly sealed by sealing with a sealing member. Thereby, a rectangular battery as illustrated in FIG. 6, having a battery shape that measured 5.2 mm in thickness, 34 mm in width, and 36 mm in height (523436 size), and a battery capacity of 1000 mAh, was produced.

Example 6-14 to Example 6-24

Rectangular batteries of Example 6-14 to Example 6-24 were produced in the same manner as in Example 6-2 to Example 6-12, respectively, except that the batteries were produced to have a configuration of a rectangular battery similar to that of Example 6-13.

Example 6-25

A laminate film type battery was produced, in which the respective configurations of the positive electrode, the negative electrode, the separator, and the non-aqueous liquid electrolyte were the same as those of Example 6-1, and the laminated electrode assembly was sheathed with a soft laminate film. That is, the battery was configured to include a laminate film as the battery exterior material, a laminate type electrode assembly, and graphite as the negative electrode active material. Furthermore, the separator was configured to include a heat absorbing layer having a single surface thickness of 7.5 μm (two-surface thickness: 15 μm), which was formed from boehmite as heat absorbent particles and polyvinylidene fluoride as a resin material on both surfaces of a polyethylene microporous film having a thickness of 9 μm. The method for assembling the laminate film type battery will be explained below.

[Assembling of Laminate Film Type Battery]

Figure 9:
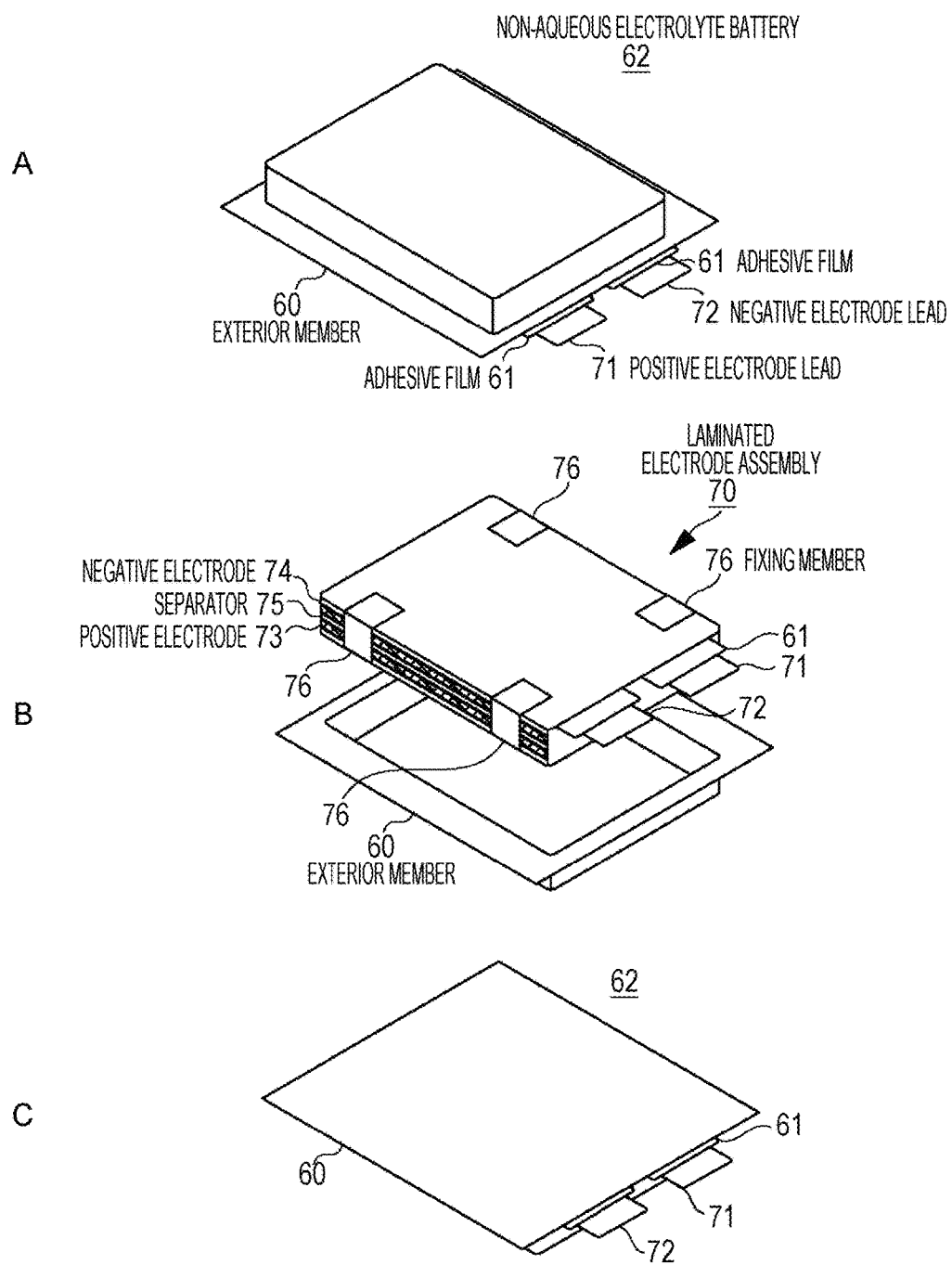
FIG. 9 is an exploded perspective view diagram illustrating the configuration of a laminate film type non-aqueous electrolyte battery using a laminated electrode assembly.

A positive electrode, a negative electrode, and a separator having a heat absorbing layer formed on both surfaces, all of which were rectangular-shaped, were laminated in the order of the positive electrode, the separator, the negative electrode, and the separator, and thus a laminated electrode assembly was formed. Next, the laminated electrode assembly was sheathed with a laminate film having a soft aluminum layer, and the edge from which the positive electrode terminal and the negative electrode terminal were led out, and other two edges around the laminated electrode assembly were thermally fused to make the laminate film into a bag shape. Subsequently, a non-aqueous liquid electrolyte was injected through the opening that had not been thermally fused, and then the one edge that had not been thermally fused was tightly sealed by sealing by thermal fusion under reduced pressure. Thereby, a laminate film type battery as illustrated in FIG. 9, having a battery shape that measured 5.2 mm in thickness, 34 mm in width, and 36 mm in height (523436 size), and a battery capacity of 1000 mAh, was produced.

Example 6-26 to Example 6-36

Laminate film type batteries of Example 6-26 to Example 6-36 were produced in the same manner as in Example 6-2 to Example 6-12, respectively, except that the battery was configured to be a laminate film type battery similar to that of Example 6-25.

Example 6-37

A laminate film type battery was produced, in which the respective configurations of the positive electrode, the negative electrode, the separator, and the non-aqueous liquid electrolyte were the same as those of Example 6-1, and a gel-like non-aqueous electrolyte and a wound electrode assembly were sheathed with a soft laminate film. That is, the battery was configured to include a laminate film as the battery exterior material, a laminate type electrode assembly, and graphite as the negative electrode active material. Furthermore, the separator was configured to include a heat absorbing layer having a single surface thickness of 7.5 µm (two-surface thickness: 15 µm), which was formed from boehmite as heat absorbent particles and polyvinylidene fluoride as a resin material on both surfaces of a polyethylene microporous film having a thickness of 9 µm. The method for assembling the laminate film type battery will be explained below.

[Formation of Gel Electrolyte Layer]

A non-aqueous liquid electrolyte was prepared by dissolving lithium hexafluorophosphate ($LiPF_6$) as an electrolyte salt at a concentration of 1 mol/dm$^3$ in a non-aqueous solvent obtained by mixing ethylene carbonate (EC), propylene carbonate (PC) and vinylene carbonate (VC) at a mass ratio of 49:49:2. Subsequently, a sol-like precursor solution was prepared by using polyvinylidene fluoride (PVdF) as a polymer compound for retaining the non-aqueous liquid electrolyte, so that the polymer compound was same as the resin material that constituted the heat absorbing layer of the separator, and mixing the non-aqueous liquid electrolyte, polyvinylidene fluoride, and dimethyl carbonate (DMC) as a plasticizer. Subsequently, the precursor solution was applied on both surfaces of the positive electrode and both surfaces of the negative electrode, and the precursor solution was dried to remove the plasticizer. Thereby, gel electrolyte layers were formed on the surfaces of the positive electrode and the negative electrode.

[Assembling of Laminate Film Type Battery]

The Positive electrode and the negative electrode on which a gel electrolyte layer was formed on both surfaces, and the separator having a heat absorbing layer formed on both surfaces, were laminated in the order of the positive electrode, the separator, the negative electrode, and the separator, and the laminate was wound several times in the longitudinal direction in a flat shape. Subsequently, the winding end portion was fixed with an adhesive tape, and thereby a wound electrode assembly was formed.

Next, the wound electrode assembly was sheathed with a laminate film having a soft aluminum layer, and the edge from which the positive electrode terminal and the negative electrode terminal were led out, and other two edges around the wound electrode assembly were tightly sealed by sealing by thermal fusion under reduced pressure. Thereby, a laminate film type battery as illustrated in FIG. 7, having a battery shape that measured 5.2 mm in thickness, 34 mm in width, and 36 mm in height (523436 size), and a battery capacity of 1000 mAh, was produced.

Example 6-38 to Example 6-48

Laminate film type batteries of Example 6-38 to Example 6-48 were produced in the same manner as in Example 6-2 to Example 6-12, respectively, except that the battery was configured to be a laminate film type battery similar to that of Example 6-25.

Example 6-49

A laminate film type battery was produced, in which the respective configurations of the positive electrode, the negative electrode, the separator, and the non-aqueous liquid electrolyte were the same as those of Example 6-1, and a gel-like non-aqueous electrolyte and a wound electrode assembly were sheathed with a soft laminate film. That is, the battery was configured to include a laminate film as the battery exterior material, a flat wound type electrode assembly, and graphite as the negative electrode active material. Furthermore, the separator was configured to include a heat absorbing layer having a single surface thickness of 7.5 µm (two-surface thickness: 15 µm), which was formed from boehmite as heat absorbent particles and polyvinylidene fluoride as a resin material on both surfaces of a polyethylene microporous film having a thickness of 9 µm. The method for assembling the laminate film type battery will be explained below.

[Assembling of Laminate Film Type Battery]

A positive electrode, a negative electrode, and a separator having a heat absorbing layer formed on both surfaces were laminated in the order of the positive electrode, the separator, the negative electrode, and the separator. The laminate was wound several times in the longitudinal direction in a flat shape, and then the winding end portion was fixed with an adhesive tape. Thereby, a wound electrode assembly was formed. At this time, a positive electrode and a negative electrode, both of which were coated with a non-aqueous electrolyte that had been produced into a gel form by retaining a non-aqueous liquid electrolyte in a polymer material, on both surfaces, were used.

Next, as illustrated in FIG. 11, the wound electrode assembly was sheathed with a soft laminate film having a soft aluminum layer and a hard laminate film having a hard aluminum layer, and the edge from which the positive electrode terminal and the negative electrode terminal were led out, and the other three edges around the wound electrode assembly were tightly sealed by sealing by thermal fusion under reduced pressure. Thereafter, two edges of the hard laminate film were formed into an elliptic cross-sectional shape by bringing the shorter edges of the hard laminate film into contact, the portions of the hard laminate film and the soft laminate film facing each other were pasted, and thus a battery cell was obtained. Subsequently, a positive electrode lead connected to the positive electrode, and a negative electrode lead connected to the negative electrode, were connected to a circuit board, and the circuit board was accommodated in a top cover. Lastly, the top cover and a bottom cover were respectively inserted and adhered to the battery cell, and thus a laminate film type battery as illustrated in FIG. 10, having a battery shape that measured 5.2 mm in thickness, 34 mm in width, and 36 mm in height (523436 size), and a battery capacity of 1000 mAh, was produced.

Example 6-50 to Example 6-60

Laminate film type batteries of Example 6-50 to Example 6-60 were produced in the same manner as in Example 6-2 to Example 6-12, respectively, except that the battery was configured to be a laminate film type battery similar to that of Example 6-25.

[Evaluation of Batteries: Short Circuit Test]

For the batteries of various Examples and various Comparative Examples thus produced, a short circuit test was carried out in the same manner as in Example 1-1.

The evaluation results are presented in the following Table 6.

TABLE 6

Heat absorbing layer: heat capacity per area: 0.0006 J/Kcm$^2$, heat capacity per volume: 0.4 J/Kcm$^3$

| | Battery form | | | Negative | Heat absorbing layer | | | Short circuit test | |
|---|---|---|---|---|---|---|---|---|---|
| | Shape | Electrode assembly | Electrolyte | electrode active material | Inorganic particles | Resin material | Position | Test result | Gas eruption |
| Example 6-1 | Cylindrical external can | Wound type | Liquid | Graphite | Boehmite | PVdF | Both surfaces of substrate | 62° C. | No |
| Example 6-2 | | | | | | | Positive electrode side surface of substrate | 70° C. | No |
| Example 6-3 | | | | | | | Negative electrode side surface of substrate | 66° C. | No |
| Example 6-4 | | | | Silicon | | | Both surfaces of substrate | 72° C. | No |
| Example 6-5 | | | | | | | Positive electrode side surface of substrate | 80° C. | No |
| Example 6-6 | | | | | | | Negative electrode side surface of substrate | 76° C. | No |
| Example 6-7 | | | | Carbon-tin composite material | | | Both surfaces of substrate | 65° C. | No |
| Example 6-8 | | | | | | | Positive electrode side surface of substrate | 73° C. | No |
| Example 6-9 | | | | | | | Negative electrode side surface of substrate | 69° C. | No |
| Example 6-10 | | | | Lithium titanate | | | Both surfaces of substrate | 64° C. | No |
| Example 6-11 | | | | | | | Positive electrode side surface of substrate | 72° C. | No |
| Example 6-12 | | | | | | | Negative electrode side surface of substrate | 68° C. | No |
| Example 6-13 | Rectangular external can | Flat wound type | Liquid | Graphite | Boehmite | PVdF | Both surfaces of substrate | 61° C. | No |
| Example 6-14 | | | | | | | Positive electrode side surface of substrate | 69° C. | No |
| Example 6-15 | | | | | | | Negative electrode side surface of substrate | 65° C. | No |
| Example 6-16 | | | | Silicon | | | Both surfaces of substrate | 71° C. | No |
| Example 6-17 | | | | | | | Positive electrode side surface of substrate | 79° C. | No |
| Example 6-18 | | | | | | | Negative electrode side surface of substrate | 75° C. | No |
| Example 6-19 | | | | Carbon-tin composite material | | | Both surfaces of substrate | 63° C. | No |
| Example 6-20 | | | | | | | Positive electrode side surface of substrate | 71° C. | No |
| Example 6-21 | | | | | | | Negative electrode side surface of substrate | 67° C. | No |
| Example 6-22 | | | | Lithium titanate | | | Both surfaces of substrate | 62° C. | No |
| Example 6-23 | | | | | | | Positive electrode side surface of substrate | 70° C. | No |
| Example 6-24 | | | | | | | Negative electrode side surface of substrate | 66° C. | No |
| Example 6-25 | Laminate film (soft exterior material) | Laminate type | Liquid | Graphite | Boehmite | PVdF | Both surfaces of substrate | 61° C. | No |
| Example 6-26 | | | | | | | Positive electrode side surface of substrate | 69° C. | No |
| Example 6-27 | | | | | | | Negative electrode side surface of substrate | 65° C. | No |
| Example 6-28 | | | | Silicon | | | Both surfaces of substrate | 71° C. | No |
| Example 6-29 | | | | | | | Positive electrode side surface of substrate | 79° C. | No |
| Example 6-30 | | | | | | | Negative electrode side surface of substrate | 75° C. | No |
| Example 6-31 | | | | Carbon-tin composite material | | | Both surfaces of substrate | 63° C. | No |
| Example 6-32 | | | | | | | Positive electrode side surface of substrate | 71° C. | No |
| Example 6-33 | | | | | | | Negative electrode side surface of substrate | 67° C. | No |
| Example 6-34 | | | | Lithium titanate | | | Both surfaces of substrate | 62° C. | No |
| Example 6-35 | | | | | | | Positive electrode side surface of substrate | 70° C. | No |
| Example 6-36 | | | | | | | Negative electrode side surface of substrate | 66° C. | No |
| Example 6-37 | Laminate film (soft exterior material) | Flat wound type | Gel | Graphite | Boehmite | PVdF | Both surfaces of substrate | 60° C. | No |
| Example 6-38 | | | | | | | Positive electrode side surface of substrate | 68° C. | No |
| Example 6-39 | | | | | | | Negative electrode side surface of substrate | 64° C. | No |
| Example 6-40 | | | | Silicon | | | Both surfaces of substrate | 70° C. | No |
| Example 6-41 | | | | | | | Positive electrode side surface of substrate | 78° C. | No |
| Example 6-42 | | | | | | | Negative electrode side surface of substrate | 74° C. | No |
| Example 6-43 | | | | Carbon-tin | | | Both surfaces of substrate | 62° C. | No |

TABLE 6-continued

Heat absorbing layer: heat capacity per area: 0.0006 J/Kcm², heat capacity per volume: 0.4 J/Kcm³

| | Battery form | | | Negative | Heat absorbing layer | | | Short circuit test | |
|---|---|---|---|---|---|---|---|---|---|
| | Shape | Electrode assembly | Electrolyte | electrode active material | Inorganic particles | Resin material | Position | Test result | Gas eruption |
| Example 6-44 | | | | composite material | | | Positive electrode side surface of substrate | 70° C. | No |
| Example 6-45 | | | | | | | Negative electrode side surface of substrate | 66° C. | No |
| Example 6-46 | | | | Lithium titanate | | | Both surfaces of substrate | 61° C. | No |
| Example 6-47 | | | | | | | Positive electrode side surface of substrate | 69° C. | No |
| Example 6-48 | | | | | | | Negative electrode side surface of substrate | 65° C. | No |
| Example 6-49 | Laminate type battery (hard exterior material + soft exterior material) | Flat wound type | Gel | Graphite | Boehmite | PVdF | Both surfaces of substrate | 60° C. | No |
| Example 6-50 | | | | | | | Positive electrode side surface of substrate | 68° C. | No |
| Example 6-51 | | | | | | | Negative electrode side surface of substrate | 64° C. | No |
| Example 6-52 | | | | Silicon | | | Both surfaces of substrate | 70° C. | No |
| Example 6-53 | | | | | | | Positive electrode side surface of substrate | 78° C. | No |
| Example 6-54 | | | | | | | Negative electrode side surface of substrate | 74° C. | No |
| Example 6-55 | | | | Carbon-tin composite material | | | Both surfaces of substrate | 62° C. | No |
| Example 6-56 | | | | | | | Positive electrode side surface of substrate | 70° C. | No |
| Example 6-57 | | | | | | | Negative electrode side surface of substrate | 66° C. | No |
| Example 6-58 | | | | Lithium titanate | | | Both surfaces of substrate | 61° C. | No |
| Example 6-59 | | | | | | | Positive electrode side surface of substrate | 69° C. | No |
| Example 6-60 | | | | | | | Negative electrode side surface of substrate | 65° C. | No |

As can be seen from Table 6, when a separator having a heat absorbing layer that was produced such that the total heat capacity per unit area was 0.0006 J/Kcm², and the total heat capacity per unit volume was 0.4 J/Kcm³, was used, the heat generation temperature in the short circuit test was low, such as below 80° C., and the batteries were highly safe, irrespective of the battery configuration.

Particularly, it was found from Example 6-1 to Example 6-3 that the batteries that used a separator provided with a heat absorbing layer on both surfaces of the substrate exhibited highest safety, and in a case in which the heat absorbing layer was provided on one surface of the substrate, it was more effective to provide the heat absorbing layer on the negative electrode side surface of the substrate, rather than to provide the heat absorbing layer on the positive electrode side surface of the substrate.

Example 7-1 to Example 7-76

Example 7-1

A cylindrical battery was produced in the same manner as in Example 1-1, in which boehmite having a spherical particle shape ("length of major axis"/"length of minor axis"=1) was used as the heat absorbent particles. Meanwhile, the ratio of the particle shape ("length of major axis"/"length of minor axis") was determined as follows. Fifty particles were randomly selected, and each of the inorganic particles selected was three-dimensionally observed by scanning electron microscope. Thereby, the ratio of each inorganic particle ("length of major axis"/"length of minor axis") was obtained from the length of the longest part (length of major axis) of each inorganic particle, and the length of the shortest part of each inorganic particle that was perpendicular to the major axis (length of minor axis (thickness or fiber thickness)). Then, an average value of these was designated as the ratio of the particle shape ("length of major axis"/"length of minor axis") of Example 7-1 (the same applies to the following Examples).

Example 7-2

A cylindrical battery was produced in the same manner as in Example 7-1, except that boehmite having a plate-like particle shape (length:thickness=3:1, that is, "length of major axis"/"length of minor axis"=3) was used as the heat absorbent particles.

Example 7-3

A cylindrical battery was produced in the same manner as in Example 7-1, except that boehmite having a needle-like particle shape (length:thickness=3:1, that is, "length of major axis"/"length of minor axis"=3) was used as the heat absorbent particles.

Example 7-4 to Example 7-6

In Example 7-4, aluminum nitride having a spherical particle shape ("length of major axis"/"length of minor axis"=1) was used as the heat absorbent particles. In Example 7-5, aluminum nitride having a plate-like particle shape (length:thickness=3:1, that is, "length of major axis"/"length of minor axis"=3) was used as the heat absorbent particles. In Example 7-6, aluminum nitride having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-7 to Example 7-9

In Example 7-7, boron nitride having a spherical particle shape ("length of major axis"/"length of minor axis"=1) was used as the heat absorbent particles. In Example 7-8, boron nitride having a plate-like particle shape (length:thickness=3:1, that is, "length of major axis"/"length of minor axis"=3) was used as the heat absorbent particles. In Example 7-9, boron nitride having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-10 to Example 7-12

In Example 7-10, silicon carbide having a spherical particle shape ("length of major axis"/"length of minor axis"=1) was used as the heat absorbent particles. In Example 7-11, silicon carbide having a plate-like particle shape (length:thickness=3:1, that is, "length of major axis"/"length of minor axis"=3) was used as the heat absorbent particles. In Example 7-12, silicon carbide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-13 to Example 7-15

In Example 7-13, talc having a spherical particle shape ("length of major axis"/"length of minor axis"=1) was used as the heat absorbent particles. In Example 7-14, talc having a plate-like particle shape (length:thickness=3:1, that is, "length of major axis"/"length of minor axis"=3) was used as the heat absorbent particles. In Example 7-15, talc having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-16 to Example 7-18

In Example 7-16, $Li_2O_4$ having a spherical particle shape ("length of major axis"/"length of minor axis"=1) was used as the heat absorbent particles. In Example 7-17, $Li_2O_4$ having a plate-like particle shape (length:thickness=3:1, that is, "length of major axis"/"length of minor axis"=3) was used as the heat absorbent particles. In Example 7-18, $Li_2O_4$ having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-19 to Example 7-21

In Example 7-19, $Li_3PO_4$ having a spherical particle shape ("length of major axis"/"length of minor axis"=1) was used as the heat absorbent particles. In Example 7-20, $Li_3PO_4$ having a plate-like particle shape (length:thickness=3:1, that is, "length of major axis"/"length of minor axis"=3) was used as the heat absorbent particles. In Example 7-21, $Li_3PO_4$ having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-22 to Example 7-24

In Example 7-22, LiF having a spherical particle shape ("length of major axis"/"length of minor axis"=1) was used as the heat absorbent particles. In Example 7-23, LiF having a plate-like particle shape (length:thickness=3:1, that is, "length of major axis"/"length of minor axis"=3) was used as the heat absorbent particles. In Example 7-24, LiF having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-25 to Example 7-27

In Example 7-25, diamond having a spherical particle shape ("length of major axis"/"length of minor axis"=1) was used as the heat absorbent particles. In Example 7-26, diamond having a plate-like particle shape (length:thickness=3:1, that is, "length of major axis"/"length of minor axis"=3) was used as the heat absorbent particles. In Example 7-27, diamond having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-28 to Example 7-30

In Example 7-28, zirconia having a spherical particle shape ("length of major axis"/"length of minor axis"=1) was used as the heat absorbent particles. In Example 7-29, zirconia having a plate-like particle shape (length:thickness=3:1, that is, "length of major axis"/"length of minor axis"=3) was used as the heat absorbent particles. In Example 7-30, zirconia having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-31 to Example 7-33

In Example 7-31, yttrium oxide having a spherical particle shape ("length of major axis"/"length of minor axis"=1) was used as the heat absorbent particles. In Example 7-32, yttrium oxide having a plate-like particle shape (length:thickness=3:1, that is, "length of major axis"/"length of minor axis"=3) was used as the heat absorbent particles. In Example 7-33, yttrium oxide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-34 to Example 7-36

In Example 7-34, barium titanate having a spherical particle shape ("length of major axis"/"length of minor axis"=1) was used as the heat absorbent particles. In Example 7-35, barium titanate having a plate-like particle shape (length:thickness=3:1, that is, "length of major axis"/"length of minor axis"=3) was used as the heat absorbent particles. In Example 7-36, barium titanate having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-37 to Example 7-39

In Example 7-37, strontium titanate having a spherical particle shape ("length of major axis"/"length of minor axis"=1) was used as the heat absorbent particles. In Example 7-38, strontium titanate having a plate-like particle shape (length:thickness=3:1, that is, "length of major axis"/"length of minor axis"=3) was used as the heat absorbent particles. In Example 7-39, strontium titanate having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-40 to Example 7-42

In Example 7-40, silicon oxide having a spherical particle shape ("length of major axis"/"length of minor axis"=1) was used as the heat absorbent particles. In Example 7-41, silicon oxide having a plate-like particle shape (length:thickness=3:1, that is, "length of major axis"/"length of minor axis"=3) was used as the heat absorbent particles. In Example 7-42, silicon oxide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-43 to Example 7-45

In Example 7-43, zeolite having a spherical particle shape ("length of major axis"/"length of minor axis"=1) was used as the heat absorbent particles. In Example 7-44, zeolite having a plate-like particle shape (length:thickness=3:1, that is, "length of major axis"/"length of minor axis"=3) was used as the heat absorbent particles. In Example 7-45, zeolite having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-46 to Example 7-48

In Example 7-46, barium sulfate having a spherical particle shape ("length of major axis"/"length of minor axis"=1) was used as the heat absorbent particles. In Example 7-47, barium sulfate having a plate-like particle shape (length:thickness=3:1, that is, "length of major axis"/"length of minor axis"=3) was used as the heat absorbent particles. In Example 7-48, barium sulfate having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-49 to Example 7-51

In Example 7-49, titanium oxide having a spherical particle shape ("length of major axis"/"length of minor axis"=1) was used as the heat absorbent particles. In Example 7-50, titanium oxide having a plate-like particle shape (length:thickness=3:1, that is, "length of major axis"/"length of minor axis"=3) was used as the heat absorbent particles. In Example 7-51, titanium oxide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-52 to Example 7-54

In Example 7-52, magnesium oxide having a spherical particle shape ("length of major axis"/"length of minor axis"=1) was used as the heat absorbent particles. In Example 7-53, magnesium oxide having a plate-like particle shape (length:thickness=3:1, that is, "length of major axis"/"length of minor axis"=3) was used as the heat absorbent particles. In Example 7-54, magnesium oxide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-55 to Example 7-57

In Example 7-55, graphite having a spherical particle shape ("length of major axis"/"length of minor axis"=1) was used as the heat absorbent particles. In Example 7-56, graphite having a plate-like particle shape (length:thickness=3:1, that is, "length of major axis"/"length of minor axis"=3) was used as the heat absorbent particles. In Example 7-57, graphite having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-58

A cylindrical battery was produced in the same manner as in Example 7-1, except that carbon nanotubes having a needle-like particle shape (length:thickness=3:1, that is, "length of major axis"/"length of minor axis"=10) were used as the heat absorbent particles.

Example 7-59 to Example 7-61

In Example 7-59, aluminum hydroxide having a spherical particle shape ("length of major axis"/"length of minor axis"=1) was used as the heat absorbent particles. In Example 7-60, aluminum hydroxide having a plate-like particle shape (length:thickness=3:1, that is, "length of major axis"/"length of minor axis"=3) was used as the heat absorbent particles. In Example 7-61, aluminum hydroxide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-62 to Example 7-64

In Example 7-62, boron carbide having a spherical particle shape ("length of major axis"/"length of minor axis"=1) was used as the heat absorbent particles. In Example 7-63, boron carbide having a plate-like particle shape (length:thickness=3:1, that is, "length of major axis"/"length of minor axis"=3) was used as the heat absorbent particles. In Example 7-64, boron carbide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-65 to Example 7-67

In Example 7-65, silicon nitride having a spherical particle shape ("length of major axis"/"length of minor axis"=1) was used as the heat absorbent particles. In Example 7-66, silicon nitride having a plate-like particle shape (length:thickness=3:1, that is, "length of major axis"/"length of minor axis"=3) was used as the heat absorbent particles. In Example 7-67, silicon nitride having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-68 to Example 7-70

In Example 7-68, titanium nitride having a spherical particle shape ("length of major axis"/"length of minor axis"=1) was used as the heat absorbent particles. In Example 7-69, titanium nitride having a plate-like particle shape (length:thickness=3:1, that is, "length of major axis"/"length of minor axis"=3) was used as the heat absorbent particles. In Example 7-70, titanium nitride having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-71 to Example 7-73

In Example 7-71, zinc oxide having a spherical particle shape ("length of major axis"/"length of minor axis"=1) was used as the heat absorbent particles. In Example 7-72, zinc oxide having a plate-like particle shape (length:thickness=3:1, that is, "length of major axis"/"length of minor axis"=3) was used as the heat absorbent particles. In Example 7-73, zinc oxide having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

Example 7-74 to Example 7-76

In Example 7-74, alumina having a spherical particle shape ("length of major axis"/"length of minor axis"=1) was used as the heat absorbent particles. In Example 7-75, alumina having a plate-like particle shape (length:thickness=3:1, that is, "length of major axis"/"length of minor axis"=3) was used as the heat absorbent particles. In Example 7-76, alumina having a needle-like particle shape (length:thickness=3:1, that is, "length of major axis"/"length of minor axis"=3) was used as the heat absorbent particles. Cylindrical batteries were produced in the same manner as in Example 7-1, except for the above-described matter.

[Evaluation of Batteries: Short Circuit Test]

For the batteries of various Examples and various Comparative Examples thus produced, a short circuit test was carried out in the same manner as in Example 1-1.

The evaluation results are presented in the following Table 7.

TABLE 7

Heat absorbing layer: heat capacity per area: 0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Particle shape | Heat generation temperature | Gas eruption |
| Example 7-1 | Graphite | Boehmite | Spherical shape | 62° C. | No |
| Example 7-2 | | Specific heat capacity: 1.2 J/gK | Plate shape length:thickness = 3:1 | 58° C. | No |
| Example 7-3 | | | Needle shape length:thickness = 3:1 | 55° C. | No |
| Example 7-4 | | Aluminum nitride | Spherical shape | 62° C. | No |
| Example 7-5 | | Specific heat capacity: 0.7 J/gK | Plate shape length:thickness = 3:1 | 58° C. | No |
| Example 7-6 | | | Needle shape length:thickness = 3:1 | 55° C. | No |
| Example 7-7 | | Boron nitride | Spherical shape | 69° C. | No |
| Example 7-8 | | Specific heat capacity: 0.8 J/gK | Plate shape length:thickness = 3:1 | 65° C. | No |
| Example 7-9 | | | Needle shape length:thickness = 3:1 | 62° C. | No |
| Example 7-10 | | Silicon carbide | Spherical shape | 62° C. | No |
| Example 7-11 | | Specific heat capacity: 0.7 J/gK | Plate shape length:thickness = 3:1 | 58° C. | No |

TABLE 7-continued

Heat absorbing layer: heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Particle shape | Heat generation temperature | Gas eruption |
| Example 7-12 | | | Needle shape length:thickness = 3:1 | 55° C. | No |
| Example 7-13 | | Talc | Spherical shape | 62° C. | No |
| Example 7-14 | | Specific heat capacity: 1.1 J/gK | Plate shape length:thickness = 3:1 | 58° C. | No |
| Example 7-15 | | | Needle shape length:thickness = 3:1 | 55° C. | No |
| Example 7-16 | | Li₂O₄ | Spherical shape | 69° C. | No |
| Example 7-17 | | Specific heat capacity: 0.8 J/gK | Plate shape length:thickness = 3:1 | 65° C. | No |
| Example 7-18 | | | Needle shape length:thickness = 3:1 | 62° C. | No |
| Example 7-19 | | Li₃PO₄ | Spherical shape | 69° C. | No |
| Example 7-20 | | Specific heat capacity: 0.8 J/gK | Plate shape length:thickness = 3:1 | 65° C. | No |
| Example 7-21 | | | Needle shape length:thickness = 3:1 | 62° C. | No |
| Example 7-22 | | LiF | Spherical shape | 69° C. | No |
| Example 7-23 | | Specific heat capacity: 0.9 J/gK | Plate shape length:thickness = 3:1 | 65° C. | No |
| Example 7-24 | | | Needle shape length:thickness = 3:1 | 62° C. | No |
| Example 7-25 | | Diamond | Spherical shape | 69° C. | No |
| Example 7-26 | | Specific heat capacity: 0.5 J/gK | Plate shape length:thickness = 3:1 | 65° C. | No |
| Example 7-27 | | | Needle shape length:thickness = 3:1 | 62° C. | No |
| Example 7-28 | | Zirconia | Spherical shape | 61° C. | No |
| Example 7-29 | | Specific heat capacity: 0.7 J/gK | Plate shape length:thickness = 3:1 | 57° C. | No |
| Example 7-30 | | | Needle shape length:thickness = 3:1 | 54° C. | No |
| Example 7-31 | | Yttrium oxide | Spherical shape | 68° C. | No |
| Example 7-32 | | Specific heat capacity: 0.5 J/gK | Plate shape length:thickness = 3:1 | 64° C. | No |
| Example 7-33 | | | Needle shape length:thickness = 3:1 | 61° C. | No |
| Example 7-34 | | Barium titanate | Spherical shape | 63° C. | No |
| Example 7-35 | | Specific heat capacity: 0.8 J/gK | Plate shape length:thickness = 3:1 | 59° C. | No |
| Example 7-36 | | | Needle shape length:thickness = 3:1 | 56° C. | No |
| Example 7-37 | | Strontium titanate | Spherical shape | 68° C. | No |
| Example 7-38 | | Specific heat capacity: 0.8 J/gK | Plate shape length:thickness = 3:1 | 64° C. | No |
| Example 7-39 | | | Needle shape length:thickness = 3:1 | 61° C. | No |
| Example 7-40 | | Silicon oxide | Spherical shape | 63° C. | No |
| Example 7-41 | | Specific heat capacity: 0.8 J/gK | Plate shape length:thickness = 3:1 | 59° C. | No |
| Example 7-42 | | | Needle shape length:thickness = 3:1 | 56° C. | No |
| Example 7-43 | | Zeolite | Spherical shape | 69° C. | No |
| Example 7-44 | | Specific heat capacity: 1.0 J/gK | Plate shape length:thickness = 3:1 | 58° C. | No |
| Example 7-45 | | | Needle shape length:thickness = 3:1 | 55° C. | No |
| Example 7-46 | | Barium sulfate | Spherical shape | 69° C. | No |
| Example 7-47 | | Specific heat capacity: 0.9 J/gK | Plate shape length:thickness = 3:1 | 65° C. | No |
| Example 7-48 | | | Needle shape length:thickness = 3:1 | 62° C. | No |
| Example 7-49 | | Titanium oxide | Spherical shape | 62° C. | No |
| Example 7-50 | | Specific heat capacity: 0.8 J/gK | Plate shape length:thickness = 3:1 | 58° C. | No |
| Example 7-51 | | | Needle shape length:thickness = 3:1 | 55° C. | No |
| Example 7-52 | | Magnesium oxide | Spherical shape | 62° C. | No |
| Example 7-53 | | Specific heat capacity: 1.0 J/gK | Plate shape length:thickness = 3:1 | 58° C. | No |

TABLE 7-continued

Heat absorbing layer: heat capacity per area:
0.0006 J/Kcm², heat capacity per volume: 0.4 J/Kcm³

| | Negative electrode active material | Heat absorbing layer | | Short circuit test | |
|---|---|---|---|---|---|
| | | Inorganic particles | Particle shape | Heat generation temperature | Gas eruption |
| Example 7-54 | | | Needle shape length:thickness = 3:1 | 55° C. | No |
| Example 7-55 | | Graphite | Spherical shape | 69° C. | No |
| Example 7-56 | | Specific heat capacity: 0.8 J/gK | Plate shape length:thickness = 3:1 | 65° C. | No |
| Example 7-57 | | | Needle shape length:thickness = 3:1 | 62° C. | No |
| Example 7-58 | | Carbon nanotubes Specific heat capacity: 0.8 J/gK | Needle shape length:thickness = 10:1 | 69° C. | No |
| Example 7-59 | | Aluminum hydroxide | Spherical shape | 69° C. | No |
| Example 7-60 | | Specific heat capacity: 1.5 J/gK | Plate shape length:thickness = 3:1 | 65° C. | No |
| Example 7-61 | | | Needle shape length:thickness = 3:1 | 62° C. | No |
| Example 7-62 | | Boron carbide | Spherical shape | 69° C. | No |
| Example 7-63 | | Specific heat capacity: 1.0 J/gK | Plate shape length:thickness = 3:1 | 65° C. | No |
| Example 7-64 | | | Needle shape length:thickness = 3:1 | 62° C. | No |
| Example 7-65 | | Silicon nitride | Spherical shape | 69° C. | No |
| Example 7-66 | | Specific heat capacity: 0.7 J/gK | Plate shape length:thickness = 3:1 | 65° C. | No |
| Example 7-67 | | | Needle shape length:thickness = 3:1 | 62° C. | No |
| Example 7-68 | | Titanium nitride | Spherical shape | 69° C. | No |
| Example 7-69 | | Specific heat capacity: 0.6 J/gK | Plate shape length:thickness = 3:1 | 65° C. | No |
| Example 7-70 | | | Needle shape length:thickness = 3:1 | 62° C. | No |
| Example 7-71 | | Zinc oxide | Spherical shape | 69° C. | No |
| Example 7-72 | | Specific heat capacity: 0.5 J/gK | Plate shape length:thickness = 3:1 | 65° C. | No |
| Example 7-73 | | | Needle shape length:thickness = 3:1 | 62° C. | No |
| Example 7-74 | | Alumina | Spherical shape | 65° C. | No |
| Example 7-75 | | Specific heat capacity; 1.00 J/gK | Plate shape length:thickness = 3:1 | 58° C. | No |
| Example 7-76 | | | Needle shape length:thickness = 3:1 | 55° C. | No |

As can be seen from Table 7, higher safety was obtained in the case of using heat absorbent particles whose particle shape was an anisotropic shape such as a needle shape or a plate shape, compared to the case of using heat absorbent particles having a spherical particle shape.

Thus, the present technology has been described by way of various embodiments and Examples; however, the present technology is not intended to be limited to these, and various modifications can be made within the scope of the gist of the present technology. For example, the thickness of the substrate and the compositions of the various materials may be set in accordance with the configurations of the positive electrode and the negative electrode. Furthermore, the non-aqueous electrolyte battery may be a primary battery.

Furthermore, the various embodiments are characterized by using a separator provided with a heat absorbing layer on the substrate surface; however, it is desirable that the heat absorbing layer is present on the boundary between the substrate and at least one of the positive electrode and the negative electrode. Therefore, the separator may have a conventional configuration, and a heat absorbing layer may be formed on at least one of the positive electrode surface and the negative electrode surface. In this case, the heat absorbing layer may be formed on the positive electrode surface and the negative electrode surface, by applying a predetermined amount of a resin solution prepared by dissolving inorganic particles and a resin material such that the heat capacity per area is adjusted to be in the range of the present technology, and also regulating the energy of ultrasonic waves such that the heat capacity per volume would be in the range of the present technology.

Meanwhile, the present invention may also adopt the following configurations.

[1]

A separator including:

a substrate; and a layer formed on at least one surface of the substrate and having a heat capacity per unit area of 0.0001 J/Kcm² or more and a heat capacity per unit volume of 3.0 J/Kcm³ or less, wherein the layer contains particles and a resin material, and the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, LiF, aluminum hydroxide, graphite, carbon nanotubes, and diamond.

[2]
The separator according to [1], wherein the particles exist in a state of being dispersed in the layer.

[3]
The separator according to [1] or [2], wherein the particles are supported in a state of being dispersed in the resin material that is formed in a three-dimensional network structure.

[4]
The separator according to any of [1] to [3], wherein the specific heat capacity of the particles is 0.5 J/gK or more.

[5]
The separator according to any of [1] to [4], wherein the shape of the particles is a shape having anisotropy.

[6]
The separator according to [5], wherein the ratio of the length of the longest part of the particle and the length of the shortest part of the particle in a direction perpendicular to the longest part ("length of the longest part"/{length of the shortest part}) is 3 times or more.

[7]
The separator according to any of [1] to [6], wherein at least one of the melting point and the glass transition temperature of the resin material is 180° C. or higher.

[8]
The separator according to [7], wherein the resin material is polyvinylidene fluoride.

[9]
The separator according to any of [1] to [8], wherein the porosity of the layer is larger than the porosity of the substrate, and is 95% or less.

[10]
The separator according to any of [1] to [9], wherein the resin material that constitutes the substrate includes a polyolefin-based resin.

[11]
The separator according to any of [1] to [10], wherein the porosity of the substrate is from 25% to 40%.

[12]
A separator including:
a substrate; and
a layer formed on at least one surface side of the substrate, with at least a portion thereof being included in the pores inside the substrate, the layer having a heat capacity per unit area of 0.0001 $J/Kcm^2$ or more and a heat capacity per unit volume of 3.0 $J/Kcm^3$ or less,
wherein the layer contains particles and a resin material, and
the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, LiF, aluminum hydroxide, graphite, carbon nanotubes, and diamond.

[13]
The separator according to [12], wherein the substrate is a nonwoven fabric or a gas-permeable cellulose film.

[14]
A battery including:
an electrode assembly having a positive electrode and a negative electrode facing each other, with a separator being interposed therebetween; and
an electrolyte,
wherein the separator includes:
a substrate; and
a layer formed on at least one surface of the substrate and having a heat capacity per unit area of 0.0001 $J/Kcm^2$ or more and a heat capacity per unit volume of 3.0 $J/Kcm^3$ or less,
the layer contains particles and a resin material, and
the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, LiF, aluminum hydroxide, graphite, carbon nanotubes, and diamond.

[15]
The battery according to [14], wherein a negative electrode active material included in the negative electrode is formed from a material containing at least one of a metal element and a semimetal element as a constituent element.

[16]
A battery including:
an electrode assembly having a positive electrode and a negative electrode facing each other, with a separator being interposed therebetween; and
an electrolyte,
wherein the separator includes:
a substrate; and
a layer formed on at least one surface side of the substrate, with at least a portion thereof being included in the pores inside the substrate, the layer having a heat capacity per unit area of 0.0001 $J/Kcm^2$ or more and a heat capacity per unit volume of 3.0 $J/Kcm^3$ or less,
the layer contains particles and a resin material, and
the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, LiF, aluminum hydroxide, graphite, carbon nanotubes, and diamond.

[17]
A battery including:
an electrode assembly having a positive electrode and a negative electrode facing each other, with a separator being interposed therebetween;
an electrolyte; and
a layer disposed between the separator and at least one of the positive electrode and the negative electrode facing each other across the separator, and having a heat capacity per unit area of 0.0001 $J/Kcm^2$ or more and a heat capacity per unit volume of 3.0 $J/Kcm^3$ or less,
wherein the layer contains particles and a resin material, and
the particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, LiF, aluminum hydroxide, graphite, carbon nanotubes, and diamond.

[18]
A battery pack including:
the battery according to any of [14] to [17];
a control unit controlling the battery; and
an exterior material enclosing the battery.
[19]
An electronic apparatus including
the battery according to any of [14] to [17], and
receiving the supply of electric power from the battery.
[20]
An electric vehicle including:
the battery according to any of [14] to [17],
a conversion device receiving the supply of electric power from the battery and converting the electric power to the driving force for the vehicle; and
a control device performing information processing in connection with the vehicle control, based on information on the battery.
[21]
A power storage device including
the battery according to any of [14] to [17], and
supplying electric power to an electronic apparatus connected to the battery.
[22]
The power storage device according to [21],
including an electric power information control device transmitting and receiving signals to and from another apparatus through a network, and
performing charge-discharge control of the battery based on information received by the electric power information control device.
[23]
An electric power system receiving the supply of electric power from the battery according to any of [14] to [17], or supplying electric power from a power generation device or an electric power network to the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 Separator
2 Substrate
3 Heat absorbing layer
11 Battery can
12a, 12b Insulating plates
13 Battery lid
14 Safety valve
14a Protrusion
15 Disc holder
16 Cut-off disc
16a Hole
17 Heat-sensitive resistance element
18 Gasket
19 Subdisc
20 Wound electrode assembly
21 Positive electrode
21A Positive electrode current collector
21B Positive electrode active material layer
22 Negative electrode
22A Negative electrode current collector
22B Negative electrode active material layer
23 Separator
24 Center pin
25 Positive electrode lead
26 Negative electrode lead
30 Non-aqueous electrolyte battery
31 External can
32 Battery lid
33 Electrode pin
34 Insulator
35 Through-hole
36 Internal pressure releasing mechanism
36a First opening groove
36b Second opening groove
37 Liquid electrolyte injection port
38 Sealing member
40 Wound electrode assembly
41 Positive electrode terminal
50 Wound electrode assembly
51 Positive electrode lead
52 Negative electrode lead
53 Positive electrode
53A Positive electrode current collector
53B Positive electrode active material layer
54 Negative electrode
54A Negative electrode current collector
54B Negative electrode active material layer
55 Separator
56 Non-aqueous electrolyte
57 Protective tape
60 Exterior member
61 Adhesive film
70 Laminated electrode assembly
71 Positive electrode lead
72 Negative electrode lead
73 Positive electrode
74 Negative electrode
75 Separator
76 Fixing member
80 Cell
81 Circuit board
82a Top cover
82b Bottom cover
83 Hard laminate film
84 Notch part
85 Soft laminate film
86 Recess
87 Adhesive film
90 Battery pack
100 Power storage system
101 House
102a Thermal power station
102b Nuclear power station
102c Hydroelectric power station
102 Centralized electric power system
103 Power storage device
104 Domestic power generation device
105 Power consuming device
105a Refrigerator
105b Air conditioning device
105c Television receiver
105d Bathroom
106 Electric vehicle
106a Electric car
106b Hybrid car
106c Electric motorcycle
107 Smart meter
108 Power hub 109 Electric power network
110 Control device
111 Sensor
112 Information network
113 Server
200 Hybrid vehicle
201 Engine
202 Power generator
203 Electric power driving force transducer
204a, 204b Driving wheels
205a, 205b Car wheels
208 Battery
209 Vehicle control device
210 Various sensors
211 Charging slot
301 Assembled battery
301a Secondary battery
302a Charging control switch
302b Diode
303a Discharging control switch
303b Diode
304 Switch unit
307 Current detection resistance
308 Temperature detection element
310 Control unit
311 Voltage detection unit
313 Current measuring unit
314 Switch control unit
317 Memory
318 Temperature detection unit
321 Positive electrode terminal
322 Negative electrode terminal

The invention claimed is:

1. A separator comprising: a substrate; and a layer formed on at least one surface of the substrate and having a heat capacity per unit area of 0.0001 J/Kcm$^2$ or more and a heat capacity per unit volume of 3.0 J/Kcm$^3$ or less, wherein the layer contains inorganic particles and a resin material, and the inorganic particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond,
the shape of each inorganic particle is a shape having anisotropy, and
the ratio of the length of the longest part of each inorganic particle and the length of the shortest part of each inorganic particle in a direction perpendicular to the longest part {"length of the longest part"/(length of the shortest part)} is 3 times or more.

2. The separator according to claim 1, wherein the particles exist in a state of being dispersed in the layer.

3. The separator according to claim 1, wherein the particles are supported in a state of being dispersed in the resin material that is formed in a three-dimensional network structure.

4. The separator according to claim 1, wherein the specific heat capacity of the particles is 0.5 J/gK or more.

5. The separator according to claim 1, wherein at least one of the melting point and the glass transition temperature of the resin material is 180° C. or higher.

6. The separator according to claim 5, wherein the resin material is polyvinylidene fluoride.

7. The separator according to claim 1, wherein the porosity of the layer is larger than the porosity of the substrate, and is 95% or less.

8. The separator according to claim 1, wherein the resin material that constitutes the substrate includes a polyolefin-based resin.

9. The separator according to claim 1, wherein the porosity of the substrate is from 25% to 40%.

10. A separator comprising: a substrate; and a layer formed on at least one surface side of the substrate, with at least a portion thereof being included in the pores inside the substrate, the layer having a heat capacity per unit area of 0.0001 J/Kcm$^2$ or more and a heat capacity per unit volume of 3.0 J/Kcm$^3$ or less, wherein the layer contains inorganic particles and a resin material, and the inorganic particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, aluminum hydroxide, graphite, carbon nanotubes, and diamond,
the shape of each inorganic particle is a shape having anisotropy, and
the ratio of the length of the longest part of each inorganic particle and the length of the shortest part of each p inorganic article in a direction perpendicular to the longest part {"length of the longest part"/(length of the shortest part)} is 3 times or more.

11. The separator according to claim 10, wherein the substrate is a nonwoven fabric or a gas-permeable cellulose film.

12. A battery comprising: an electrode assembly having a positive electrode and a negative electrode facing each other, with a separator being interposed therebetween; and an electrolyte, wherein the separator includes: a substrate; and a layer formed on at least one surface of the substrate and having a heat capacity per unit area of 0.0001 J/Kcm$^2$ or more and a heat capacity per unit volume of 3.0 J/Kcm$^3$ or less, the layer contains inorganic particles and a resin material, and the inorganic particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, Li$_2$O$_4$, Li$_3$PO$_4$, LiF, aluminum hydroxide, graphite, carbon nanotubes, and diamond,
the shape of each inorganic particle is a shape having anisotropy, and
the ratio of the length of the longest part of each inorganic particle and the length of the shortest part of each inorganic particle in a direction perpendicular to the longest part {"length of the longest part"/(length of the shortest part)} is 3 times or more.

13. The battery according to claim 12, wherein a negative electrode active material included in the negative electrode is formed from a material containing at least one of a metal element and a semimetal element as a constituent element.

14. A battery comprising: an electrode assembly having a positive electrode and a negative electrode facing each other, with a separator being interposed therebetween; and an electrolyte, wherein the separator includes: a substrate; and a layer formed on at least one surface side of the substrate, with at least a portion thereof being included in the pores inside the substrate, the layer having a heat capacity per unit area of 0.0001 J/Kcm$^2$ or more and a heat capacity per unit volume of 3.0 J/Kcm³ or less, the layer contains inorganic particles and a resin material, and the inorganic particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, aluminum hydroxide, graphite, carbon nanotubes, and diamond, the shape of each inorganic particle is a shape having anisotropy, and the ratio of the length of the longest part of each inorganic particle and the length of the shortest part of each inorganic particle in a direction perpendicular to the longest part {"length of the longest part"! (length of the shortest part)} is 3 times or more.

15. A battery comprising: an electrode assembly having a positive electrode and a negative electrode facing each other, with a separator being interposed therebetween; an electrolyte; and a layer disposed between the separator and at least one of the positive electrode and the negative electrode facing each other across the separator, and having a heat capacity per unit area of 0.0001 J/Kcm² or more and a heat capacity per unit volume of 3.0 J/Kcm³ or less, wherein the layer contains inorganic particles and a resin material, and the inorganic particles contain at least one selected from boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a porous aluminosilicate, a lamellar silicate, $Li_2O_4$, $Li_3PO_4$, LiF, aluminum hydroxide, graphite, carbon nanotubes, and diamond, the shape of each inorganic particle is a shape having anisotropy, and the ratio of the length of the longest part of each inorganic particle and the length of the shortest part of each inorganic particle in a direction perpendicular to the longest part {"length of the longest part"/(length of the shortest part)} is 3 times or more.

16. A battery pack comprising: the battery according to claim 12; a control unit controlling the battery; and an exterior material enclosing the battery.

17. An electronic apparatus comprising the battery according to claim 12, and receiving the supply of electric power from the battery.

18. An electric vehicle comprising: the battery according to claim 12, a conversion device receiving the supply of electric power from the battery and converting the electric power to the driving force for the vehicle; and a control device performing information processing in connection with the vehicle control, based on information on the battery.

19. A power storage device comprising the battery according to claim 12, and supplying electric power to an electronic apparatus connected to the battery.

20. The power storage device according to claim 19, comprising an electric power information control device transmitting and receiving signals to and from another apparatus through a network, and performing charge-discharge control of the battery based on information received by the electric power information control device.

21. An electric power system receiving the supply of electric power from the battery according to claim 12, or supplying electric power from a power generation device or an electric power network to the battery.

* * * * *